(12) United States Patent
Amita et al.

(10) Patent No.: US 6,622,085 B1
(45) Date of Patent: Sep. 16, 2003

(54) DEVICE AND METHOD FOR CREATING AND USING DATA ON ROAD MAP EXPRESSED BY POLYGONS

(75) Inventors: Junya Amita, Fukuoka (JP); Yaheiji Hattori, Fukuoka (JP); Hiroki Kobayashi, Fukuoka (JP); Kiyonari Kishikawa, Kanangawa (JP)

(73) Assignees: Hitachi Software Engineering Co., Ltd., Kanangawa (JP); Kabushiki Kaisha Zenrin, Fukuoka (JP)

( * ) Notice: Subject to any disclaimer, the term of this patent is extended or adjusted under 35 U.S.C. 154(b) by 0 days.

(21) Appl. No.: 09/890,081

(22) PCT Filed: Jan. 20, 2000

(86) PCT No.: PCT/JP00/00248

§ 371 (c)(1),
(2), (4) Date: Oct. 1, 2001

(87) PCT Pub. No.: WO00/43953

PCT Pub. Date: Jul. 27, 2000

(30) Foreign Application Priority Data

Jan. 25, 1999 (JP) .............................................. 11-15372
Jul. 5, 1999 (JP) ............................................ 11-189974

(51) Int. Cl.⁷ ............................................... G06F 17/00
(52) U.S. Cl. ...................... 701/208; 701/200; 701/211; 340/990; 340/950.1
(58) Field of Search ............................... 701/200, 208, 701/211; 340/990, 995

(56) References Cited

U.S. PATENT DOCUMENTS

| | | | | |
|---|---|---|---|---|
| 5,204,817 A | * | 4/1993 | Yoshida | 701/209 |
| 5,214,757 A | * | 5/1993 | Mauney et al. | 345/751 |
| 5,982,301 A | * | 11/1999 | Ohta et al. | 340/995 |
| 6,014,607 A | * | 1/2000 | Yagyu et al. | 701/202 |
| 6,041,281 A | * | 3/2000 | Nimura et al. | 701/211 |
| 6,247,019 B1 | * | 6/2001 | Davies | 707/103 R |

FOREIGN PATENT DOCUMENTS

| | | |
|---|---|---|
| JP | 2080774 | 4/1987 |
| JP | 6339086 | 2/1988 |
| JP | 4303271 | 10/1992 |
| JP | 4303272 | 10/1992 |
| JP | 112537 | 1/1999 |
| JP | 6083931 | 1/1999 |

* cited by examiner

Primary Examiner—William A. Cuchlinski, Jr.
Assistant Examiner—Eric M Gibson
(74) Attorney, Agent, or Firm—David N. Lathrop, Esq.; Gallagher & Lathrop

(57) ABSTRACT

An object of the present invention is to accomplish the automatic preparation of road data in which roads and intersections are expressed by polygons that show accurate agreement with the complicated road shapes on city maps. In simple polygon preparation processing 3, the respective line segments of road network data 2 in which roads are expressed as line segments are expanded in the direction of the width dimension, thus producing simple road polygon data 4 which has a width that is slightly greater than the width of the roads in the city map data 5. Next, in scissors data preparation processing 6, scissors data 7 which defines the outlines of roads is prepared from the city map data 5 by connecting shape lines in the vicinity of roads. Next, in road polygon preparation processing 9, road polygon data 9 which shows good agreement with the shapes of roads in the city map data is prepared by trimming the simple road polygons along the road outlines defined by the scissors data.

42 Claims, 45 Drawing Sheets

(a)

(b)

(A)            (B)

(A)            (B)

SEARCH RANGE
Li : ROAD NETWORK LINK
θi : ANGLE FORMED BY LINKS
● : SHAPE ELEMENT POINT ON RESIDENTIAL MAP

| NUMBER | COORDINATES | ANGLE | DISTANCE |
|---|---|---|---|
| 1 | P2 | $\gamma 1$ | d2 |
| 2 | P3 | $\gamma 3$ | d3 |
| 3 | P4 | $\gamma 4$ | d4 |
| 4 | P1 | $\gamma 1$ | d1 |
| 5 | P5 | $\gamma 5$ | d5 |
| ... | ... | ... | ... |

DEVICE AND METHOD FOR CREATING AND USING DATA ON ROAD MAP EXPRESSED BY POLYGONS

TECHNICAL FIELD

The present invention relates to a map image processing technique which handles road map data, and more particularly to a device and method for preparing road map data.

BACKGROUND ART

Electronic map techniques in which a computer is used to display electronic map image data on a screen are utilized in various applications including car navigation. In cases were roads are displayed on ordinary maps, there is no problem if the roads are drawn as simple lines ignoring the width of the roads in the case of small-scale maps such as large-area maps. However, in the case of large-scale maps such as detailed city maps, roads must be expressed as regions that have an accurate width dimension. Naturally, in the case of electronic maps as well, various road data preparation methods and display methods have been developed for the purpose of expressing roads with a width dimension. For example, the methods described in Japanese Patent Application Kokai No. Sho 62-80774, Japanese Patent Application Kokai No. Hei 4-303271, Japanese Patent Application Kokai No. Hei 4-303272 and Japanese Patent Application Kokai No. Hei 6-83931, etc., are known.

In the graphic processing device described in Japanese Patent Application Kokai No. Sho 62-80774, the trouble involved in drawing roads by the manual setting one at a time of straight lines that constitute road outlines in the preparation of road maps that show a width dimension in the roads is eliminated as follows: specifically, when the drawer sets the road width at the starting point and final point of a road, a pair of parallel lines that run from the starting point to the final point while maintaining a spacing that corresponds to the road width are drawn, and in cases where a given pair of parallel lines crosses another pair of parallel line, the parallel lines at the point of intersection are automatically erased. Accordingly, road maps with a width dimension that encompasses intersections can easily be prepared.

In the device described in Japanese Patent Application Kokai No. Hei 4-303271, when a person sets the road width and draws a reference line with a cursor, a pair of parallel lines are drawn that run along this reference line while maintaining a spacing that corresponds to the road width.

In the device described in Japanese Patent Application Kokai No. Hei 4-303272, when two road s that are respectively expressed as pairs of parallel straight lines partially overlap each other at an angle, the parallel lines are amended in the overlapping area s o that a turning angle is drawn.

In the device described in Japanese Patent Application Kokai No. Hei 6-83931, when two roads that are respectively expressed by pairs of parallel lines are connected with each other, the connecting parts between the roads are drawn using pairs of parallel straight lines and arc-form lines.

Thus, in the prior art, road data is expressed by pairs of parallel lines. However, actual road shapes are extremely complex, and the accurate expression of such shapes by means of pairs of parallel lines alone is absolutely impossible. Especially in the case of extremely large-scale city maps in which center dividers, sidewalks and traffic lanes, etc., are accurately drawn, conventional road data preparation techniques using pairs of parallel lines are completely useless.

Furthermore, in the case of electronic city maps, there is a demand for a system that allows the automatic painting in of roads with colors or textures. In the case of paper-based city maps, roads may be made easily visible by coloring the roads with colors that are different from those of other regions. In electronic maps as well, roads are naturally easier to see if these roads are colored with specified colors. In order to achieve automatic painting in of roads, the roads must be expressed by open-loop polygonal data However, conventional road data is merely a collection of simple line segments such as parallel lines and arc-form lines, etc. As a result, the painting in of roads cannot be performed automatically. Accordingly, in conventional electronic city maps, buildings, etc., expressed by polygons are painted in with specified colors, while roads are merely indicated by drawing the outlines of the roads, with no special coloring being applied.

Furthermore, electronic maps can provide convenient functions such as alterations in scale and street search, etc. For example, in car navigation systems, a method of use is possible in which a street search is performed and a route is displayed on a map, with the vehicle being caused to run along this route; during this operation, a small-scale large-area map is displayed while the vehicle is running on high-speed roadways, and when the vehicle enters an urban area, the display is switched to a large-scale city map. In this case, if the route found as a result of the search runs along (for example) road A, then the route must be displayed on the same road A in both the large-area map and city map. Accordingly, it is necessary that there be a logical connection between the respective roads on the large-area map and the same roads on the city map. Generally, in the case of large-area maps, it is sufficient if roads are expressed as simple lines; accordingly, the road data in such a case is road network data in which points of intersection are expressed as nodes, and roads are expressed as vector data connecting these nodes. In the case of city maps, on the other hand, the road data is a collection of road outline line-segment data such as pairs of parallel lines and arc-form lines, etc., indicating the outlines of roads (as was described above). Conventionally, an association has been established between roads shown on city maps and roads shown on large-area maps by causing the center coordinates of intersections on city maps to correspond to the nodes of the road network data on large-area maps. As a result, however, even on city maps, routes found as a result of searching are simply expressed as zigzag lines connecting the center points of intersections; in such a case, it cannot be said that the advantages of city maps, which show road configurations in detail, are sufficiently obtained.

Accordingly, an object of the present invention is to accomplish the automatic preparation of road data which shows accurate agreement with complex road configurations.

A further object of the present invention is to accomplish the automatic preparation of road data using polygonal-shape data which paints in roads that have a width dimension.

Still a further object of the present invention is to accomplish the automatic preparation of road data which is associated with road network data used in large-area maps, and which accurately expresses the road configurations used in city maps.

Still a further object of the present invention is to solve several concrete technical problems described below, which arise in the development of practical techniques for achieving the abovementioned objects.

DISCLOSURE OF THE INVENTION

In the road data preparation device of the present invention, (1) simple road polygons which encompass roads that have a width dimension in city map data are produced from road network data in which intersections are expressed as nodes and roads are expressed as links that connect these nodes, (2) scissors data which defines the outlines of roads is prepared from city map data, and (3) road polygon data which is shaped into the shapes of roads in the city map data is prepared by trimming the simple road polygons along the outlines defined by the scissors data. As a result, the roads having complicated shapes in the city map are expressed as polygons.

In a preferred embodiment of the present invention, when a plurality of independent simple road polygons are prepared for a single link in the preparation of simple road polygons, these simple polygons are distinguished as external polygons that correspond to the external shapes of roads, and cut-out polygons that correspond to cut-out areas of roads. In this way, roads with loop shapes that have cut-out areas can also be favorably converted into polygons.

In a preferred embodiment of the present invention, simple road polygons that encompass roads on city maps are prepared by expanding the nodes and links of road network data to an extent that exceeds the width dimensions of roads on such city maps. In this case, the nodes are expanded to a greater extent than the links. Furthermore, the flexure points of links are also expanded to a slightly excessive degree. In this way, simple road polygons that also securely encompass locations that have a somewhat increased area, such as intersections and turning angles of roads, etc., can be prepared. After such simple road polygons that completely encompass the roads have been prepared, road polygons that show a good correspondence with the outline shapes of the roads can be obtained by trimming these simple road polygons with the scissors data that indicates the outlines of the roads, so that excess portions are removed.

In a preferred embodiment of the present invention, when scissors data is to be prepared, shape lines in the vicinity of roads in city map data are selected, those shape lines among the selected shape lines whose end points coincide with each other or are located in close proximity to each other are connected to each other, and the line-segment data obtained by this connection is used as scissors data In this way, scissors data that indicates road outlines in a favorable manner can be obtained.

In a preferred embodiment of the present invention, the device of the present invention further comprises a traffic lane preparation part which prepares a plurality of traffic lane polygon data expressing a plurality of traffic lanes from the abovementioned shaped road polygon data, and a guide line setting part which sets a guide line inside each of the abovementioned traffic lane polygon data.

In a preferred embodiment of the present invention, when it becomes necessary to display a road map of an area that forms a part of the overall map region covered by the aforementioned road network data, the aforementioned shaped road polygon data is dynamically prepared for roads contained only in the aforementioned partial area The road map display device of the present invention comprises polygon road map data which includes road polygon data that expresses the roads that are to be displayed by means of respective polygons, and a display part which displays the aforementioned roads using the abovementioned road polygon data.

In a preferred embodiment of this road map display device, the polygon road map data further includes traffic lane polygon data which expresses respective traffic lanes within roads as polygons, and guide line data which expresses a guide line which is set within the respective traffic lanes, and the abovementioned display part not only displays roads, but also displays respective traffic lanes within the roads using the abovementioned traffic lane polygon data, and further displays a guide mark positioned within a selected traffic lane using the abovementioned guide line data.

A preferred embodiment of this road map display device further comprises road network data, city map data, and a road polygon data preparation part which dynamically prepares road polygon data on the basis of the road network data and the city map data for roads included in an area that is to be displayed in cases where it becomes necessary to display a road map of the area which forms a part of the overall map region covered by the abovementioned road network data.

The intersection polygon preparation device of the present invention receives road network data which has nodes that express intersections, and links between nodes that express roads between intersections, and city map data which has line-segment data that expresses the shapes of map elements as sets of shape element points. Furthermore, this device determines, in city map data, a specified search region that include nodes of interest in road network data, and searches within the determined search region for shape element points which are positioned so that these shape element points satisfy specified positional conditions. Next, using the shape element points that have been found as a result of the abovementioned search, this device prepares intersection polygon data for the abovementioned nodes of interest. Using this device makes it possible to prepare intersection polygon data automatically from road network data and city map data based on line segments. The intersection polygon data thus prepared inevitably has a data association with nodes in the road network data.

In a preferred embodiment, this device determines the abovementioned search region, and then splits this search region in to a plurality of sub-search regions using links connected to nodes, and determines inherent positional conditions as positional conditions for the respective sub-search regions. Then, this device searches in the respective sub-search regions for shape element points that satisfy the inherent positional conditions, collects the shape element points that are found in the plurality of sub-search regions, and prepares intersection polygon data. The respective sub-search regions include shape element points of the respective corner parts of intersections. Since the positional relationship between nodes of interest and the respective corner parts differs for each corner part, the shape element points of the respective corner parts can be securely extracted by determining inherent positional conditions that are suited to the respective corner parts for each sub-search region. Accordingly, accurate intersection polygon data can be obtained.

In a preferred embodiment, this device determines the proximate point that is closest to the node of interest in each of the plurality of sub-search regions within the aforementioned search region, and sets a band region which is separated from the node of interest by the distance range between a first distance extending from the node of interest to the proximal point and a second distance obtained by adding a specified permissible width to the first distance. Then, in each sub-search region, this device picks up only the shape element points present inside the band region as points that construct an intersection polygon. Accurate intersection polygons can be obtained with high precision by this method.

In a preferred embodiment, this device divides a city map region covered by city map data into numerous small cells, selects at least one cell that is located in close proximity to a position corresponding to the node of interest (e.g., the cell where the node of interest is positioned, or a cell adjacent to this cell) from the abovementioned cells as an object cell, and sets the abovementioned search region inside this object cell. The amount of data handled in the processing used to prepare respective intersection polygons is reduced by this method, so that the burden on the calculator used is lightened.

In a preferred embodiment, this device receives road map data that has road polygon data, and in cases where there are regions in which the road polygon data and the abovementioned intersection polygon data overlap, the aforementioned overlapping regions are removed from the road polygon data using the abovementioned intersection polygon data, so that pure road polygon data that does not overlap with intersection polygon data is prepared.

In a preferred embodiment, this device further determines a plurality of tangential lines that contact a plurality of roads from intersection polygon data, and extract two tangential lines from the plurality of determined tangential lines. Furthermore, within the polygon regions covered by the intersection polygon data, this device prepares substantially sector-shaped or substantially rectangular guiding intersection polygons that smoothly connect the two extracted tangential lines to each other.

Another road map display device of the present invention receives road map data that has road polygon data and guiding intersection polygon data, and selects road polygon data for a plurality of roads that are to be displayed and guiding intersection polygon data used to connect the abovementioned plurality of roads; then, the road map display device displays the abovementioned roads and intersections using the selected road polygon data and guiding intersection polygon data.

Another road map display device of the present invention receives road map data that has road polygon data and intersection polygon data, and also receives traffic jam information that indicates the end point position of a tailback of cars. Furthermore, this device selects road polygon data or intersection polygon data for a road or intersection in which the end point position of tailback of cars are present from the abovementioned road map data, and divides the selected road polygon data or intersection polygon data into a portion corresponding to an upstream side region and a portion corresponding to a downstream side region at the aforementioned end point position. Then, using the downstream side region of the split road polygon data or intersection polygon data, and road polygon data and intersection polygon data for roads and intersections which are located further downstream than the abovementioned downstream side region along the tailback of cars, this device displays the regions of roads and intersections in which the tailback of cars is present. As a result, the regions of roads on which there is a traffic jam can be accurately displayed.

The computer-readable data recording medium of the present invention accommodates polygonal road network data including node data and link data that are mutually associated so that a road network can be constructed. The respective node data include intersection polygon data in which the shapes of the intersections of the respective nodes are expressed by polygons; and the link data include road polygon data in which the shapes of the roads of the respective links are expressed by polygons.

By using the abovementioned polygonal road network data, the computer map application can prepare and display polygonal road map images in which the shapes and positions of roads and intersections drawn on city maps show good agreement. In addition, in cases where the map application performs processing such as route search and map matching, etc., using the abovementioned polygonal road network data, the basic portions of conventional route search or map matching algorithms using convention road network data can be utilized.

Another road map image display device of the present invention comprises the abovementioned polygonal road network data and a display part which receives this polygonal road network data and prepares and displays polygonal road images consisting of polygons that express intersections and polygons that express roads.

In a preferred embodiment, this road map display device further comprises city map data, and the abovementioned display part prepares city map images using this city map data, and displays the abovementioned polygonal road images superimposed on these city map images. Furthermore, the display part has the function of performing processing such as route search or map matching, etc., using the abovementioned polygonal road network data.

The present invention can typically be worked using a computer. Computer programs for this purpose can be installed or loaded into the computer using various media such as various types of disk storage, semiconductor memories or communications network signals, etc. The present invention can not only be worked using a single computer, but can also be worked by dispersed processing using a plurality of computers.

BRIEF DESCRIPTION OF THE DRAWINGS

FIG. 23 is a diagram showing a table in which element points that form intersection sectional shapes are accumulated;

BEST MODE FOR CARRYING OUT THE INVENTION

Below, an embodiment of the present invention will be described in concrete terms with reference to the attached figures.

Figure 1:
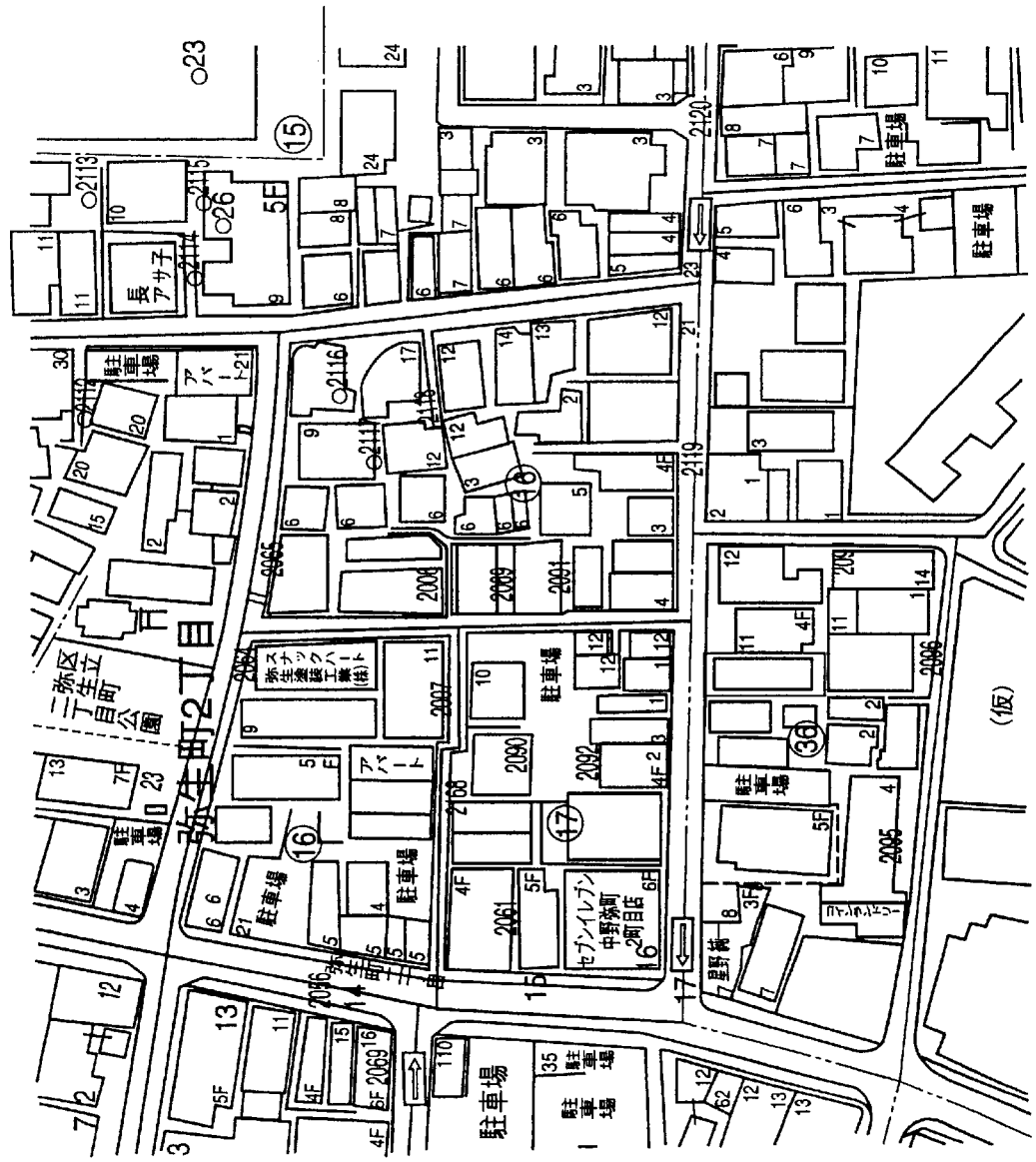
FIG. 1 is diagram which shows an example of city map data in which building outlines and sidewalk shapes, etc., are drawn in detail.
Figure 2:
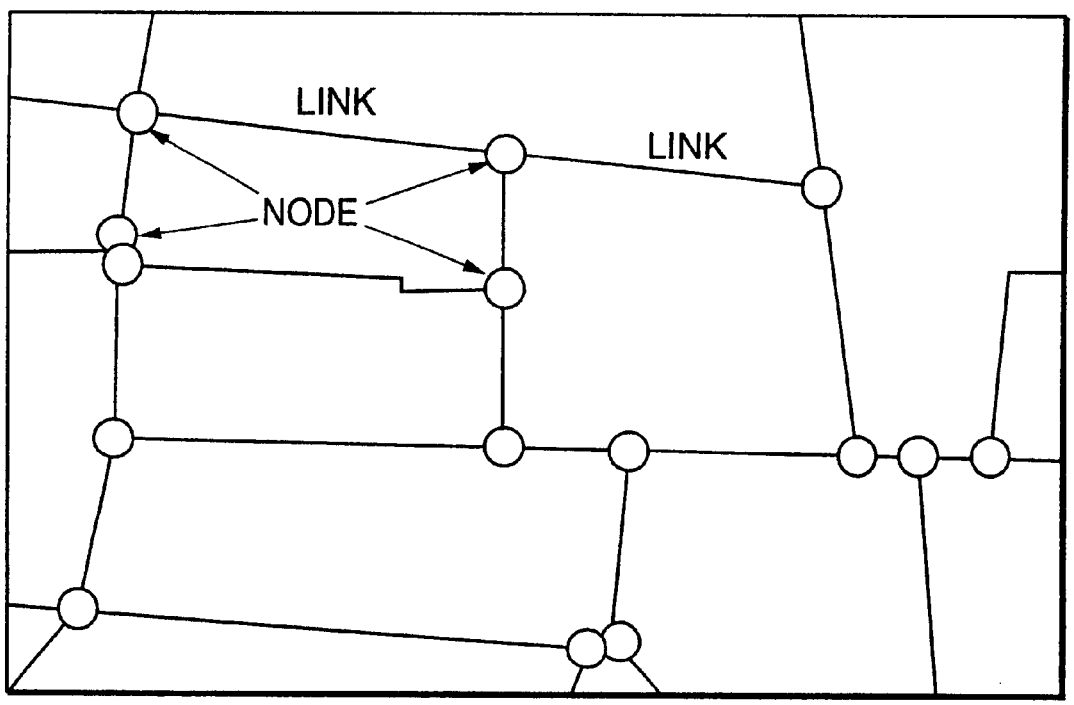
FIG. 2 is a diagram which shows an example of road network data in which intersections are shown as nodes, and roads are expressed as directional vectors that connect these nodes.

FIG. 1 shows one example of a city map in which building outlines and sidewalk shapes, etc., are drawn accurately and in detail. FIG. 2 shows one example of road network data in which intersections are expressed as nodes, and roads are expressed as directional vectors (links) that connect these nodes.

Figure 3:
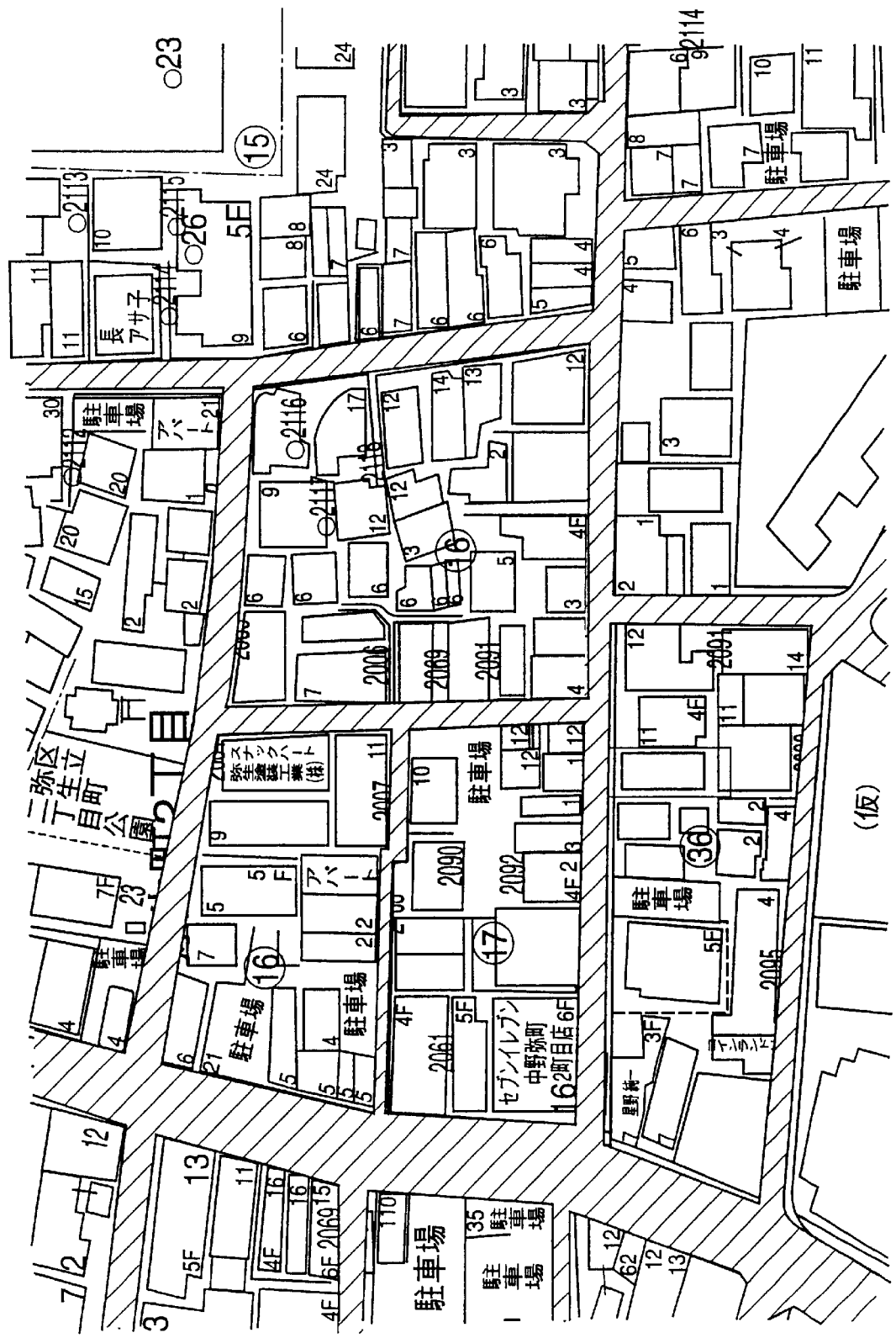
FIG. 3 is a diagram which shows an example of a display in which road polygon data constructed according to the principle of the present invention is superimposed on city map data.

In accordance with the principle of the present invention, road polygon data in which the road shapes of city maps are favorably reproduced can be generated by superimposing road network data of the type shown in FIG. 2 on a city map of the type shown in FIG. 1, and performing processing that will be described in detail below. FIG. 3 shows an example in which road polygon data completed in this manner is painted in by hatching, and displayed superimposed on the city map data shown in FIG. 1. As is seen from FIG. 3, road polygon data which shows precise agreement with the complicated road shapes of the city map is obtained. Furthermore, since the roads can be painted in as shown in this figure, a city map that is easy to see can be provided. Furthermore, the respective roads (links between intersections) of the road network data shown in FIG. 2 can be associated in a one-to-one correspondence with the respective road respective road polygons (road polygons extending from intersection to intersection) of the road polygon data painted in by hatching in FIG. 3. As a result, in cases where (for example) a route search is performed, the route found as a result of this search can be expressed on the city map by the painted-in roads themselves rather than being expressed by simple zigzag lines connecting the centers of intersections as in conventional systems.

Figure 4:
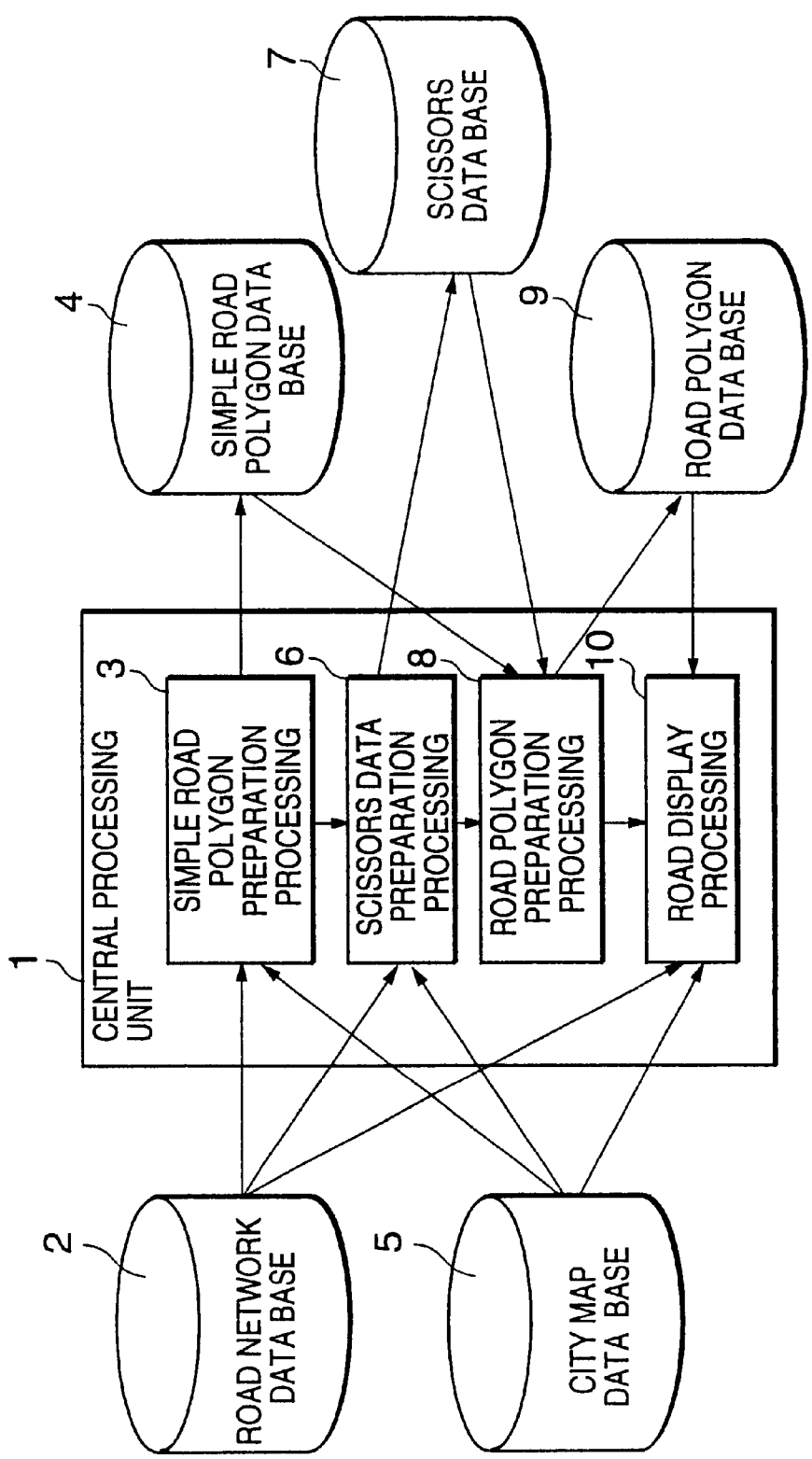
FIG. 4 is a block diagram which illustrates the system construction of a road polygon preparation device constituting one embodiment of the present invention.

FIG. 4 shows the system construction of a road data preparation device constituting one embodiment of the present invention.

This road data preparation device is typically a programmed general-use computer. The central processing unit 1 of this computer performs simple road polygon preparation processing 3, scissors data preparation processing 6 and road polygon preparation processing 8 according to programs. A road network data base 2 which stores road network data that expresses intersections and roads of the types shown for example in FIG. 2 as nodes and links, and a city map data base 5 which stores city map data in which building outlines and sidewalk shapes, etc., such as those shown in FIG. 1 are drawn in detail, are accommodated in the memory of this computer as raw-material data.

The central processing unit 1 first performs simple road polygon preparation processing 3.

In this processing 3, line-segment data (link data between respective intersections) for respective roads included in the road network data stored in the road network data base 2 is expanded in the width direction to an extend exceeding the width dimension of the respective roads in the city map data 5, so that simple road polygon data, which covers the respective road regions in the city map data 5 with a slight excess margin, is prepared for each road. The simple road polygon data that has been prepared for each road is collected and stored in the simple road polygon data base 4 of the memory.

The central processing unit 1 next performs scissors data preparation processing 6. In this processing 6, scissors data (data indicating cutting lines for trimming) which is used form correct road shapes by trimming the simple road polygon data for the respective roads is prepared on the basis of line segment data such as road outlines and building outlines, etc., contained in the city map data that is stored in the city map data base 5. The scissors data thus prepared for the respective roads is collected and stored in the scissors data base 7 of the memory.

The central processing unit 1 next performs road polygon preparation processing 8. In this processing 8, the simple road polygon data for respective roads stored in the simple road polygon data base 4 is trimmed using respective scissors data from the scissors data base 7, thus preparing road polygon data that expresses the accurate road shapes of respective roads. The road polygon data that is thus prepared is collected and stored in the road polygon data base 9 of the memory.

The abovementioned simple road polygon preparation processing 3, scissors data preparation processing 6 and road polygon preparation processing 8 will be described in detail below.

Figure 5:
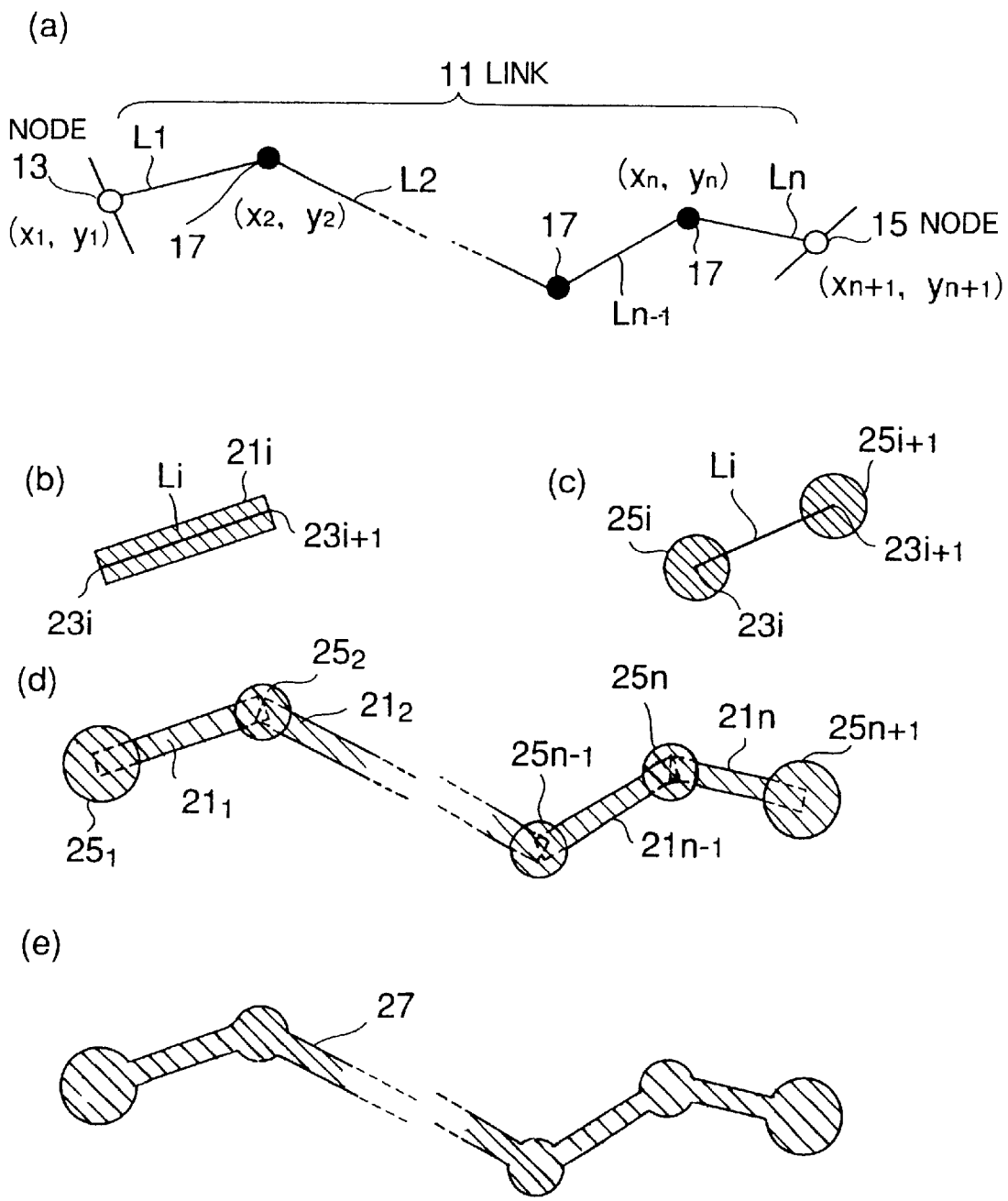
FIG. 5 is an explanatory diagram which illustrates the procedure of simple road polygon preparation processing.

FIG. 5 shows the procedure of the abovementioned simple road polygon preparation processing 3.

In this simple road polygon preparation processing 3, road network data for the object region is first read in from the road network data base 2. Generally, in this road network data, intersections and roads are respectively expressed as nodes and links. As is shown in FIG. 5(a), one link (road) 11 is a zigzag line that connects two adjacent nodes (intersections) 13 and 15, and this zigzag line is expressed using a plurality of straight line segments L1, . . . Ln that connect the initial-end node 13, respective intermediate shape element points (flexure points) 17, 17 . . . and the final-end node 15 in that order. Such road network data can be prepared from national road data on a 1:25,000 scale.

The simple road polygon preparation processing 3 next expands the respective line segments L1, . . . Ln of the respective links shown in FIG. 5(a) in the direction of the width dimension (i.e., the direction perpendicular to the line segments) as shown in FIG. 5(b), so that element polygons (e.g., rectangles) 21$i$ that encompass the respective line segments Li are created. Furthermore, as is shown in FIG. 5(c), the starting points and final points (shape element points at both ends) 23$i$ and 23$i$+1 of the respective line segments Li are expanded in all directions to a greater extent than the respective line segments Li, thus creating element polygons (e.g., polygons that are close to circles) 25$i$ and 25$i$+1 that encompass the respective starting points and final points 23$i$ and 23$i$+1. In this case, as is shown in FIG. 5(d), especially the element polygons 251 and 25$n$+1 that correspond to nodes are expanded to an even greater extent than other shape element points. Processing in which element polygons are thus created by expanding the respective elements of a link (nodes, line segments, shape element points) is performed in order for all of the elements of the link in question. As a result, a set consisting of a plurality of element polygons 251, 211, . . . 21$n$, 25$n$+1 which encompasses the entire link in question is produced as shown in FIG. 5(d). Next, a single simple road polygon 27 that encompasses the link in question (shown in FIG. 5(e)) is created by calculating the sum of the regions of the above-mentioned element polygons 251, 211, . . . 21$n$, 25$n$+1.

Figure 6:
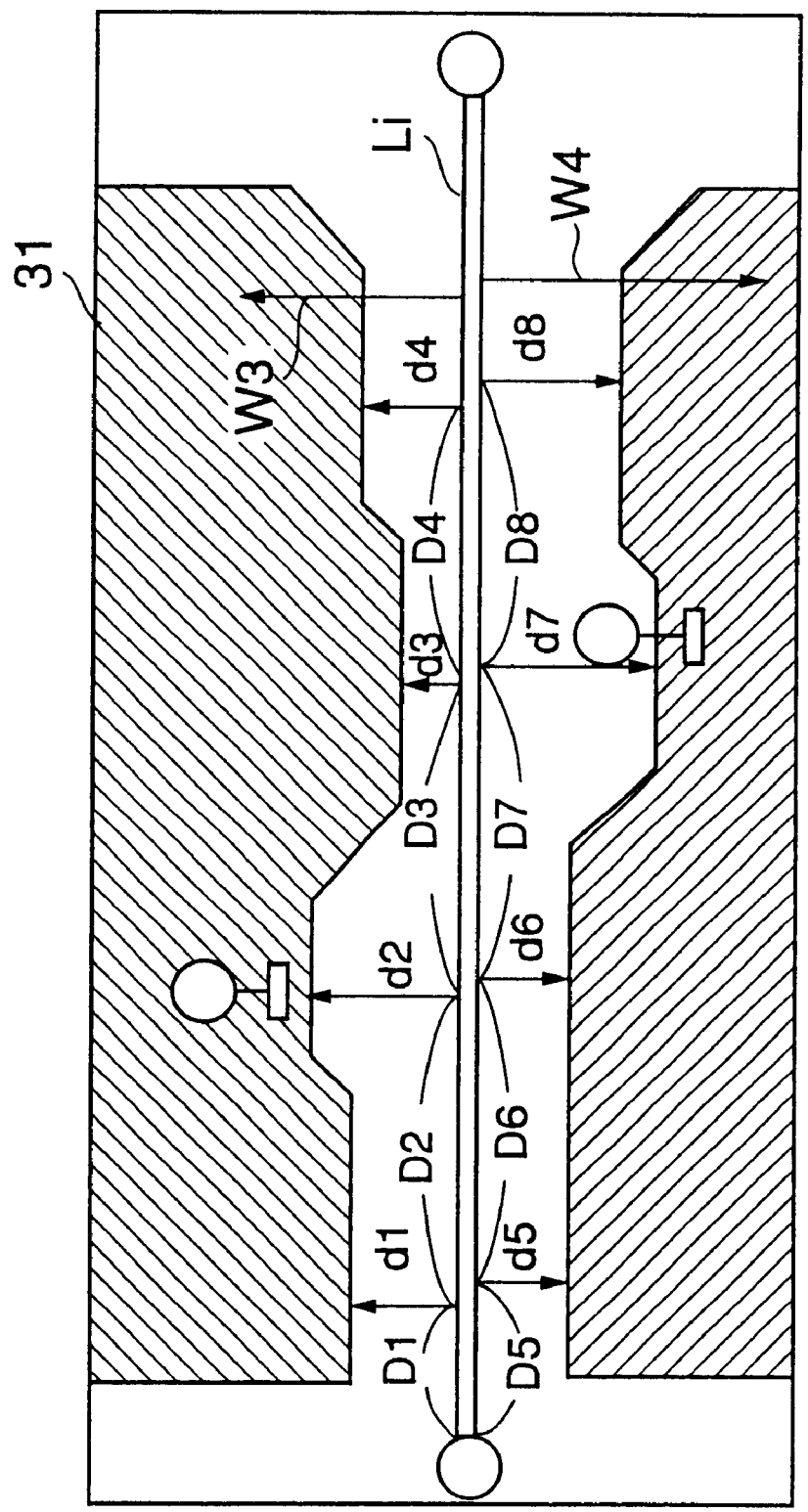
FIG. 6 is an explanatory diagram which illustrates the method used to measure road width.

This simple road polygon 27 roughly expresses the shape of a single road that has a width dimension. Afterward, this simple road polygon 27 is shaped to the accurate shape of the road shown in the city map data by being trimmed (in other words, by having excess portions removed). Accordingly, it is necessary that this simple road polygon 27 have a width dimension that is greater than that of the accurate road shown in the city map data, so that the region of the accurate road is completely encompassed. For this reason, the element polygons 21$i$ of the respective line segments Li are expanded in the abovementioned expansion processing so that these element polygons 21$i$ have a width dimension that is slightly greater than the width dimension of the accurate road shown in the city map data For example, the amount of this expansion can be determined by the method shown in FIG. 6. Specifically, as is shown in FIG. 6, the line segments Li of the respective links of the road network data are superimposed on city map data 31. Then, perpendicular lines are extended on both sides from a plurality of ground points of the line segments Li as indicated by the arrows, and the lengths d1, d2, . . . to the points where these perpendicular lines first cross line segments on the city map are measured. The lengths d1, d2 . . . of these perpendicular lines are viewed as values that represent the width to the edge lines on both sides from the center line of the road in question in road sections located in the vicinities of the respective ground points. Accordingly, for each side of the road, a weighted average is calculated by weighting the lengths d1, d2 . . . of the perpendicular lines with the distances of the road sections represented by the respective ground points, and these values are viewed as the widths from the center line on the respective sides of the road in question. To show the simplest example of calculation, the road width W1 on the upper side of the figure in the case of the example shown in FIG. 6 is determined as follows:

$$W1=(d1*D1+d2*D2+d3*D3+d4*D4)\div(D1+D2+D3+D4)$$

The road width W2 on the lower side is determined as follows:

$$W2=(d5*D5+d6*D6+d7*D7+d8*D8)\div(D5+D6+D7+D8)$$

Element polygons that completely encompass the road in question on the city map can be prepared by expanding the line segments Li in the upward and downward directions by distances W3 and W4 that are greater by an appropriate amount than the road widths W1 and W2 thus determined. Furthermore, as was described above, element polygons that are expanded to a greater extent than the line segments Li are created ad the final points, starting points and nodes of the line segments Li; the reason for this is to ensure that the turning angles and intersections within these element polygons (these usually have a width that is greater than the width of straight portions of the road) are securely encompassed.

Figure 7:
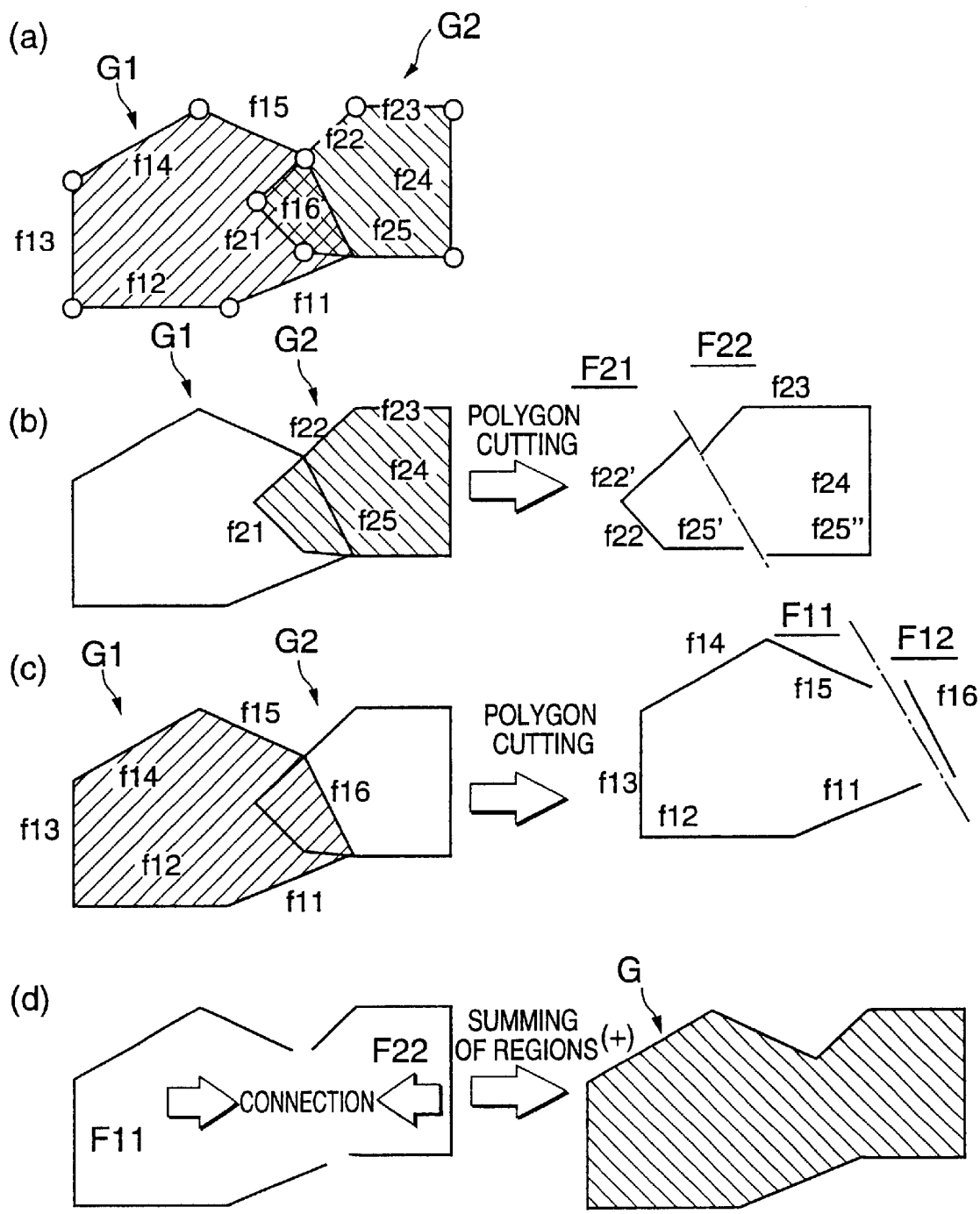
FIG. 7 is an explanatory diagram which illustrates the procedure used to calculate the sum of regions of element polygons.

Furthermore, the calculation of the sum of regions that is used to convert the plurality of element polygons 251, 211, 252, 212 . . . shown in FIG. 5(d) into the simple road polygon 27 of a single link shown in FIG. 5(e) can be accomplished by the method shown in FIG. 7. For example, as is shown in FIG. 7(a), a certain element polygon G1 consists of polygon line segments (f11, f12, . . . f16) that are formed into a closed loop; furthermore, another element polygon G2 consists of polygon line segments (f21, f22, . . . f25) that are formed into a closed loop, and the element polygons G1 and G2 are partially superimposed. First, as is shown in FIG. 7(b), the second element polygon G2 is cut by a line segment of the first element polygon G1. As a result, the line segment f22 of the second element polygon G2 is cut, so that new line segments f22' and f22" are generated. Similarly, the line segment f25 is also cut, so that new line segments f25' and f25" are generated. When these newly generated line segments and the uncut line segments are divided into groups according to the connection relationship, the line segments are divided into a plurality of groups. In the example shown in FIG. 7, the line segments are divided into two line segment groups, i.e., a first group F21 (=f25'+f21+f22') and a second group F22 (=f22"+f23+f24+f25"). Next, as is shown in FIG. 7(c), the first element polygon G1 is cut by a line segment of the second element polygon G2. When the line segments are then divided into groups according to the connection relationship in the same manner as described above, the line segments are divided into a first line segment group F1 (=f11+f12+f13+f14+f15) and a second line segment group F12 (=f16) in the example shown in FIG. 7.

Next, an inside-outside judgment is made for the line segment groups F11 and F12 generated from the first polygon G1 in order to ascertain whether or not these line segment groups are contained within the region of the second polygon G2. The procedure used for this inside-outside judgement is itself universally known. As a result, it is ascertained that the first line segment group F11 is present in the region outside the second polygon G2, and this group is left in order to form the peripheral line segments of a new polygon. On the other hand, it is ascertained that the second line segment group F12 is present in the inside region of the polygon G2, and this line segment group is discarded. Similarly, an inside-outside judgement with respect to the polygon G1 is performed for the line segment groups F21 and F22 generated from the second polygon G2. As a result, since the first line segment group F21 is present in the inside region of the polygon G1, this line segment group is discarded; on the other hand, since the second line segment group F22 is present in the region outside the polygon G1, this line segment group is left as the peripheral line segments of a new polygon.

Finally, as is shown in FIG. 7(d), the remaining peripheral line segment groups F11 and F22 are connected. Furthermore, in FIG. 7, the starting and final points of F11 and the starting and final points of F22 are drawn in separate places; in actuality, however, the points are located at the same coordinates, so that F11 and F22 can be connected to each other. As a result of the remaining peripheral line segment groups thus being connected, a new polygon G is completed. By applying such region sum processing between all of the adjacent element polygons that make up the single link shown in FIG. 5(d), the single simple road polygon 27 shown in FIG. 5(e) is obtained.

Figure 8:
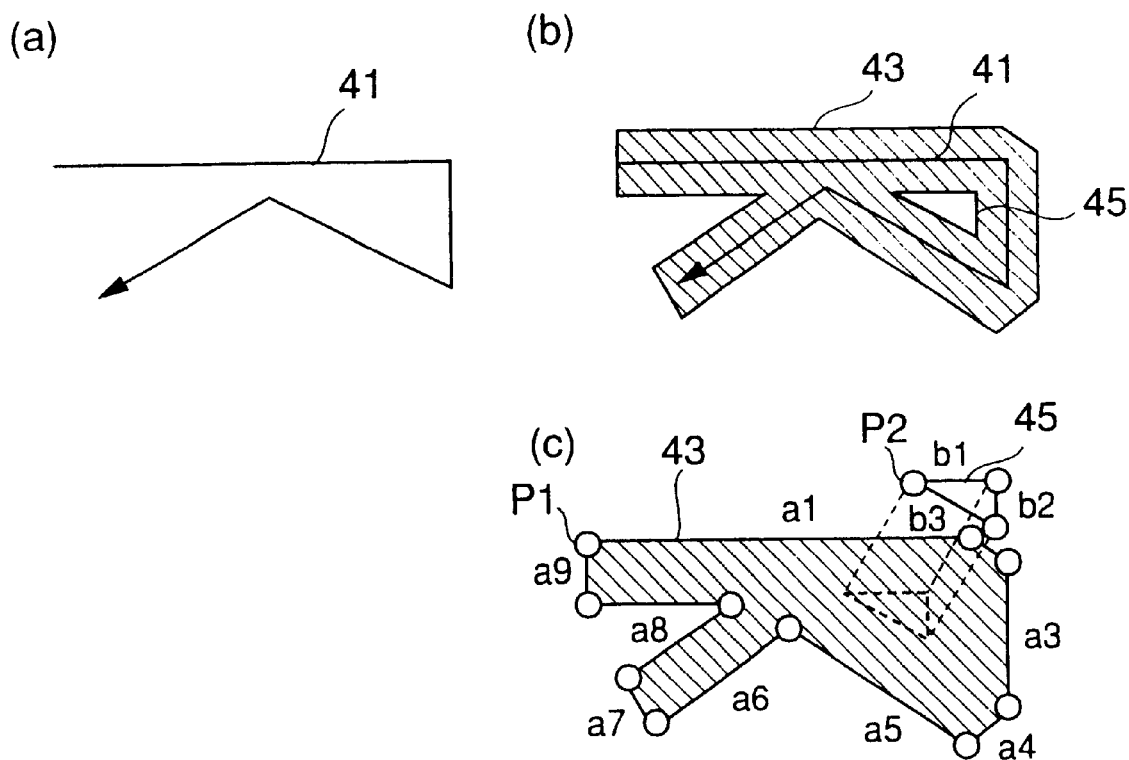
FIG. 8 is an explanatory diagram which illustrates external polygons and cut-out polygons.

In the case of roads that show a closed-loop shape on maps, such as (for example) spiral on-ramps leading to high-speed roadways, the simple road polygon has a cut-out area within the region of the polygon. In such cases, it is necessary to distinguish between external polygons that define the external shape of the simple road polygon, and cut-out polygons that define the cut-out area, in the process of preparing the simple road polygon. FIG. 8 shows the method used to distinguish external polygons and cut-out polygons in such cases. For example, when the processing shown in FIGS. 5 and 7 as performed beginning with a road link 41 which has the shape shown in FIG. 8(a), a plurality of independent (i.e., not mutually connected) simple road polygons 43 and 45 are generated as shown in FIG. 8(b) in the stage when the connection of peripheral line segment groups shown in FIG. 7(d) is completed. Furthermore, in order to simplify the description, an example in which two simple road polygons are generated is shown in FIG. 8; depending on the road shape, however, three or more independent polygons may be generated.

In this example, as is shown in FIG. 8(c), a simple road polygon 43 consisting of a first line segment group A (a1, . . . a9), and a simple road polygon 45 consisting of a second line segment group B (b1, . . . b3), are generated. Of these independent simple road polygon 43 and 45, one of the simple road polygons is the external polygon of the road in question, while the other is the cut-out polygon. Accordingly, processing is performed in order to determine which of these simple road polygons 43 and 45 is the external polygon. Specifically, one representative point on a line segment is first selected for each of the abovementioned simple road polygons 43 and 45. Next, for each representative point, an inside-outside judgement is performed between this representative point and all of the other polygons. As a result, the single polygon in which the representative point in question is present outside the regions of all of the other polygons is determined to be the external polygon of the road in question, and all of the other polygons are determined to be cut-out polygons. For example, in FIG. 8, assuming that the representative point of the polygon 43 is a1 and the representative point of the polygon 45 is b1, the representative point b1 of the polygon 45 is present inside the other polygon 43, and the representative point a1 of the polygon 43 is present outside all of the other polygons 45. Accordingly, the polygon 43 is the external polygon, and the polygon 45 is a cut-out polygon. Such a distinction between external polygons and cut-out polygons is made each time that the sum of the regions of pairs of element polygons is calculated using the method shown in FIG. 7. Furthermore, in this procedure, the calculation of the sums of regions of adjacent element polygons is repeated from the starting point node to the final point node of one road, so that a simple road polygon that encompasses the road in question (as shown in FIG. 5(*e*)) is completed. This is performed for all of the link data of the road network data, and the results are stored in the simple road polygon data base 4.

Next, the scissors data preparation processing 6 will be described.

As was described above, scissors data defines cutting lines used to shape simple road polygons (which are prepared so that these shapes are slightly larger than actual road shapes) into accurate road shapes by trimming these simple road polygons. Accordingly, scissors data, i.e., cutting lines, ideally run along the accurate external shapes of the roads, and do not invade the internal regions of the roads. "Scissors" data preparation processing 6 is processing which is used to prepare scissors data that is as close to ideal as possible.

Figure 9:
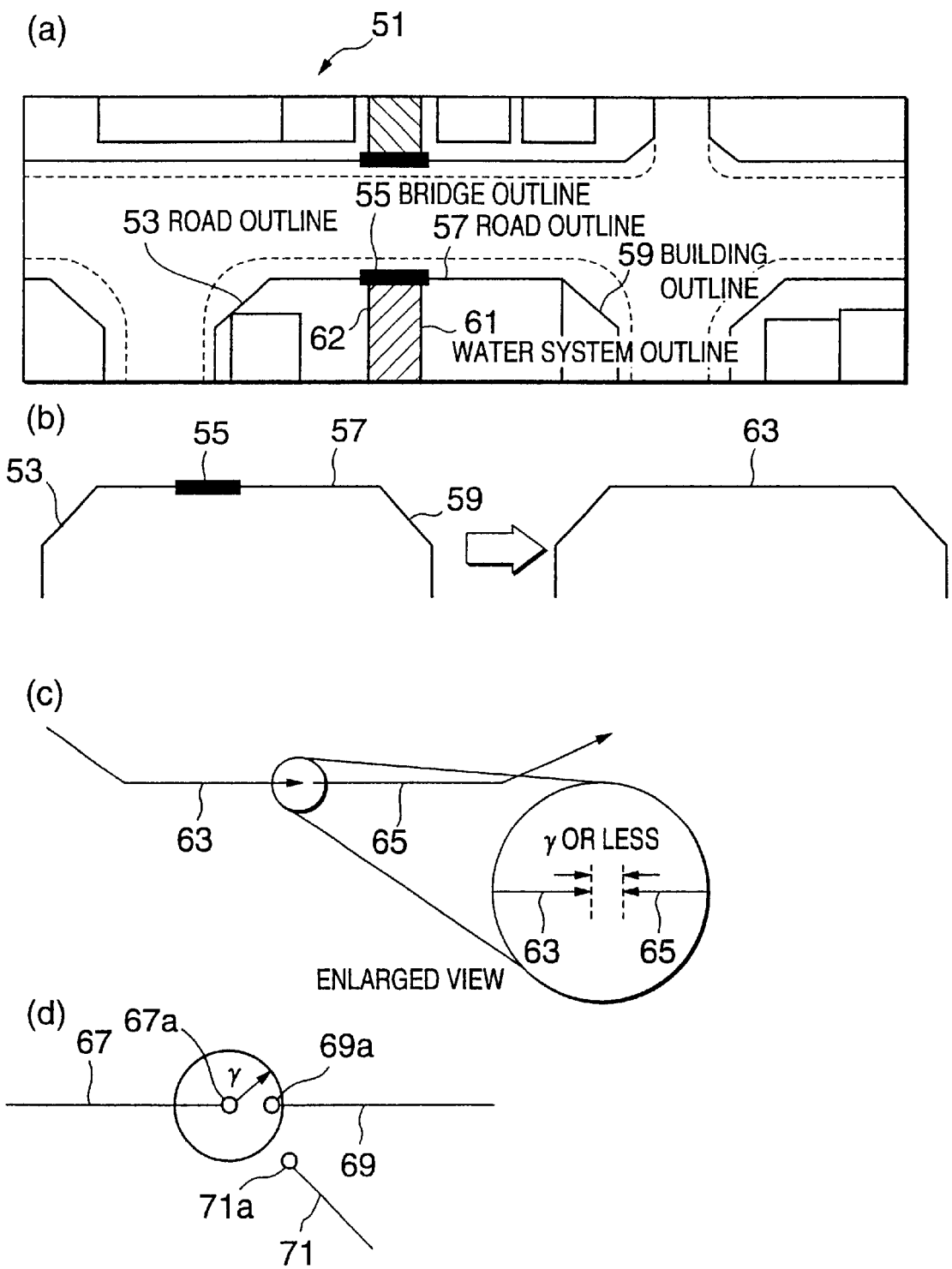
FIG. 9 is an explanatory diagram which illustrates the procedure of scissors data preparation processing.

FIG. 9 illustrates the procedure of scissors data preparation processing 6.

First, as is shown in FIG. 9(*a*), various types of attribute shape lines such as road outlines 53 and 57, building outlines 59, bridge outlines 55 and water system outlines 61 and 62, etc., that are present in the vicinity of the road in question are extracted for each road from city map data 51. In this case, a method in which (for example) city map data is divided into numerous segment by means of an appropriately fine mesh, the object of extraction is limited exclusively to shape lines that are present inside the segments through which respective links of the road network data pass when these links are superimposed on the city map, and the object of extraction is further limited exclusively to shape lines contained in rectangular regions that are defined by the maximum values and minimum values of the xy coordinates of the respective links, can be adopted in order to limit the object of extraction exclusively to shape lines that are located in the vicinity of the respective roads (i.e., in order to exclude shape lines that have no connection with the outline shapes of the respective roads).

Generally, the various attribute shape lines that make up the external lines of roads in city map data 51 consist of independent line segment data that is not mutually connected. In other words, the outlines of roads are not single line segments in the city map data, but are instead made up of collections of numerous scattered independent line segments. Accordingly, connectable line segments 53, 55, 57 and 59 are next selected from the various extracted shape lines, and these line segments are connected to each other so that a single line segment 63 is created as shown in FIG. 9(*b*). Here, the term "connectable line segments" refers to line segments which are such that the coordinates of one end point (final point or starting point) of one line segment and the coordinates of one end point of another line segment coincide completely, and line segments which are such that the distance between one end point of one line segment and one end point of another line segment is within the range of a specified permissible value γ (in short, line segments which are sufficiently close to each other so that these line segments can be viewed as making up a single line segment), as in the case of the line segments 65 and 67 shown in FIG. 9(*c*). Accordingly, in the example shown in FIG. 9(*d*), since the distance between the end points 67*a* and 69*a* of the line segment 67 and line segment 69 is equal to or less than the permissible value γ, the line segment 67 and line segment 69 can be connected. On the other hand, since the distance between the end points 67*a* and 71*a* of the line segment 67 and line segment 71 exceeds the permissible value γ, the line segment 67 and line segment 71 cannot be connected.

As a result of shape lines in the vicinity of the respective roads thus being extracted, and connectable shape lines being selected from these shape lines and connected into single line segments, outline data for the respective roads is contained with fairly good precision in the connected line segment data This processing is performed for the respective roads in the city map data, and the connected line segment data for each road that is obtained as a result is stored in the scissors data base 7 as scissors data for the simple road polygons of the respective roads.

Figure 10:
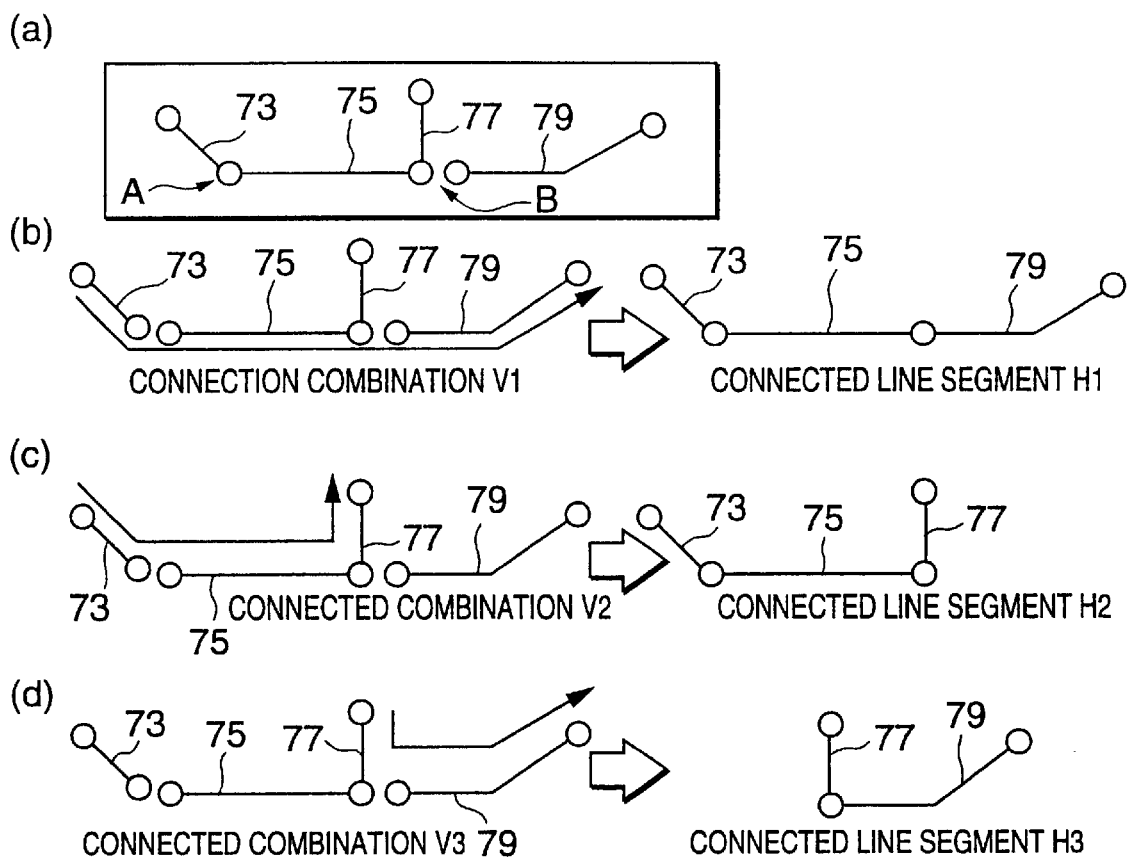
FIG. 10 is an explanatory diagram which illustrates the method used to prepare scissors data in a case where three or more line segments are in close proximity.

When proximate shape lines are connected to each other, such connection is not limited to cases in which the end points of two line segments are located in close proximity to each other; there are often cases in which the end points of three or more line segments are located in close proximity to each other. For example, let it be assumed that line segments 73, 75, 77 and 79 are present in the vicinity of the same road as shown in FIG. 10(*a*). Here, it is further assumed that the end points of two line segments 73 and 75 are in close proximity to each other in one location A, and that the end points of three line segments 75, 77 and 79 are in close proximity to each other in another location B. In this case, at the first proximal location A, the two line segments 73 and 75 are simply connected into a single line segment as described above. On the other hand, at the second proximal location B, the three line segments 75, 77 and 79 cannot be simultaneously connected into a single line segment. Accordingly, as is shown in FIGS. 10(*b*), 10(*c*) and 10(*d*) the end points of the three or more line segments collected at this one location B are handled as a single node, and all combinations of two line segments that can be connected into a single line segment via this node are picked up, and connected for each combination. In the example shown in FIG. 10, three different combinations V1, V2 and V3 exist; accordingly, three connected line segments H1, H2 and H3 are obtained. All of the plurality of connected line segments H1, H2 and H3 thus obtained are stored in the scissors data base 7 as scissors data for the road in question.

Next, the abovementioned road polygon preparation processing 8 will be described.

The road polygon preparation processing 8 is processing which creates road polygons that express the accurate outline shapes of the respective roads by using the scissors data for these roads to trim the simple road polygons for the respective roads. Specifically, simple road polygon data for the respective roads is read in from the simple road polygon data base 4, scissors data for the respective roads is read in from the scissors data base 7, and the respective scissors data for all of the roads is investigated on a road by road basis in order to ascertain whether or not this data passes through the simple road polygon data for the roads. For example, in the example shown in FIG. 11(*a*), five lines of scissors data 91, 93, 95 and 97 pass through the simple road polygon 81. Next, the simple road polygon 81 is cut using the respective scissors data passing through this simple road polygon.

When the simple road polygon is cut by the line segments of the scissors data for each line of scissors data, the simple road polygon is divided into two line segment groups. Of these line segment groups, the line segment group that encompasses the nodes of the road network data (i.e., on the inside of the road) is allowed to remain, while the other line segment group (i.e., on the outside of the road) is discarded. Similarly, the scissors data is also cut by the line segments of the simple road polygon, and of the plurality of line segment groups of semiconductor that result from this division, only the line segment group that is enveloped by the simple road polygon is allowed to remain. Then, a new simple road polygon from which the portions on the outside of the road have been cut away along the scissors data is obtained by connecting the remaining line segment group of the simple road polygon and the remaining line segment group of the scissors data.

Figure 11:
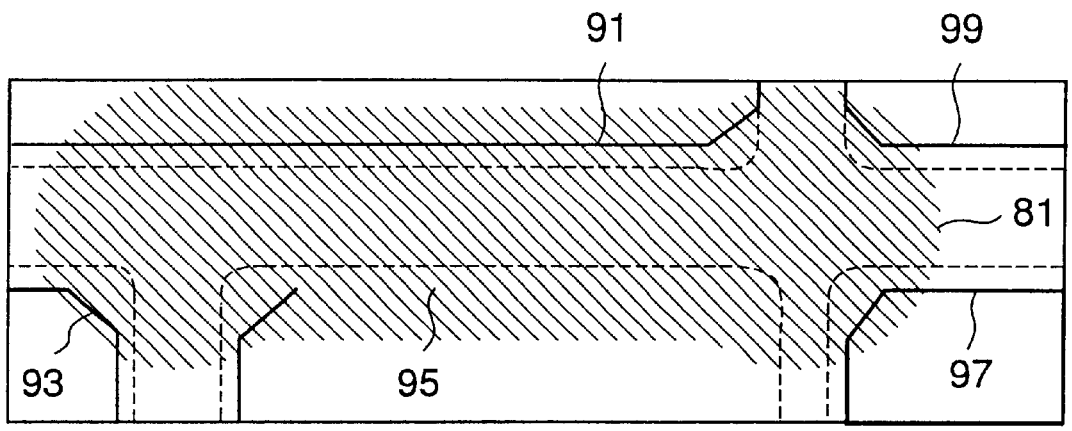
FIG. 11 is an explanatory diagram which illustrates the procedure of road polygon preparation processing.
Figure 11:
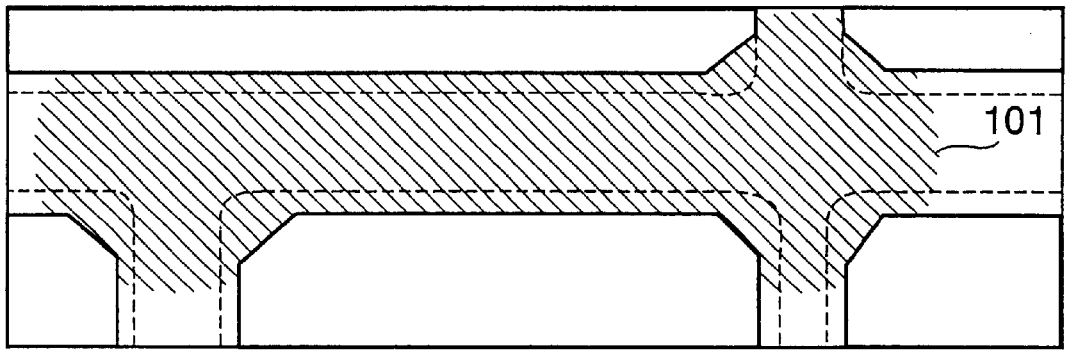

By repeating such trimming by means of scissors data for all of the scissors data that passes through, a road polygon that shows fairly precise agreement with the outline shape of the road is ultimately obtained. For example, when the simple road polygon 81 with a rough shape shown in FIG. 11(*a*) is trimmed by all of the scissors data 91, 93, 95 and 97 that passes through, a road polygon 101 which is precisely shaped to the road shape on the city map is obtained as a result, as is shown in FIG. 11(*b*). Such trimming is performed between all of the simple road polygons and all of the scissors data passing through these shapes, and the road polygon data thus prepared is stored in the road polygon data base 9.

As a result of the abovementioned series of processing operations, road polygons that show precise agreement with the shapes of roads expressed on city maps can be automatically prepared. In terms of characteristics, this data shows good compatibility with road network data, and the link relationships with large-area maps, etc., prepared from road network data are also clear. Furthermore, road connection information held in road network data can also be associated with the road polygons and thus retained.

Figure 12:
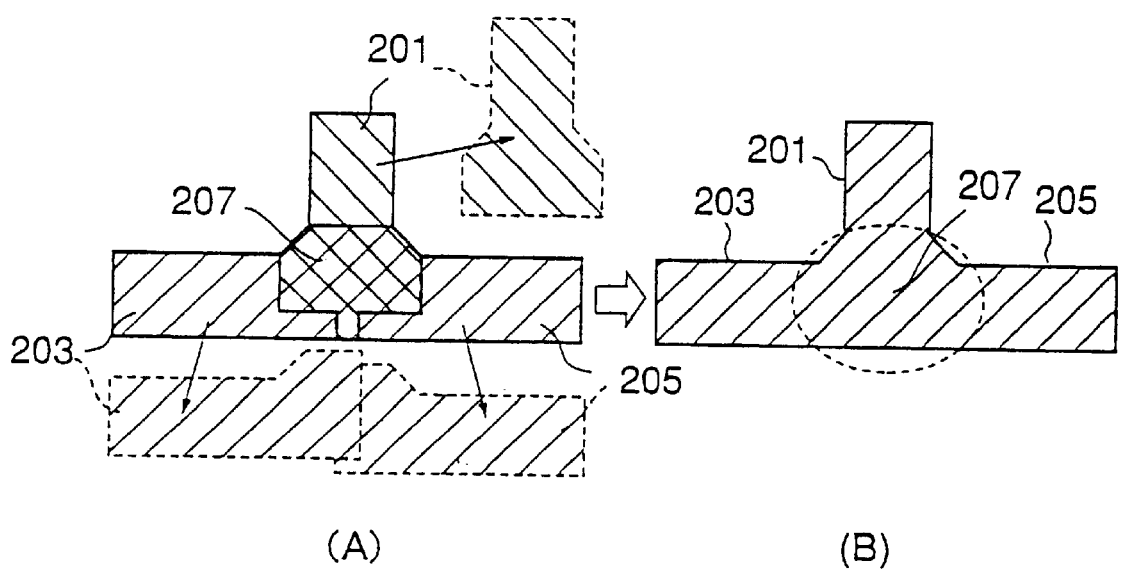
FIG. 12 is a diagram which illustrates the expression of intersections by means of road polygons.

In the case of road map data using the abovementioned road polygons, the regions of respective roads extending from each intersection to the next intersection are expressed by a single polygon each. An example of the construction of such road map data is shown in FIG. 12(A), and a road image displayed on a screen on the basis of this road map data is shown in FIG. 12(B). As is shown in FIG. 12(A), this road map data is constructed from a plurality of road polygons 201, 203 and 205. Here, the regions of the intersections are not distinguished from the road polygons 201, 203 and 205, but are instead included in the road polygons 201, 203 and 205. In the displayed road image, as is shown in FIG. 12(B), the region 207 where the plurality of road polygons 201, 203 and 205 overlap each other is visually recognized as an intersection by a human observer. However, the computer application that utilizes the abovementioned road map data cannot accurately distinguish or indicate intersection regions and road regions in the road map data.

There is a demand for the utilization of road map data in applications that are more advanced than conventional applications. For example, in the case of route guidance to destinations in car navigation systems, the route has conventionally been displayed by simple zigzag lines in which intersections are connected by straight lines. However, a method in which the regions of the roads and intersections themselves that make up the route are displayed with greater emphasis allows easier viewing by the user. In cases where the latter type of route display is performed, it is desirable that intersections be expressed as independent polygons that are accurately distinguished from the road polygons in the road map data based on polygons, in order to increase the visibility of the intersection areas on the route. If the intersections are included in the road polygons as shown in FIG. 12(A), then in cases where (for example) a route that turns from the road polygon 201 to the road polygon 203 is displayed, the region 207 where these two road polygons 201 and 203 overlap will have an unnatural shape as an intersection, so that the visibility of this intersection is poor.

Furthermore, route search processing which determines the route from starting point to destination is performed on the basis of conventional road network data on (for example) a scale of 1/25,000 (intersections are expressed by nodes (coordinate points), and roads are expressed by directional vectors that connect these nodes). Consequently, in order to display a route using the abovementioned polygons, it is necessary that the intersection polygons and road polygons in the road map data have a data association with the intersection nodes and road vectors in the road network data.

Figure 13:
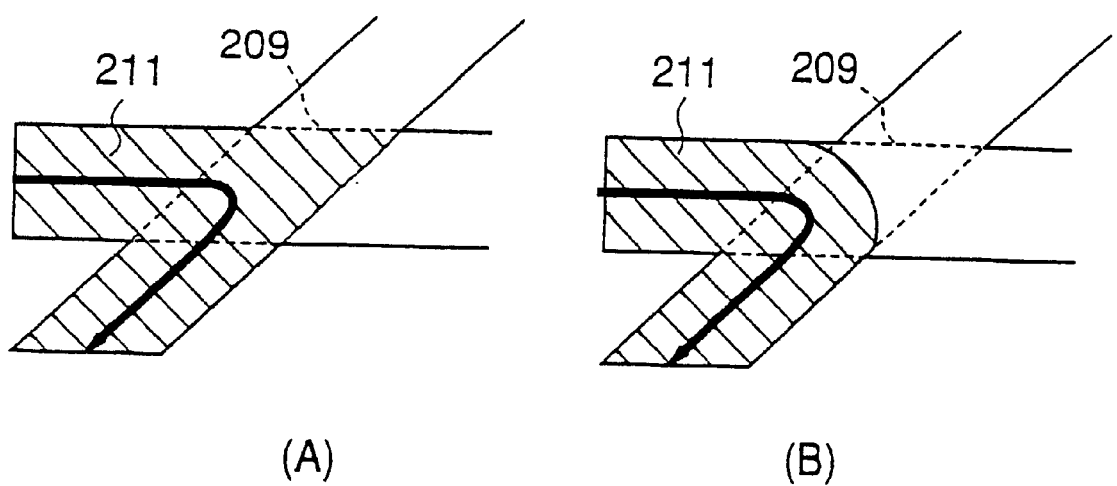
FIG. 13 is a diagram which illustrates an example of route guidance using road polygons and intersection polygons.

Furthermore, in regard to the display of intersection areas in guide routes, a display in which only the operating lanes within the intersection 209 are expressed as a guide route 213 as shown in FIG. 13(B) is easier to comprehend than a display in which the entire region of the intersection 209 is displayed as a guide route 211 as shown in FIG. 13(A). However, in cases where the only data used is intersection polygon data in which the entire region of an intersection is defined as one polygon, an easy-to-comprehend route display of the type shown in FIG. 13(B) cannot be displayed.

In order to solve these problems, it is desirable to prepare road map data in which not only roads but also intersections are expressed by respective independent polygons.

Figure 14:
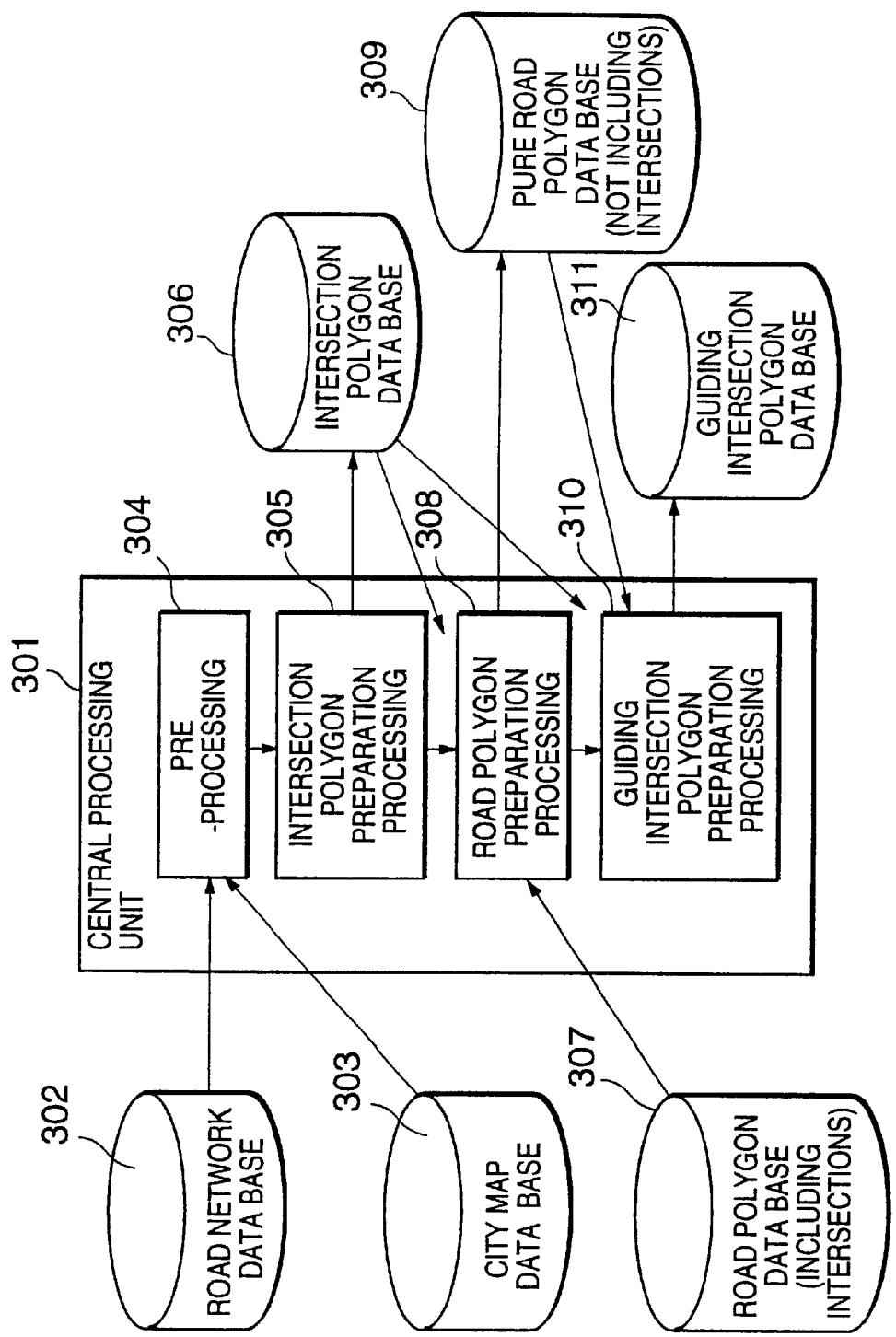
FIG. 14 is a block diagram showing the schematic construction of a road polygon preparation device constituting another embodiment of the present invention.

FIG. 14 shows the system construction of a device constituting one embodiment of the present invention which is used to prepare road map data in which roads and intersections are expressed by respective polygons.

This road map data preparation device is typically a programmed general-use computer. The central processing unit 301 of this computer performs pre-processing 304, intersection polygon preparation processing 305, road polygon correction processing 308 and guiding intersection polygon preparation processing 310 in accordance with programs. A road network data base 302 which stores road network data in which intersections and roads are expressed as nodes and links, a city map data base 303 which stores city map data based on line segments in which building outlines and sidewalk shapes, etc., are drawn in detail, and a road polygon data base 307 which stores road polygon data (including intersection regions as shown for example in FIG. 12) prepared (for example) by the method already described with reference to FIGS. 4 through 11 on the basis of road network data and city map data, are accommodated in the memory of this computer as raw-material data.

The central processing unit 301 first performs pre-processing 304. This pre-processing 304 accesses the road network data and city map data in the memory, establishes agreement between the map space coordinates of the road network data and the map space coordinates of the city map data, and respectively divides the road network data and city map data into numerous cells (numerous rectangular regions of a uniform small size) so that the respective types of map data can be controlled in cell units.

Next, the central processing unit 301 performs intersection polygon preparation processing 305. This processing 305 prepares intersection polygon data on the basis of the road network data and city map data obtained following pre-processing 304, and stores the intersection polygon data thus prepared in an intersection polygon data base 306.

Next, the central processing unit 301 performs road polygon correction processing 308. This processing 30 corrects the road polygon data (including intersection regions) read out from the road polygon data base 307 using intersection polygon data from the intersection polygon data base 306, thus preparing road polygon data that does not include intersection regions (hereafter referred to as "pure road polygon data"); the pure road polygon data thus prepared is then stored in a pure road polygon data base 309.

Nest, the central processing unit 301 performs guiding intersection polygon preparation processing 310. On the basis of intersection polygon data from the intersection polygon data base 306 and pure road polygon data from the pure road polygon data base 309, this processing 310 prepares guiding intersection polygon data in which two sets of road polygon data that are connected to the same intersection are smoothly linked as shown in FIG. 13(B). The guiding intersection polygon data thus prepared is then stored by this processing 310 in a guiding intersection polygon data base 311.

The pre-processing 304, intersection polygon preparation processing 305, road polygon correction processing 308 and guiding intersection polygon preparation processing 310 will be described in detail below. First, the pre-processing 304 will be described with reference to FIGS. 15 through 17.

Figure 15:
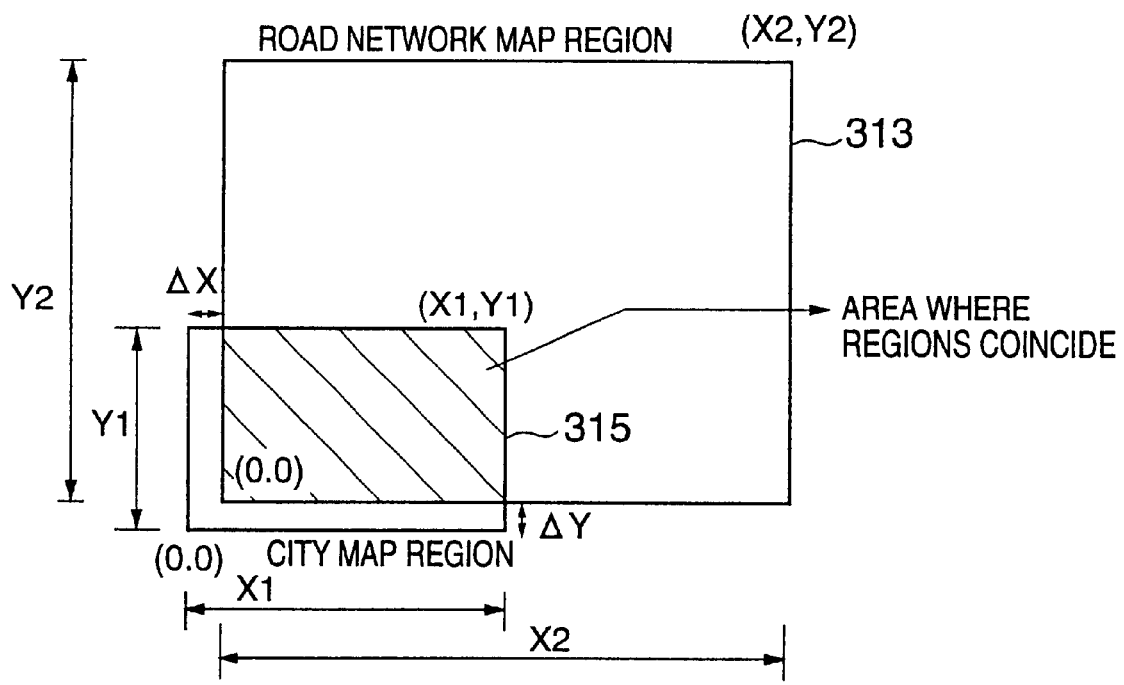
FIG. 15 is a diagram which illustrates non-agreement in the coordinate space of a city map and road network map.

In the pre-processing 304, road network data from the data base 302 and city map data from the data base 303 are accessed in the memory of the central processing unit 301. Generally, however, as is shown in FIG. 15, the map region 313 expressed by the road network data and the map region 315 expressed by the city map data show disagreement in the coordinate space (e.g., in the latitude and longitude of the coordinate origin at the lower left end). Accordingly, the coordinate spaces of these two map regions 313 and 315 are caused to coincide as follows: specifically, the positional discrepancy between the two coordinate spaces ($\Delta x, \Delta y$) is calculated as follows.

$\Delta x$=longitude of origin of road network map region—longitude of origin of city map region $\Delta y$=latitude of origin of road network map region—latitude of origin of city map region Then, the original city map coordinates (x1, y1) and road network coordinates (x1, y2) are converted as follows into city map coordinates (x'1, y'1) and road network coordinates (x'1, y'2) in a common coordinate space.

$(x'1, y'1)=(F1x(x1), F1y(x1))$ $(x'1, y'2)=(F2x(x1), F2y(x1))$

Here, the conversion functions Fix( ) and Fiy( ) are linear conversion functions that use ($\Delta x, \Delta y$) and the maximum coordinates (Xi, Yi) at the upper right ends of the respective map regions 313 and 315.

Figure 16:
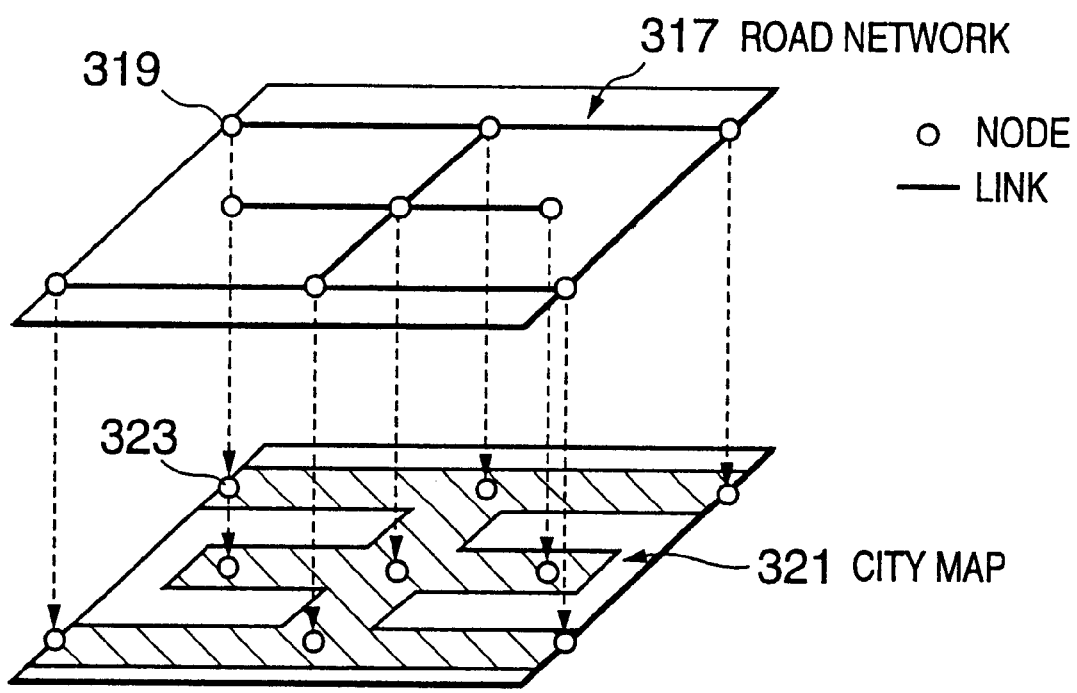
FIG. 16 is a diagram showing road network data projected onto city map data.
Figure 17:
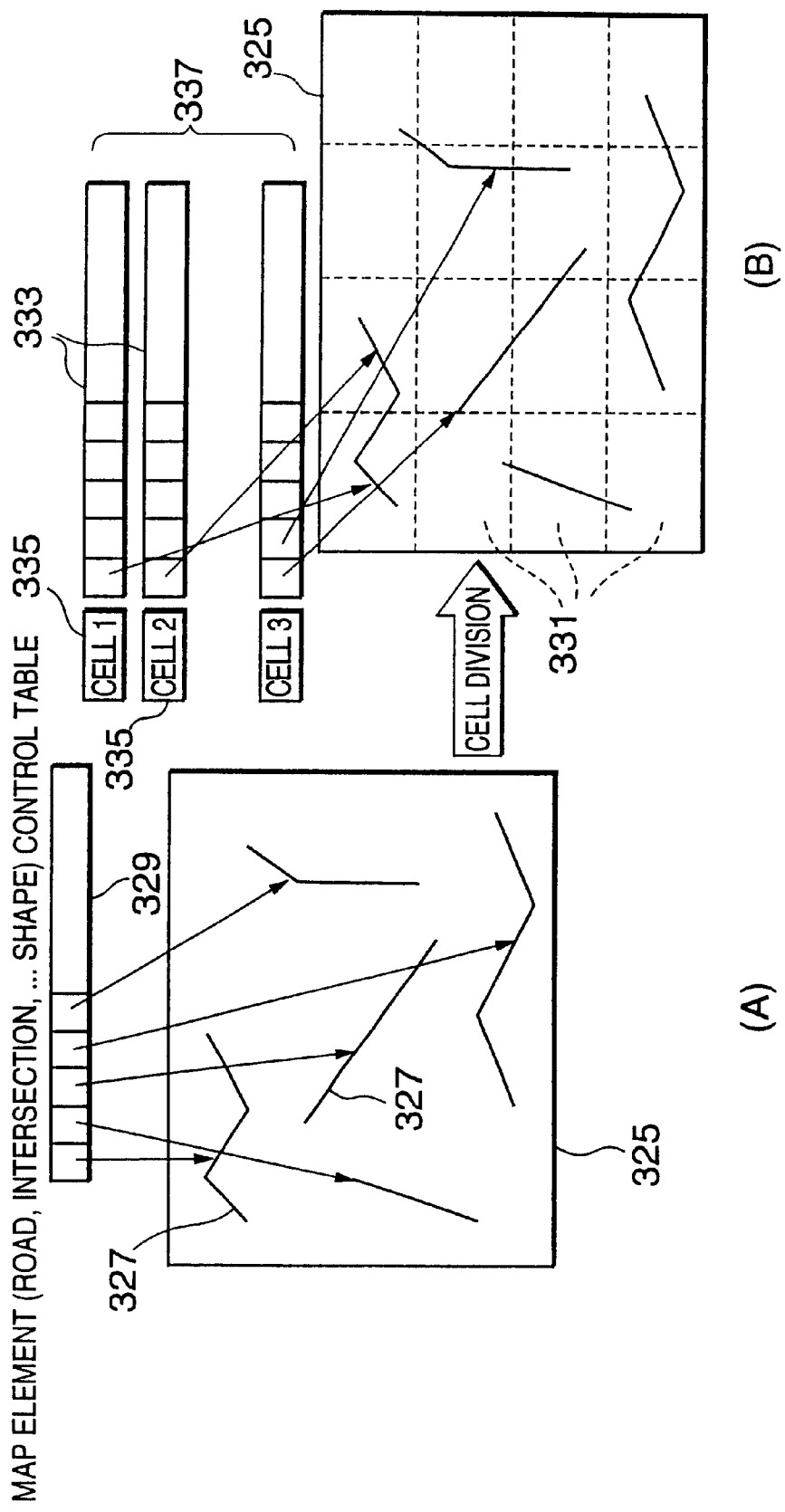
FIG. 17 is a diagram which illustrates cell division;]
Figure 18:
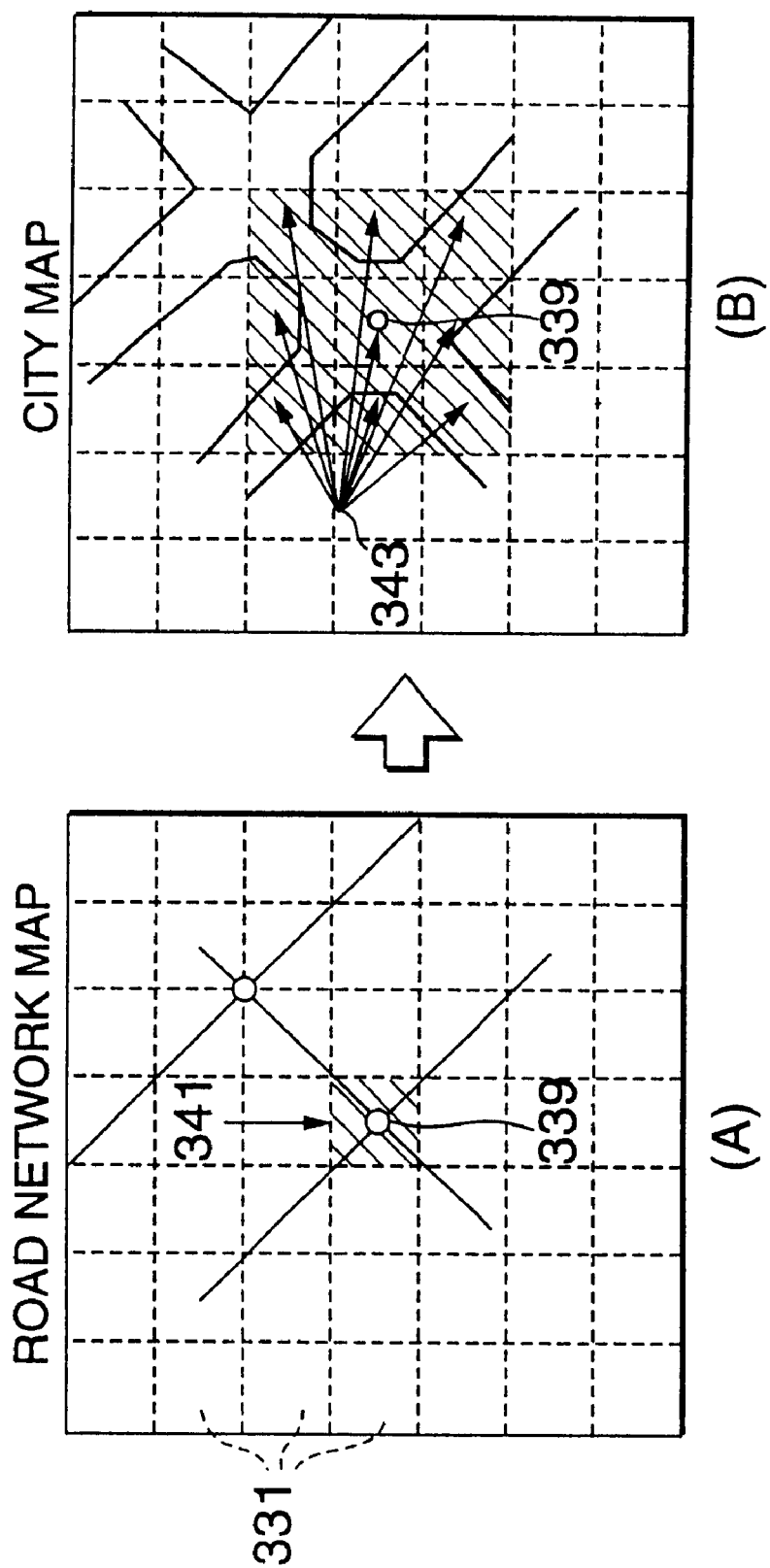
FIG. 18 is a diagram which illustrates an object cell.

As a result of such a coordinate conversion being performed on the road network data and city map data, the coordinate spaces of both sets of data are caused to coincide. As a result, the respective nodes 319 of the road network data 317 can be projected onto the corresponding positions 323 of the city map data 321 (this projection is performed in subsequent intersection polygon preparation processing 305) as shown in FIG. 16.

Next, in the pre-processing 304, the city map data and road network data accessed in the memory are respectively divided into numerous cells (small rectangular regions) and controlled in cell units in order to reduce the amount of geometrical calculation required in the subsequent intersection polygon preparation processing 305. Specifically, as is shown in FIG. 17(A), the respective sets of road map data have a map element control table 329 in which pointers to all of the map elements 327 present inside the entire map region 325 covered by the data are registered. In the pre-processing 304, as is shown in FIG. 17(B), the entire map region 325 for the respective sets of map data is divided into numerous cells 331 of a uniform size. Then, aggregates of pointers to map element in the map element control table 329 are classified into aggregates of pointer to map elements present inside the respective cells 331, and indices 335 for the respective cells are assigned to the pointer aggregates 333 on a cell by cell basis. As a result, only the map elements present inside the respective cells are designated from the respective cells. In cases where one map element straddles a plurality of cells, the system is arranged so that this map element can be designated from the plurality of cells. The table 337 thus prepared, in which map elements are controlled on a cell by cell basis, will be referred to below as an "index table". Such an index table 337 is prepared for each set of road network data and city map data As the cell size is reduce, the quantity of object data handled by the computer can be limited to a smaller quantity; however, the number of cells that must be controlled is increased. Accordingly, the optimal value of the cell size is determined on a case by case basis.

Next, the intersection polygon preparation processing 305 will be described with reference to FIGS. 18 through 25.

In the intersection polygon preparation processing 305, all of the node data contained in the road network data is first extracted in order. Then, with attention directed toward the individual nodes that have been extracted, the cell 341 to which the node of interest 339 belongs is determined using the index table 337 prepared by the pre-processing 304, as is shown in FIG. 18(A). Then, as is shown in FIG. 18(B), the cell of the city map which has the same cell number as the cell 341 to which the node of interest 339 belongs, and all of the cells adjacent to this cell, are selected as the object region 343.

Figure 19:
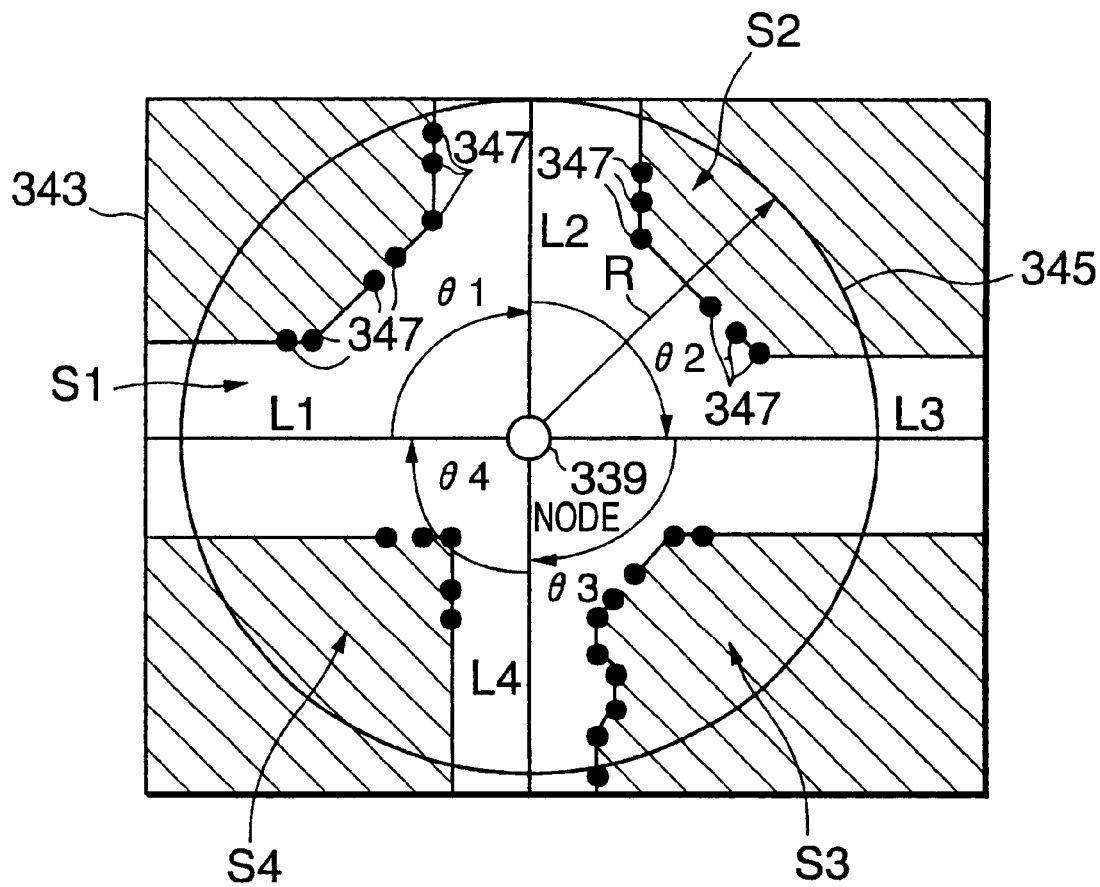
FIG. 19 is a diagram which illustrates the search for shape element points in a state in which a road network map and a city map are superimposed.

Once the object region 343 for the node of interest has thus been limited, the node of interest 339 on the road network map and the links L1 through L4 that are connected to this node of interest 339 are superimposed on map elements such as building outlines, road outlines and sidewalk boundaries, etc., in the object region 343 of the city map as shown in FIG. 19. Then, a search is made for the shape element points 347 of the map elements on the city map from a circular region (search range) 345 with a specified radius of R centered on the center of gravity of the node. Here, the term "center of gravity of the node" refers to the node of interest 339 itself, or the center of gravity calculated from all of the shape element points present within a specified distance range from the node of interest 339 (this is advantageous in cases where the node of interest 339 is considerably shifted from the actual center of the intersection). In the example shown in FIG. 19, the node of interest 339 is set as the center of gravity of the node in order to make this node easier to comprehend. Furthermore, the term "shape element point" refers to end points and corner points of the map elements (zigzag line segments) on the city map based on line segments.

In cases where a search is made for shape element points 347 from the search range 345, the angles $\theta 1$ through $\theta 4$ between the links L1 through L4 that are connected to the node of interest 339 are first determined (in other words, the search region 345 is divided by links L1 to L4 into a plurality of sectors S1 through S4). Here, $\theta 1$ is the angle between L1 and L2, $\theta 2$ is the angle between L2 and L3, $\theta 3$ is the angle between L3 and L4, and $\theta 4$ is the angle between L4 and L1. Furthermore, a search is made for shape element points 347 in each range of the respective angles $\theta i$ (i=1, 2, 3, 4) (i.e., in each sector Si).

Figure 20:
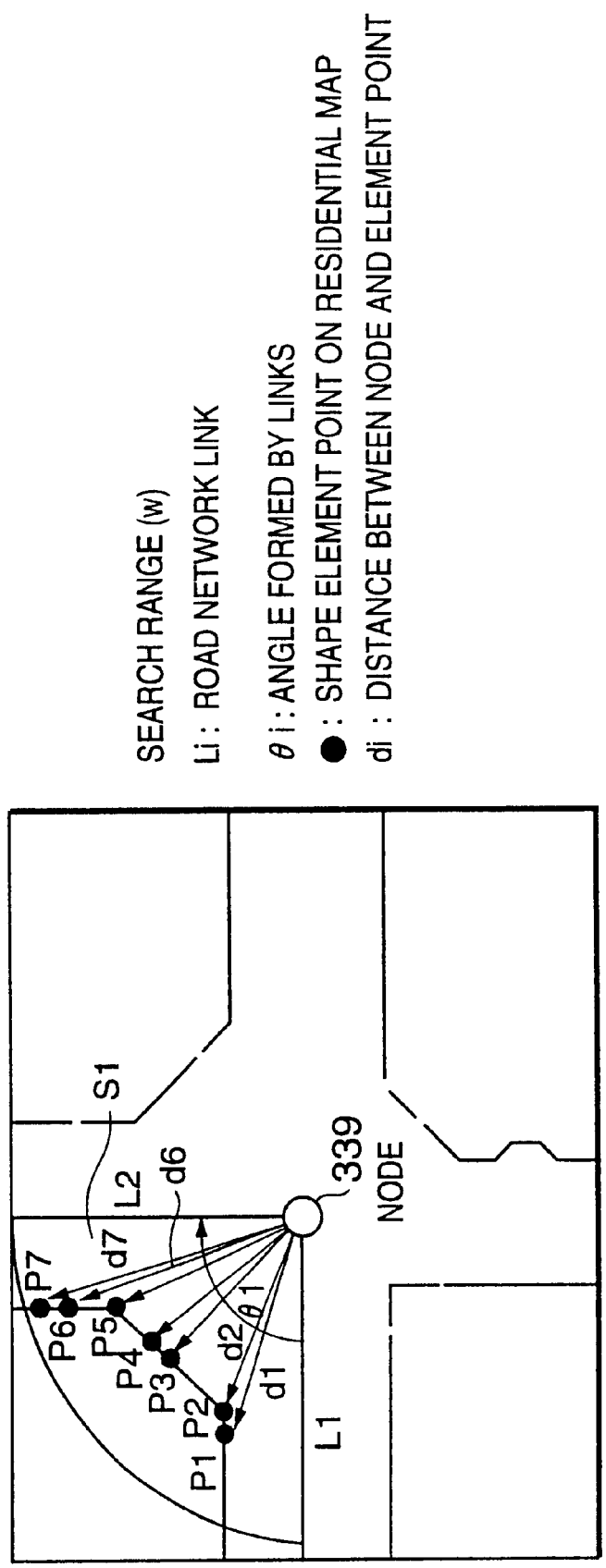
FIG. 20 is a diagram which illustrates a search in sector S1 of θ1.
Figure 21:
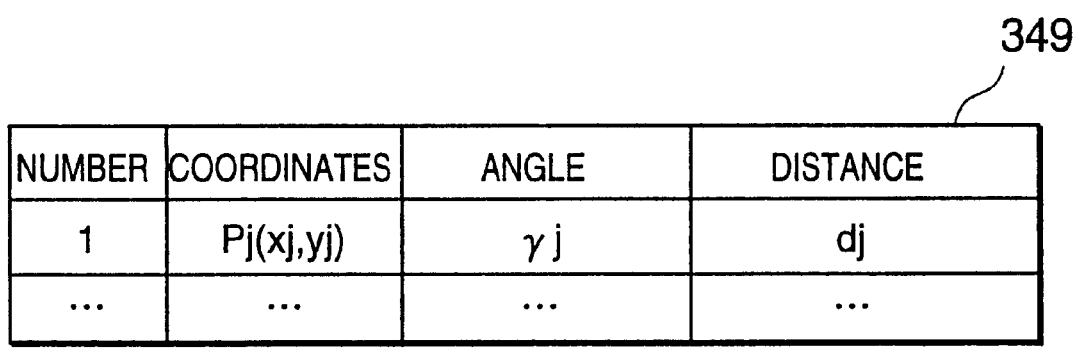
FIG. 21 is a diagram which illustrates a table that is used to find element points that have a minimum distance within sector S1.
Figure 22:
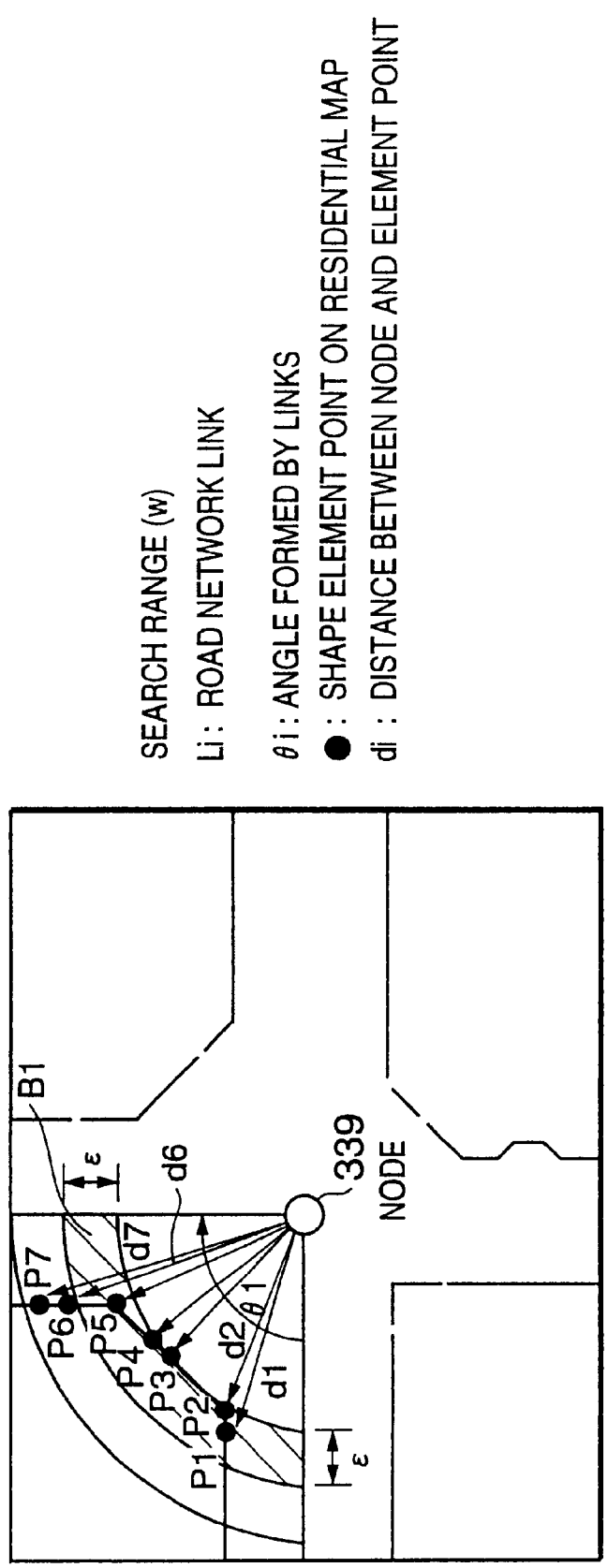
FIG. 22 is a diagram which illustrates element points that make up an intersection polygon.

FIG. 20 shows an example of the search results in the range of the initial angle $\theta 1$ (i.e., the initial sector S1). For each of the shape element points P1, P2, P3 . . . found as a result of a search of this sector S1, the distance d1, d2, d3 . . . from the node center of gravity 339 is calculated, and these results are accumulated in a search result table 349 as shown in FIG. 21. When these distance calculations have been completed for all of the shape element points within the sector S1, the search result table 349 shown in FIG. 21 is sorted in ascending order of distance, and the shape element point Pj which has the shortest distance within the sector S1 is found. For example, in FIG. 20, it is assumed that the distance d3 of the shape element point P3 is the shortest distance. Next, as is shown in FIG. 22, a circular-arc-form belt range B1 which extends from the shortest distance d3 to a distance d3+εproduced by adding a specified permissible width ε to the shortest distance d3 is set, and the shape element points P1 through P5 that are present within this belt range B1 are extracted as shape element points that make up an intersection polygon. Then, as is shown in FIG. 23, the extracted shape element points P1 through P5 are registered in an intersection polygon element table 351. In this case, the respective angles γ1 through γ5 of the shape element points P1 through P5 (i.e. the angles of the respective shape element points measured in (for example) the clockwise direction with the node center of gravity 339 as the center of rotation and (for example) the direction of the x axis taken as an angle of 0) are also registered in the intersection polygon element table 351.

Figure 24:
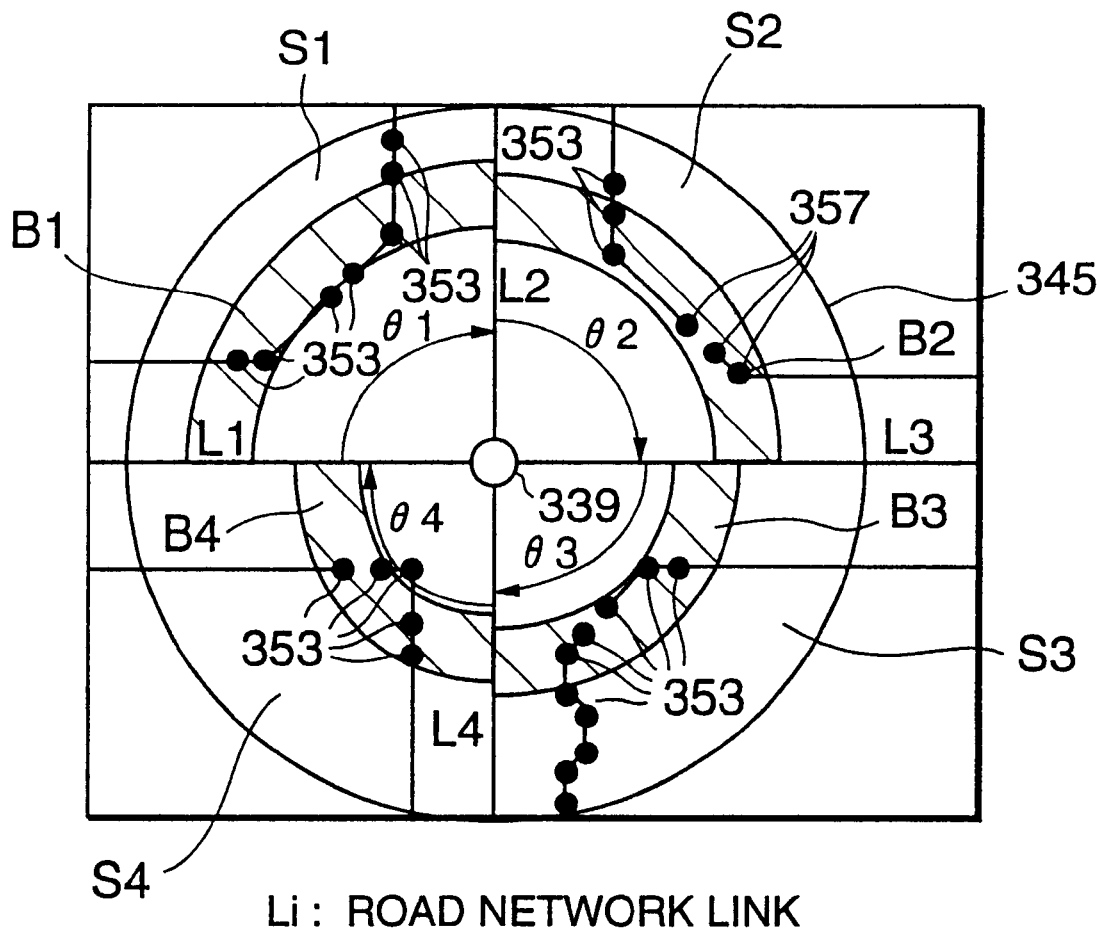
FIG. 24 is a diagram which shows the results of a search for element points that make up an intersection polygon from all sectors.
Figure 25:
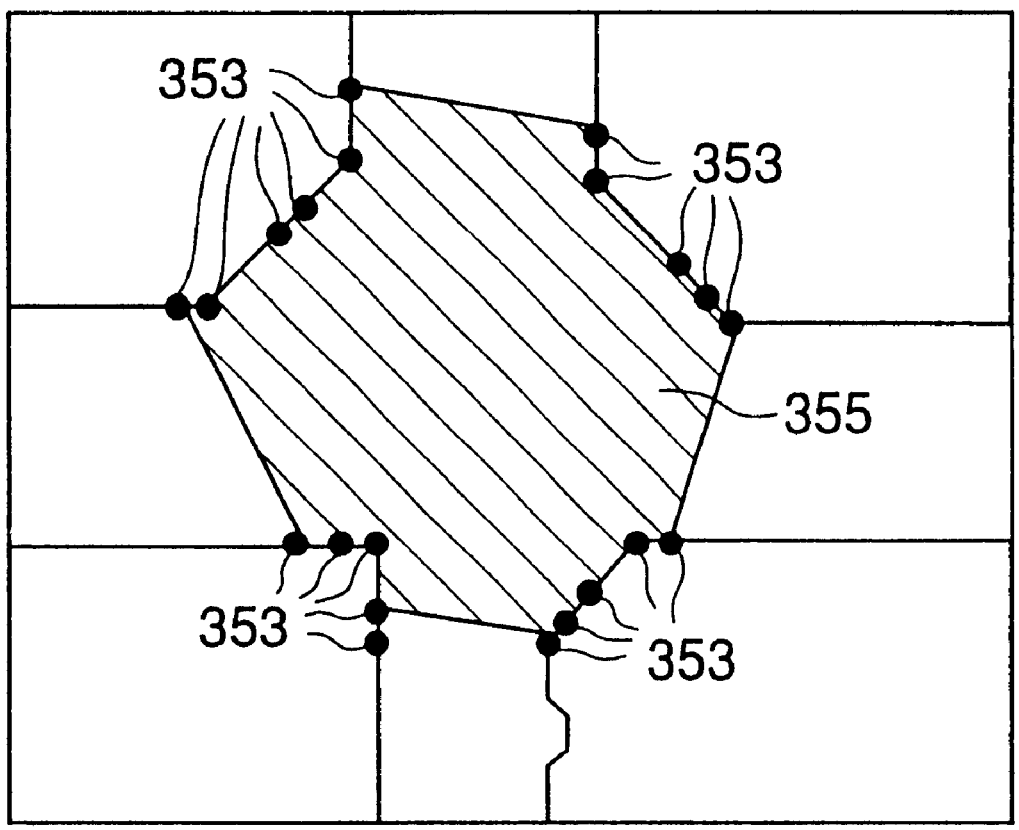
FIG. 25 is a diagram which shows the completion of an intersection polygon.

The abovementioned processing is similarly repeated for the other sectors S2, S3 and S4 as well. Accordingly, as is shown in FIG. 24, data for the shape element points 353 that make up the intersection polygons extracted from the band ranges B1 through B4 of all of the sectors S1 through S4 is accumulated in the intersection polygon element table 351 shown in FIG. 23. Next, the shape element points 353 registered in the intersection polygon element table 351 are sorted in ascending order of the angle γ. When the shape element points 353 are lined up in the order of the angle γ, an intersection polygon 355 of the type shown in FIG. 25 is defined. The intersection polygon data thus prepared is accumulated in the intersection polygon data base 306 shown in FIG. 14.

Figure 26:
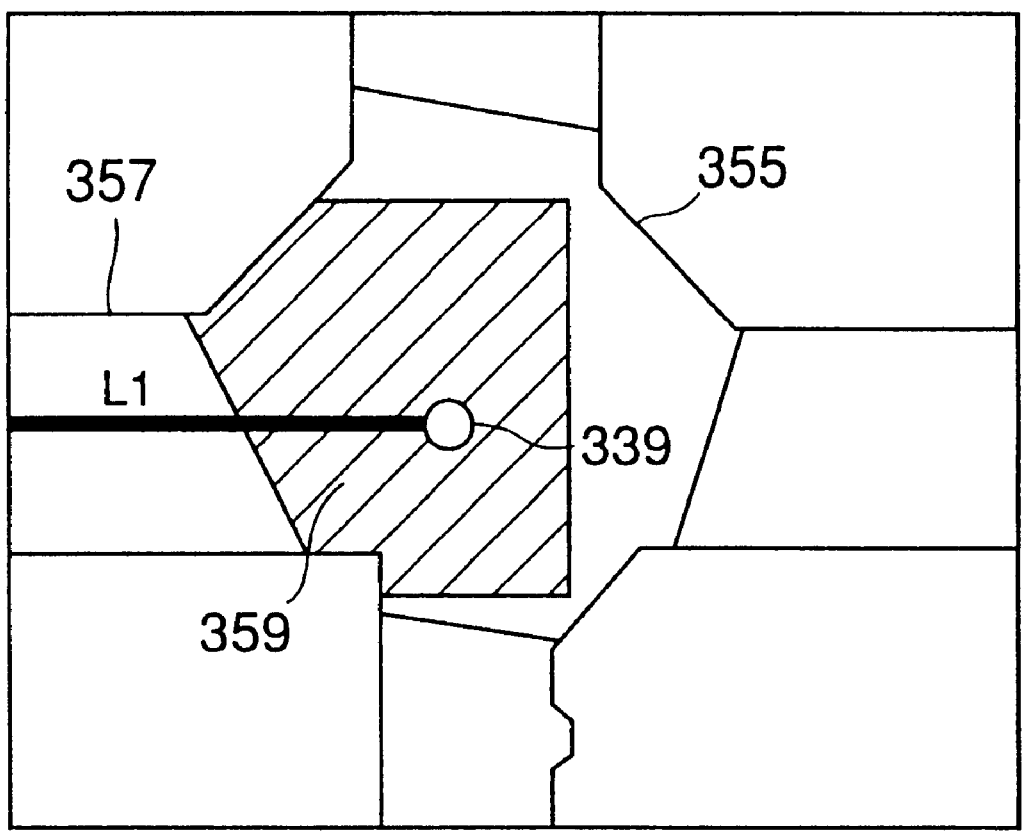
FIG. 26 is a diagram which shows the overlapping of a road polygon and an intersection polygon.
Figure 27:
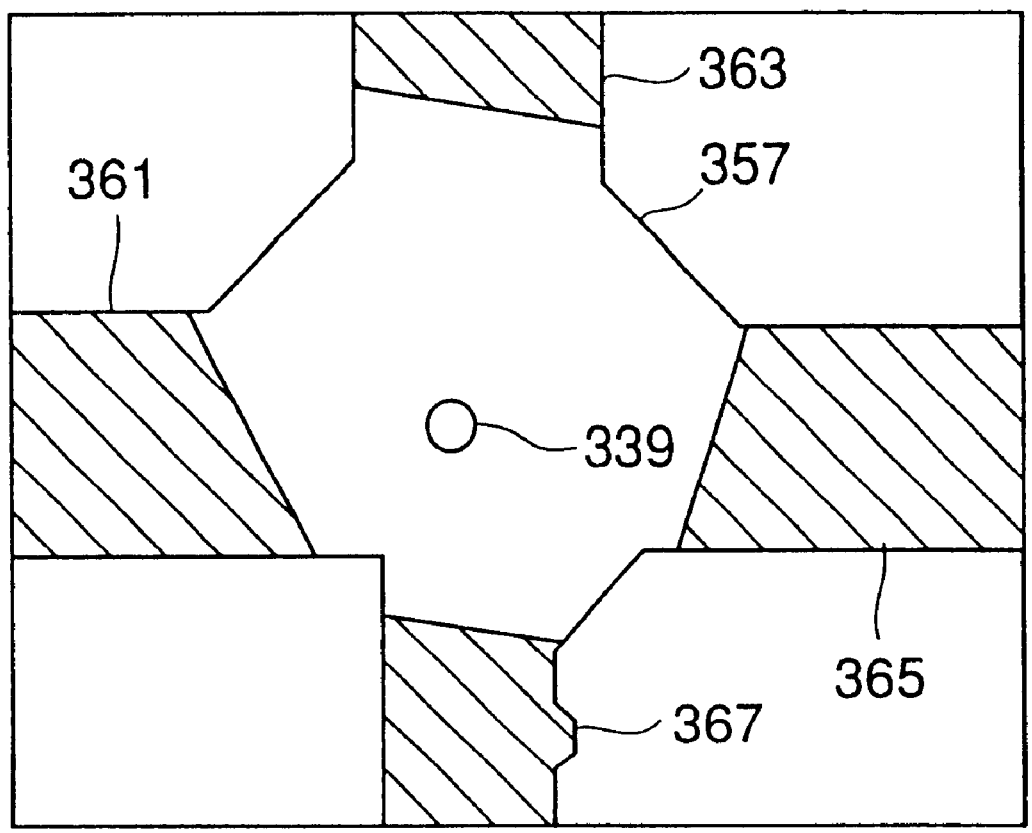
FIG. 27 is a diagram showing a pure road polygon that does not overlap with an intersection polygon.

The abovementioned processing that prepares intersection polygon data is repeated for all of the nodes of the road network data Next, the road polygon correction processing 308 will be described with reference to FIGS. 26 and 27.

In the road polygon correction processing 308, intersect point regions are removed from the road polygon data including intersection regions that is accumulated in the road polygon data base 307, using the intersection polygon data that is accumulated in the intersection polygon data base 306. As is shown in FIG. 26, the intersection polygon 355 expressed by the data from the intersection polygon data base 306 for the node of interest 339, and the road polygon data 357 expressed by the data from the road polygon data base 307 for the link L1 connected to the node of interest 339, overlap in the region 359 indicated by hatching. Accordingly, the overlapping region 359 is removed from the road polygon 355 by performing a geometrical calculation of the difference in regions between the road polygon 355 and intersection polygon 357.

This calculation of the difference in regions according to this intersection polygon 357 is repeated for the road polygons of all of the links that are connected to the node of interest 339. As a result, pure road polygons 361, 363, 365 and 367 that contact the intersection polygon 357 without overlapping are obtained as shown in FIG. 27. The data for these pure road polygons 361, 363, 365 and 367 are registered in the pure road polygon data base 309.

Figure 33:
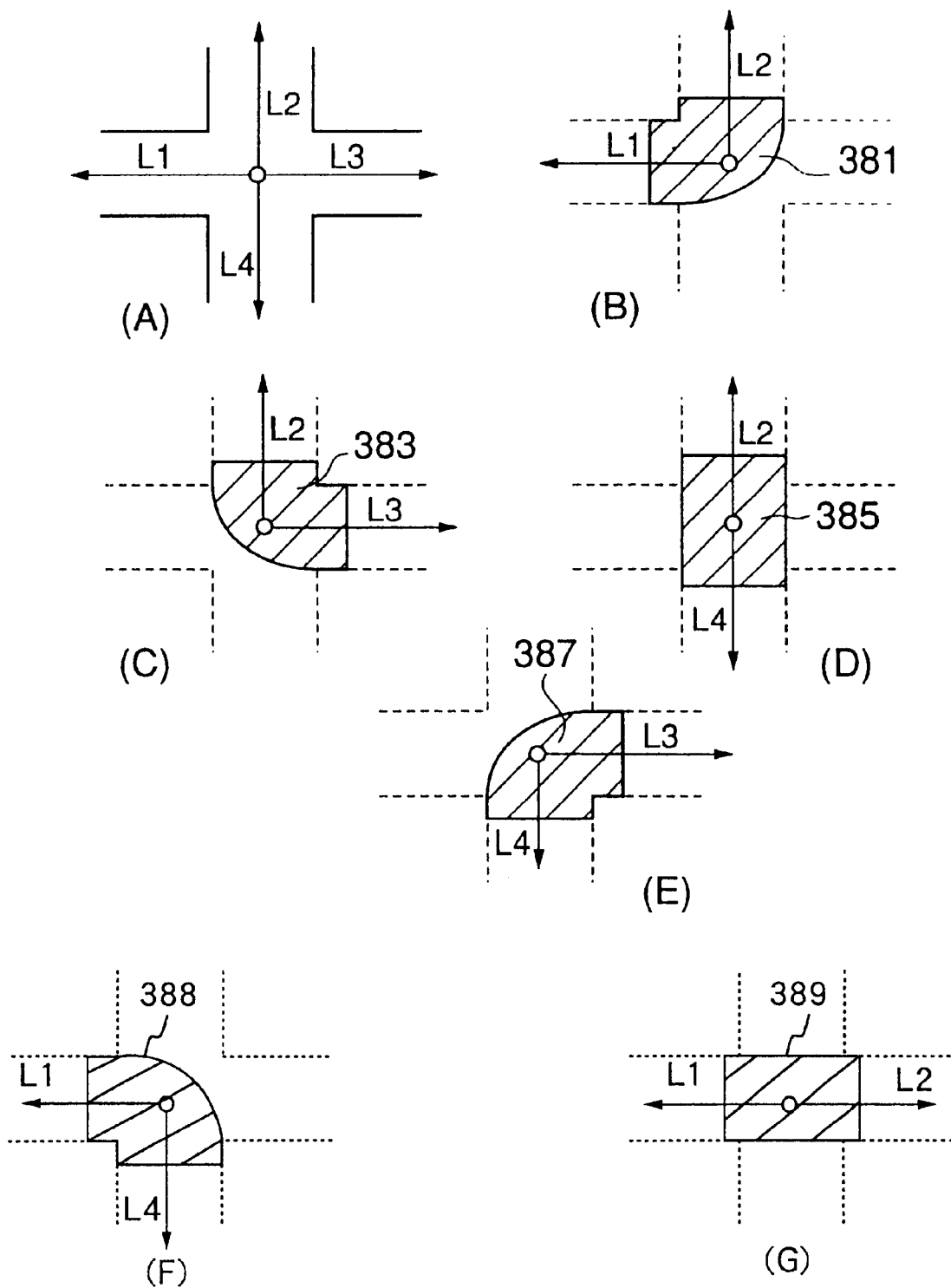
FIG. 33 is a diagram which illustrates six types of guiding intersection polygons prepared in the case of four-way intersections.

Next, the guiding intersection polygon preparation processing 310 will be described with reference to FIGS. 38 through 33.

Figure 28:
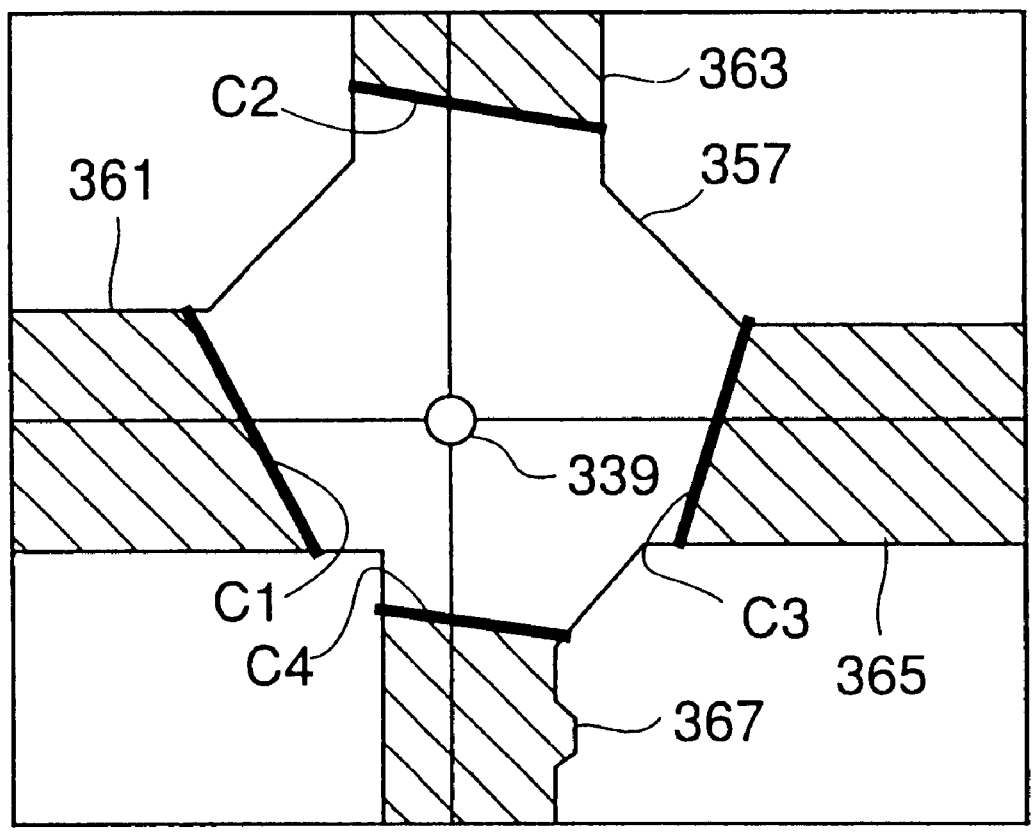
FIG. 28 is a diagram which shows tangential lines of road polygons and an intersection polygon.
Figure 29:
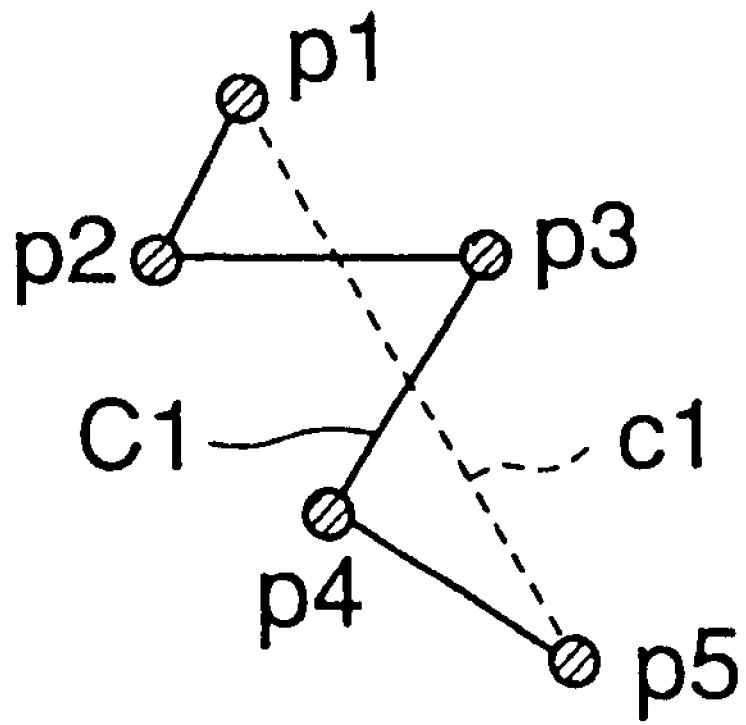
FIG. 29 is a diagram which illustrates the relationship between actual tangential lines and hypothetical tangential lines.

In the guiding intersection polygon preparation processing 310, the tangential line C1 between the intersection polygon 357 of the node of interest 339 and the pure road polygon 361 of the link L1 is first extracted as shown in FIG. 28. The tangential line C1 is a zigzag line as shown in FIG. 29, and can be expressed as follows:
C1=(p1, p2, p3 . . . )

Only the starting point p1 and final point p5 of the tangential line C1 are extracted, and a hypothetical tangential line c1 which is a straight line that connects the starting point p1 and final point p5 is created. In other words, c1=(p1, p5)

Figure 30:
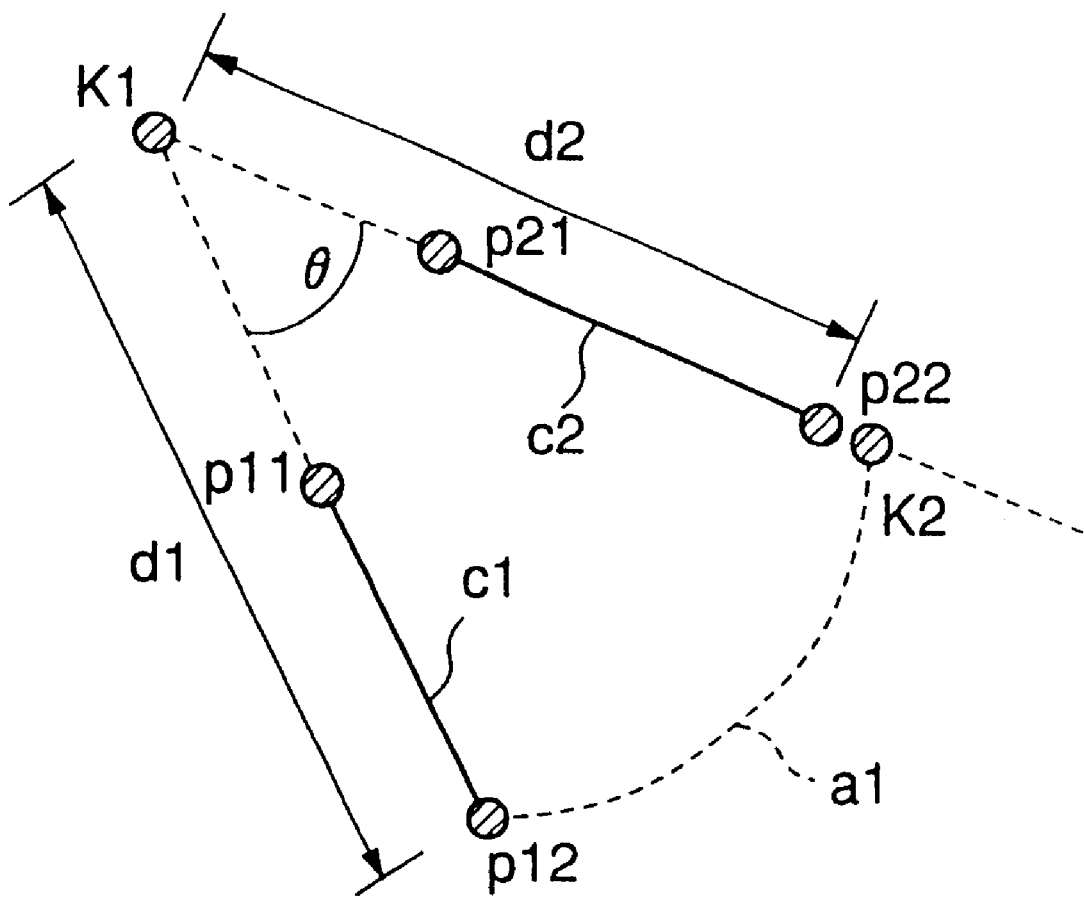
FIG. 30 is a diagram which illustrates the method used to create a circular arc that forms one outlining line of a guiding intersection polygon from two hypothetical tangential lines.
Figure 31:
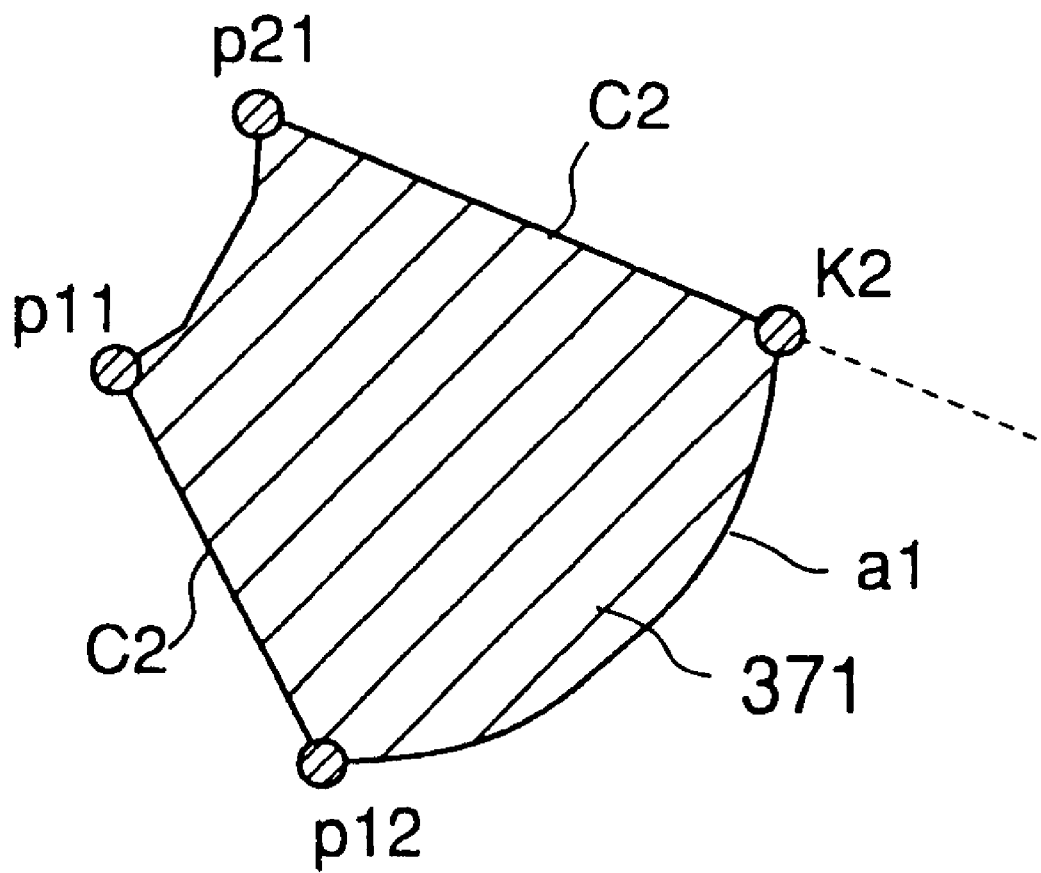
FIG. 31 is a diagram which shows the guiding intersection polygon created using the circular arc shown in FIG. 30.

Similarly, the tangential lines C2, C3 and C4 are also extracted for the other road polygons 361, 363, 365 and 367 that contact the intersection polygon 357, and hypothetical tangential lines c2, c3 and c4 are determined. Next, two hypothetical tangential lines are arbitrarily extracted from these hypothetical tangential lines c1, c2, c3 and c4. For example, assuming that the hypothetical tangential lines c1 and c2 are extracted, then an intersection K1 of extension lines of the hypothetical tangential line c1 and hypothetical tangential line c2 is determined next as shown in FIG. 30. The angle formed by the hypothetical tangential lines c1 and c2 at this intersection K1 is designated as θ. In cases where this angle θ is equal to or greater than a specified value, the distances d1 and d2 to the outside end points p12 and p22 of the hypothetical tangential lines c1 and c2 from the intersection K1 are calculated. Furthermore, a circular arc a1 that is centered on the intersection K1 is extended from the outside end point p12 of the hypothetical tangential line c1 that has the longer distance d1 toward the other hypothetical tangential line c2, and this circular arc a1 is stopped at the intersection K2 between the circular arc a1 and an extension line of the hypothetical tangential line c2. The circular arc a1 thus determined from the outside end point p12 to the intersection K2 is used as one outlining line of the guiding intersection polygon. The outlining lines of the intersection polygon 355 are used "as is" as the other outlining lines of the same guiding intersection polygon. In other words, the region that is located closer to the intersection K1 when the intersection polygon 355 is cut into two regions by the circular arc a1 is used as the guiding intersection polygon. As a result, the guiding intersection polygon 371 shown in FIG. 31 is completed.

Figure 32:
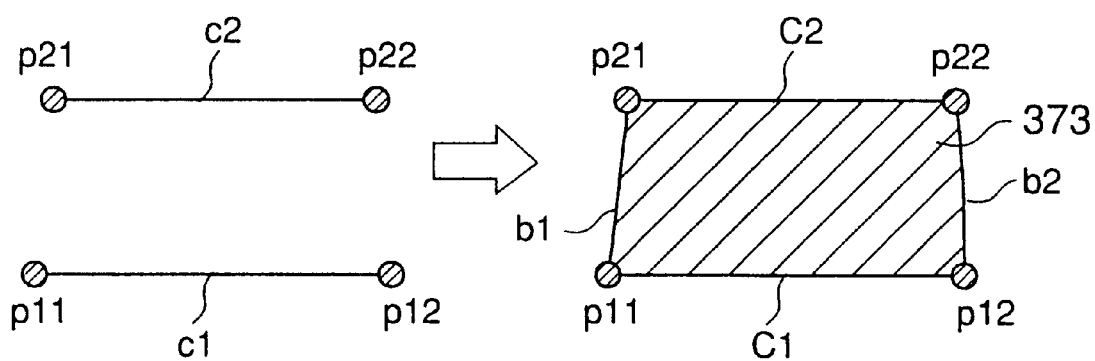
FIG. 32 is a diagram which illustrates the method used to create guiding intersection polygons from two more or less parallel hypothetical tangential lines.

In the processing shown in FIG. 30, in cases where the angle θ formed by the hypothetical tangential lines c1 and c2 at the intersection K1 is smaller than the abovementioned specified value (i.e., in cases where the hypothetical tangential lines c1 and c2 are close to parallel), the end points p11 and p12 of the hypothetical tangential line c1 and the end points p21 and p22 of the hypothetical tangential line c2 are connected by straight lines b1 and b2 so that a rectangle is formed as shown in FIG. 32. The polygon constructed from these two straight lines b1 and b2 and the original tangential lines C1 and C2 is designated as the guiding intersection polygon 373.

In the case of intersections of N different roads, the abovementioned processing used to prepare guiding polygons is performed for all combinations of two road polygons that can be selected from an aggregate of N road polygons. Accordingly, for example, in the case of a four-way intersection such as that shown in FIG. 33(A), six guiding intersection polygons 381, 383, 385, 387, 388 and 389 such as those shown in FIGS. 33(B) through 33(G) are prepared. The data for the guiding intersection polygons thus prepared is accommodated in the guiding intersection polygon database 311. The abovementioned guiding intersection polygon preparation processing 310 is repeated for all of the intersections.

Figure 34:
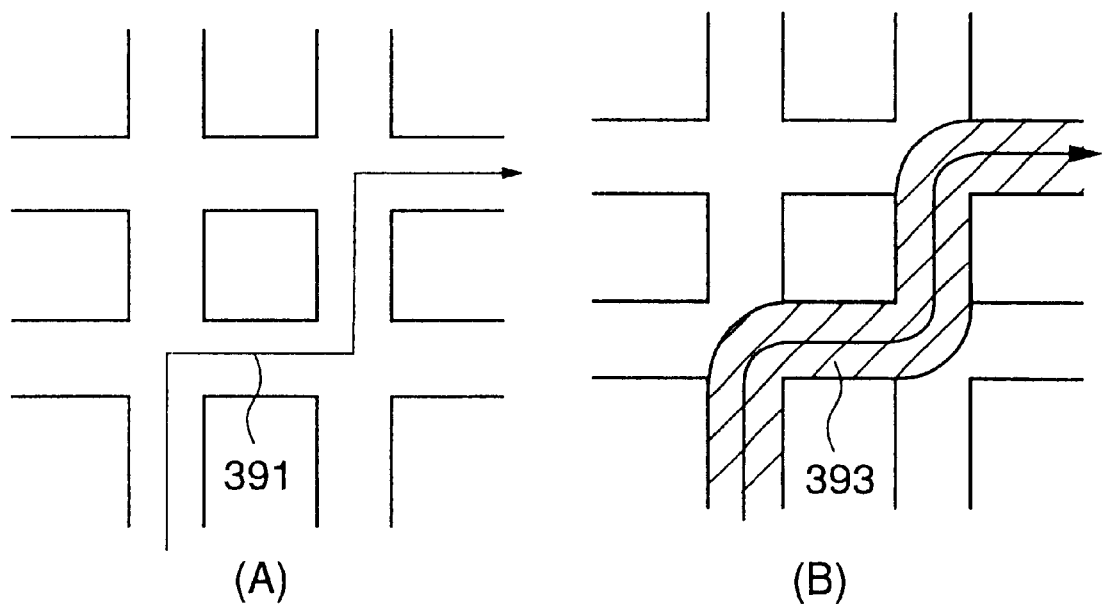
FIG. 34 is a diagram which shows a conventional example of a route guidance display, and an example of a route guidance display utilizing guiding intersection polygons.

The intersection polygon data, pure road polygon data and guiding intersection polygon data prepared as described above can be utilized in various applications. One of these applications is route guidance in car navigation. In conventional route guidance, as is shown in FIG. 34(A), the route is indicated by a zigzag line 391. On the other hand, if pure road polygon data and guiding intersection polygon data are used, as shown in FIG. 34(B), the route can be displayed as a route polygon 393, which connects pure road polygon data and guiding intersection polygon data, and which is close to the actual route shape.

Another application is the display of traffic jam on roads in car navigation. The method used to display traffic jam on roads will be described with reference to FIGS. 35 through 37.

Figure 35:
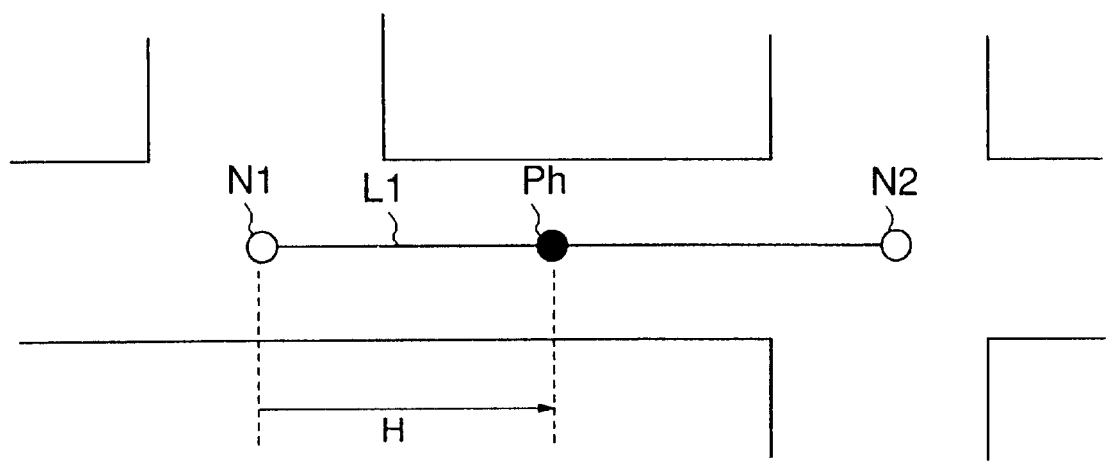
FIG. 35 is a diagram which illustrates the content of information of traffic jam.
Figure 36:
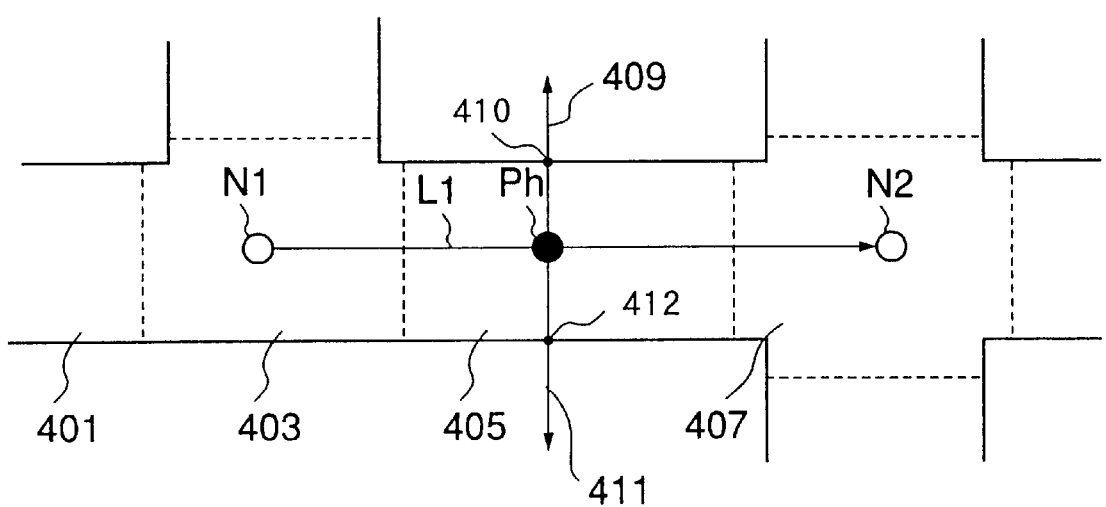
FIG. 36 is a diagram which illustrates the method used to determined the end points of tailbacks of cars.

For example, traffic jam information provided from the VICS (Vehicle Information and Communication System) (registered trademark) of the Japanese Road Traffic Information and Communication System Center (Incorporated) designates the starting ends and final ends of tailbacks of cars for respective inbound and outbound traffic lanes using the respective distances from the initial and final intersections. One example of this is shown in FIG. 35. FIG. 35 shows a case in which the final end of a tailback of cars is designated as H meters from the intersection of the node N1 for the inbound traffic lane (the traffic lane in which traffic runs toward the node N1 from the node N2). In this case, as is shown in FIG. 36, the coordinates of the final end point Ph of the tailback of cars separated from the node N1 by a distance of H along the link L1 (zigzag line) that is connected to the node N1 through which the inbound traffic lane passes is calculated.

Next, straight lines 409 and 411 which are perpendicular to the link L1 are extended on both sides of the link L1 from the final end point of tailback of cars Ph. Then, the intersections of these perpendicular lines 409 and 411 with the intersection polygon 403 of the node N1, the pure road polygon 405 of the link L1 and the intersection polygon 407 of the node N2 are determined. Then, the following processing operations (1) through (3) are performed in that order.

(1) In a case where there are intersections between the intersection polygon 403 of the starting point node N1 and the perpendicular lines 409 and 411 (i.e., in a case where the final end point Ph of the tailback of cars is present within the intersection polygon 403), the intersection polygon 403 is cut into two regions by the perpendicular lines 409 and 411, and only the region that is closer to the node N1 (i.e., the region that is located on the downstream side with respect to the traffic flow) is judged to be a tailback of cars. In a case where there are no intersections between the intersection polygon 403 and the perpendicular lines 409 and 411 (i.e., in a case where the final end point Ph of the tailback of cars is located on the upstream side of the intersection polygon 403), the entire region of the intersection polygon 403 is judged to be a tailback of cars, and the processing proceeds to the following step (2).

(2) In a case where there are intersections (e.g., 410 and 412) between the road polygon 405 of the link L1 and the perpendicular lines 409 and 411 (i.e., in a case where the final end point Ph of the tailback of cars is present within the road polygon 405), the road polygon 405 is cut into two regions by the perpendicular lines 409 and 411, and only the region that is closer to the node N1 (i.e., the region on the downstream side) is judged to be a tailback of cars. In a case where there are no intersections between the road polygon 405 and the perpendicular lines 409 and 411 (i.e., in a case where the final end point Ph of the tailback of cars is located on the upstream side of the road polygon 405), the entire region of the road polygon 405 is judged to be a tailback of cars, and the processing proceeds to the following step (3).

(3) In a case where there are intersections between the intersection polygon 407 of the final point node N2 and the perpendicular lines 409 and 411 (i.e., in a case where the final end point Ph of the tailback of cars is present within the intersection polygon 407), the intersection polygon 407 is cut into two regions by the perpendicular lines 409 and 411, and only the region that is closer to the node N1 (i.e., the region on the downstream side) is judged to be a tailback of cars. In a case where there are no intersections between the intersection polygon 407 and the perpendicular lines 409 and 411 (i.e., in a case where the final end point Ph of the tailback of cars is located on the upstream side of the intersection polygon 407), the entire region of the intersection polygon 407 is judged to be a tailback of cars.

Figure 37:
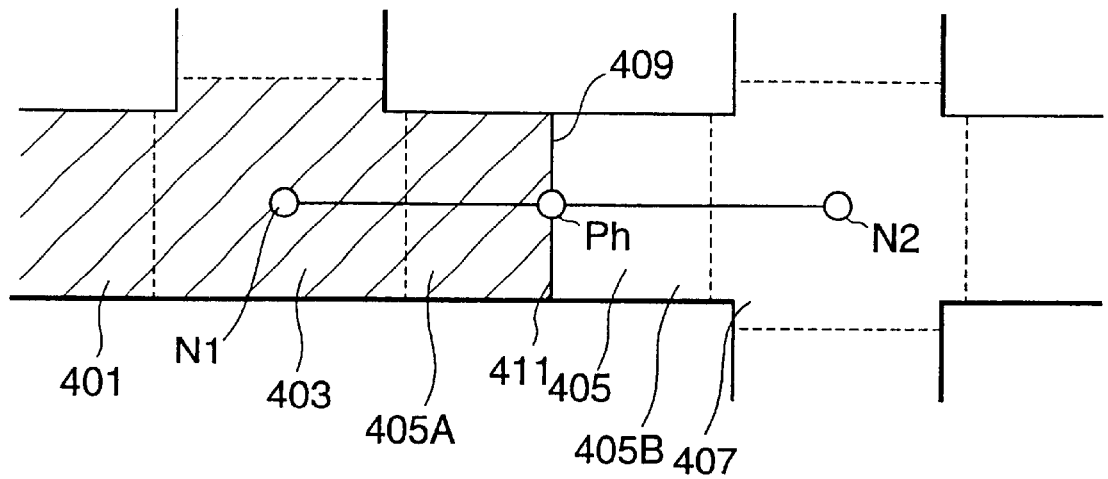
FIG. 37 is a diagram which illustrates an example of the display of tailbacks of cars.

Next, as is shown in FIG. 37, the polygon regions judged to be tailbacks of cars, i.e., the road and intersection polygon regions 405A, 403 and 401 located downstream from the perpendicular lines 409 and 411 at the final end point Ph of the tailback of cars, are painted in with a color or texture that indicates a tailback of cars, as shown by the hatching, and these regions are displayed in this manner. In other words, by performing the abovementioned processing for the final end and initial end of the tailback of cars, it is possible to achieve a display in which the accurate road region from the initial end to the final end of the tailback of cars is emphasized.

Figure 38:
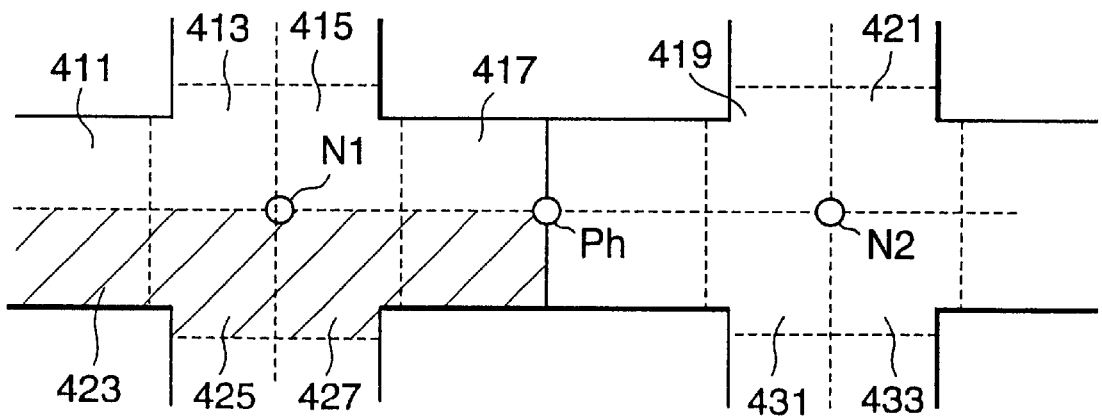
FIG. 38 is a diagram which illustrates an example in which tailbacks of cars are displayed according to traffic lanes.

Furthermore, as is shown in FIG. 38, polygon data 411 through 433 for roads and intersections distinguished by traffic lanes can be prepared in the case of a single road that has individual traffic lanes. In this case, the display of traffic jams and the display of routes can be performed according to traffic lanes. In FIG. 38, for example, a traffic jam area in one traffic lane is indicated by hatching.

The preparation of polygon data that expresses individual traffic lanes is very useful for distinguishing congested traffic lanes on the map as described above, or for guiding drivers to the correct traffic lane in car navigation. FIGS. 39 through 45 show one example of a method used to prepare polygon data that expresses individual traffic lanes.

Figure 39:
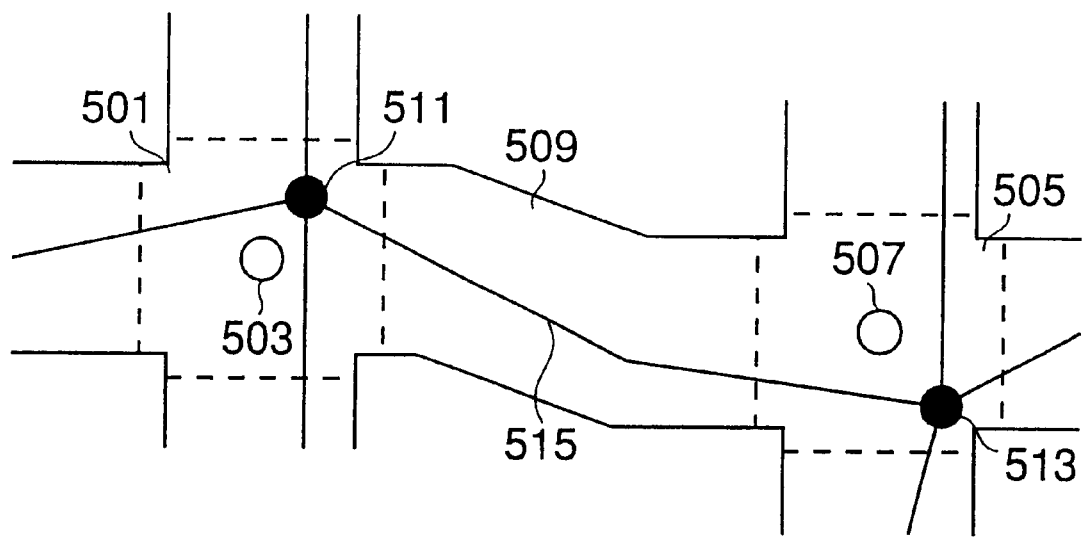
FIG. 39 is a diagram which shows the first step in the preparation of traffic lane polygons within simple roads.

As is shown in FIG. 39, the positions of the nodes 511 and 513 and link 515 in the road network data do not always match (in terms of position) the intersection polygons 501 and 505 and pure road polygon 509 prepared from the city map. Accordingly, the geometrical centers of gravity 503 and 507 of the intersection polygons are first respectively determined, and these geometrical centers of gravity 503 and 507 are defined as the new nodes of the respective intersection polygons 501 and 505.

Figure 40:
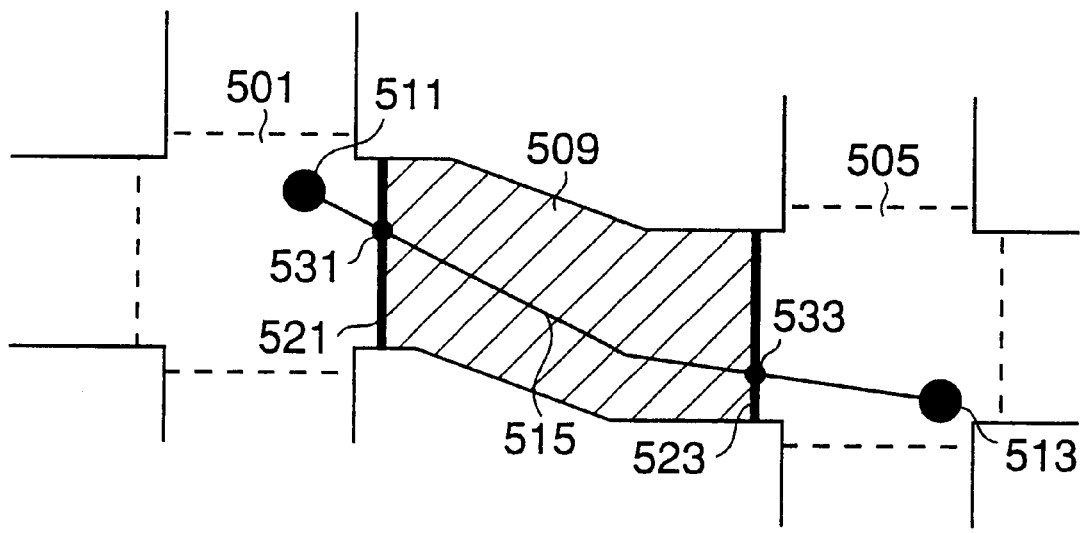
FIG. 40 is a diagram which shows the second step in the preparation of traffic lane polygons within simple roads.

Next, as is shown in FIG. 40, attention is directed to the tangential lines 521 and 523 between the intersection polygons 501 and 505 and the pure road polygon 509, and the link 515 that passes through the pure road polygon 509. Then, the intersections 531 and 533 of the tangential lines 521 and 523 and link 515 are extracted.

Figure 41:
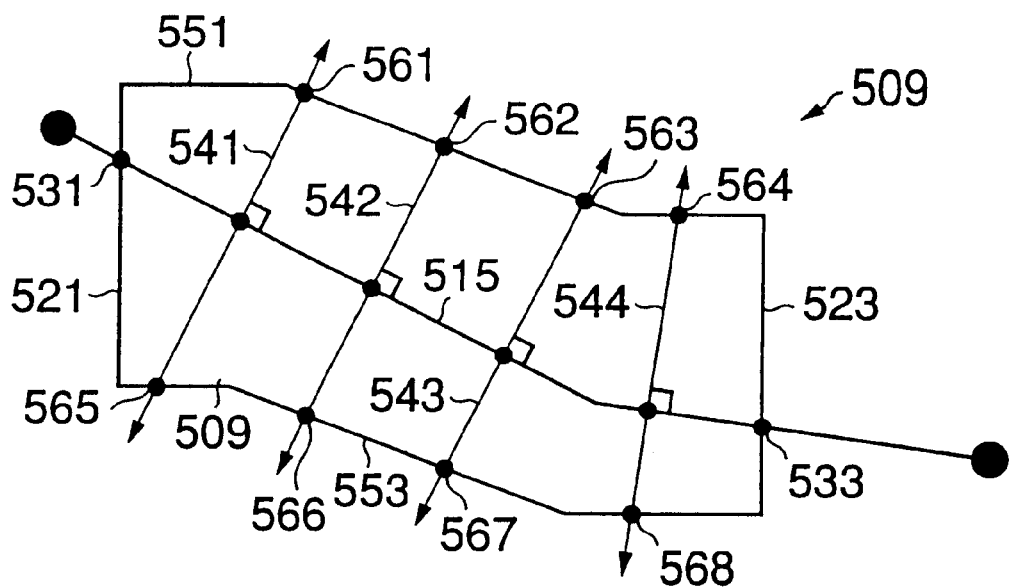
FIG. 41 is a diagram which shows the third step in the preparation of traffic lane polygons within simple roads.

Next, as is shown in FIG. 41, lines 541 through 544 that are perpendicular to the link 515 are extended to both sides of the link 515 from a plurality of positions located at appropriate intervals between one intersection 531 and another intersection 533 on the link 515. Then, the intersections 561 through 568 between the respective perpendicular lines 541 through 544 and outlining lines 551 and 553 other than the abovementioned tangential lines 521 and 523 of the pure road polygon 509 are determined.

Figure 42:
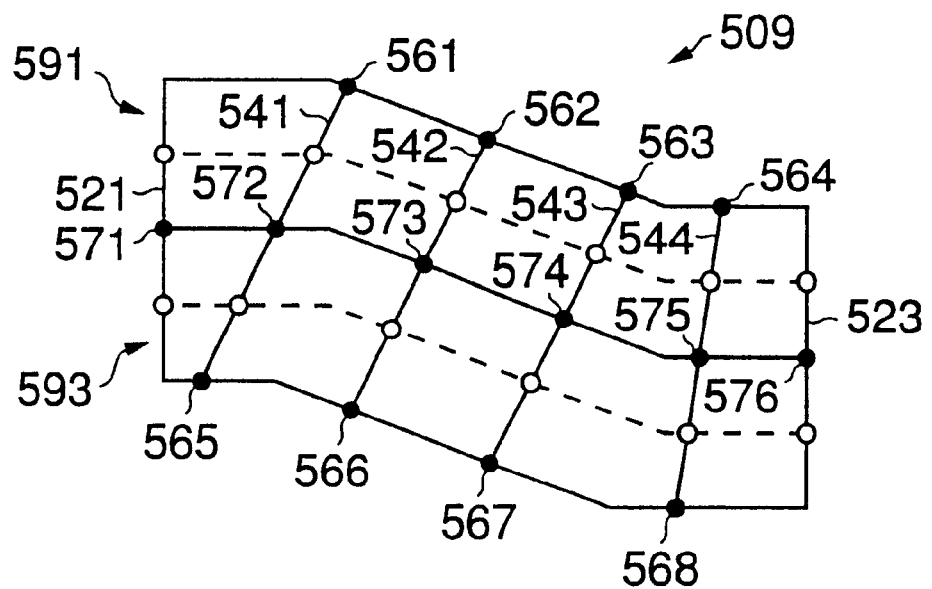
FIG. 42 is a diagram which shows the fourth step in the preparation of traffic lane polygons within simple roads.

Next, as is shown in FIG. 42, the intersections 561 through 568 determined as described above are taken as the end points of the perpendicular lines 541 through 544. Then, each of the abovementioned perpendicular lines 541 through 544 and tangential lines 521 and 523 is equally divided by the number of traffic lanes N that this road possesses. Here, the number of traffic lanes N of this road can be obtained from attribute data for the link 515 that is contained in the road network data; this number N is an integer equal to or greater than 1 (naturally, in cases where N=1, the pure road polygon itself already expresses the single traffic lane). In the example shown in FIG. 42, the number of traffic lanes N is 2; accordingly, the respective perpendicular lines 541 through 544 and the respective tangential lines 521 and 523 are divided into two equal parts by the respective center points 572 through 575, 571 and 576 of the lines. Then, a line segment 581 which successively passes through these center points is determined, and the pure road polygon 509 is divided into two sub-road polygons 591 and 593 by this line segment 581. The two sub-road polygons 591 and 593 thus obtained are registered in the road map data as traffic lane polygons that express the two traffic lanes of this road.

Furthermore, as is shown in FIG. 42, vehicle guide lines used for car navigation are set within the respective traffic lane polygons 591 and 593 (not only in cases where N>1, but also in cases where N=1). These vehicle guide lines can be determined by the same method as that used to determine the line segment 581 that divides the abovementioned traffic lane polygons 591 and 593 (in cases where N=1, the line segment 581 acts as a vehicle guide line). Specifically, inside each of the traffic lane polygons 591 and 593, the respective center points (indicated by empty circles in FIG. 42) of the abovementioned perpendicular lines 541 through 544 and the abovementioned tangential lines 521 and 523 are determined; then, line segments (indicated by broken lines in FIG. 42) that successively pass through these center points are determined, and these line segments are registered in the road map data as vehicle guide lines for the respective traffic lane polygons 591 and 593.

Furthermore, a plurality of traffic lane polygons and guide lines are also set in the respective intersection polygons that contact roads that have two or more traffic lanes.

Figure 43:
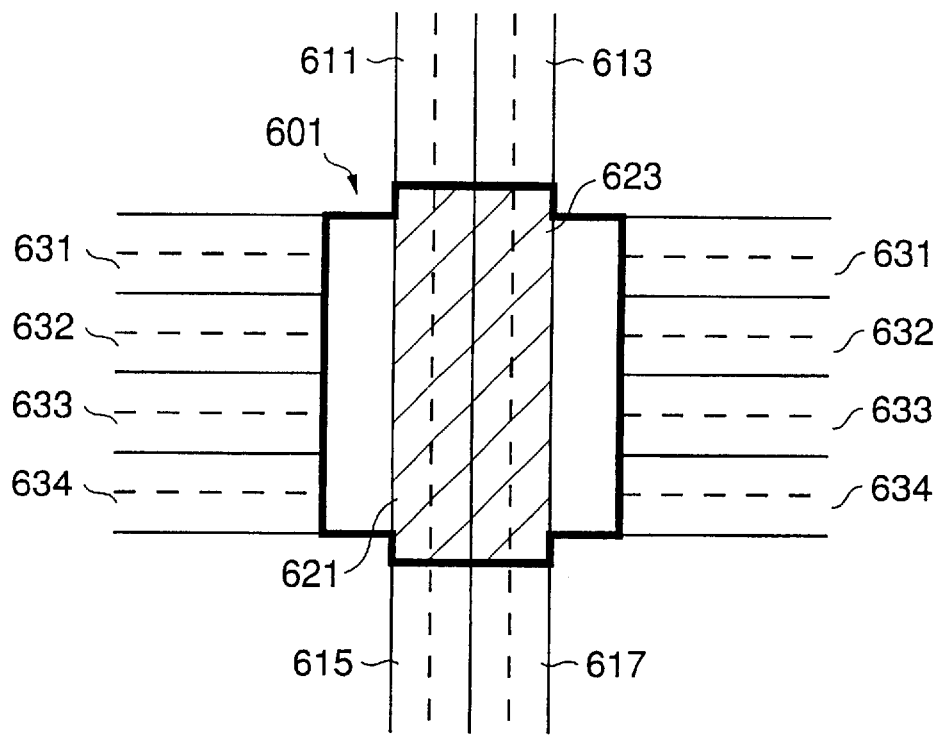
FIG. 43 is a diagram which shows an example of a straight-ahead traffic lane polygon within an intersection.

FIG. 43 shows an example in which two traffic lane polygons 621 and 623 (used for straight-ahead traffic within the intersection) which connect the two traffic lane polygons 611 and 613 of the upper road in the figure with the two traffic lane polygons 615 and 617 of the lower road in the figure are set in an intersection polygon 601. Although this is not shown in the figure, a plurality of traffic lane polygons (used for straight-ahead traffic within the intersection) which connect the plurality of traffic lanes 631 through 634 of the left-hand road in the figure with the plurality of traffic lanes 641 through 644 of the right-hand road in the figure are also similarly set. The broken lines in the figure indicate vehicle guide lines set within the respective traffic lane polygons.

Figure 44:
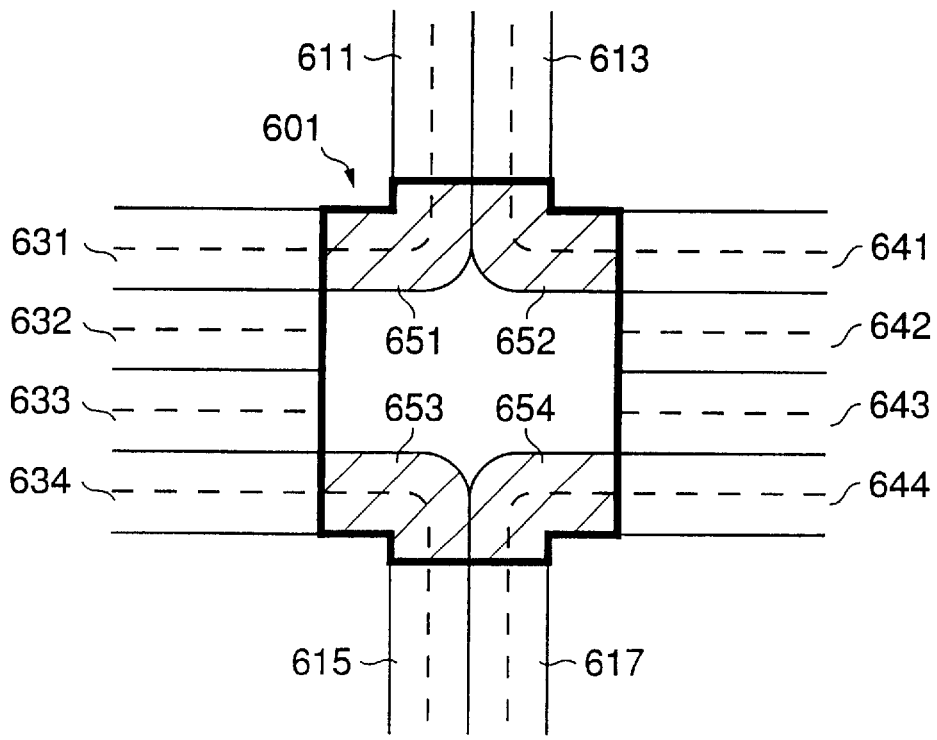
FIG. 44 is a diagram which shows an example of a left-turn traffic lane polygon for use in the case of driving on the left within an intersection.

FIG. 44 shows an example in which traffic lane polygons 651 through 654 for left turn use in the case of driving on the left (right turn use in the case of driving on the right) are prepared within an intersection polygon 601. In this example, the outermost traffic lane polygons 631, 641, 634 and 644 of the road running in the left-right direction in the figure and the outermost traffic lane polygons 611, 613, 615 and 617 of the road running in the vertical direction in the figure are respectively connected by the traffic lane polygons 651 through 654 within the intersection polygon 601. The curved outlines of the traffic lane polygons 651 through 654 within the intersection may be expressed by clothoid curves, circular arcs, elliptical arcs, parabolic curves, hyperbolic curves or zigzag lines, etc. The broken lines in the figure indicate vehicle guide lines that are set within the respective traffic lane polygons.

Figure 45:
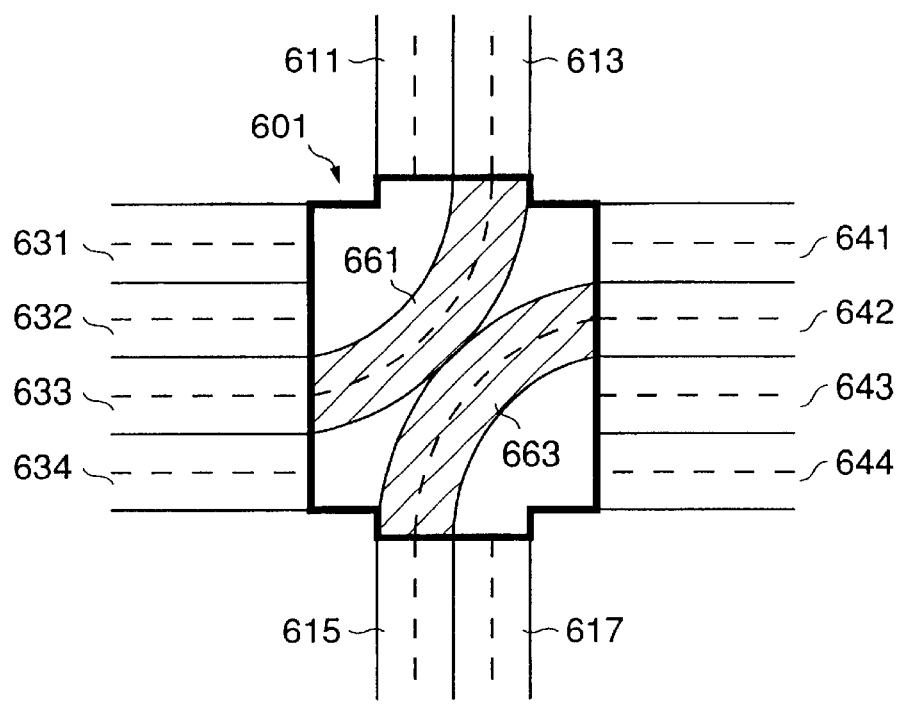
FIG. 45 is a diagram which shows an example of a right-turn traffic lane polygon for use in the case of driving on the left within an intersection.

FIG. 45 shows an example in which traffic lane polygons 661 and 663 for right turn use in the case of driving on the left (or for left turn use in the case of driving on the right) are prepared with the intersection polygon 601. In this example, the inside traffic lane polygons 633 and 642 of the road that runs in the left-right direction in the figure and the inside traffic lane polygons 613 and 617 of the road that runs in the vertical direction of the figure are respectively connected by the traffic lane polygons 661 and 663 inside the intersection. The curved outlines of the traffic lane polygons 661 and 663 within the intersection may be expressed by clothoid curves, circular arcs, elliptical arcs, parabolic curves, hyperbolic curves or zigzag lines, etc. The broken lines in the figure indicate vehicle guide lines that are set within the respective traffic lane polygons.

If traffic lane polygons required for straight-ahead traffic and left and right turns within respective intersection polygons are thus prepared in advance, and guide lines are set within the respective traffic lane polygons, vehicle guidance at intersections can be accurately performed. The traffic lane polygons within the intersections shown in FIGS. 43 through 45 are merely examples used for the purpose of illustration. The types of traffic lane polygons within intersections that should be prepared vary according to the number of traffic lanes in the intersecting roads, the direction of travel in the respective traffic lanes (this direction is fixed in some cases, and varies according to the time of day in other cases), and the traffic regulations that are applied, etc.

The preparation of the intersection polygons, pure road polygons and traffic lane polygons described above can be accomplished using either a static method or a dynamic method. The static method is a method in which all of the intersection polygons, pure road polygons and traffic lane polygons are prepared in advance for the entire map region, and accommodated in a map data base. When a road map is to be displayed, polygons for the region that is to be displayed can be read out and displayed. On the other hand, the dynamic method is a method in which the polygons are not all prepared beforehand; instead, each time that a road map is to be displayed, only the polygons necessary for the required region are prepared from city map data and road network data. The static method is usually used in road map display devices that have a large memory capacity. On the other hand, the dynamic method is used in map display devices in which it is difficult to guarantee a sufficiently large memory capacity, such as car navigation devices.

Figure 46:
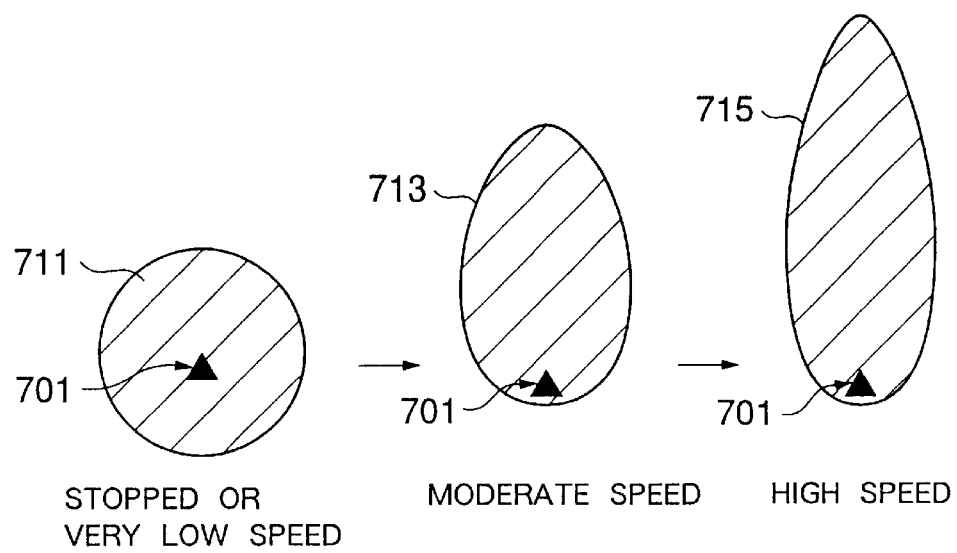
FIG. 46 is a diagram which illustrates the principle whereby the regional range that is the object of conversion to polygons in the dynamic preparation of polygonal map data by a car navigation device is limited.

In cases where polygon map data is dynamically prepared in a car navigation device, etc., the time that can be used for the preparation of polygon data is limited; accordingly, it is important to select the roads that are to be converted into polygon data. FIG. 46 illustrates one principle that is used to determine the extent to which the range of the object region of polygon preparation should be limited when polygon map data is dynamically prepared in a car navigation device.

As is shown in FIG. 46, in cases where the automobile is stopped or is operating at a very low speed, the object region of polygon preparation is a more or less circular region 711 of a specified radius, which is more or less centered on the position 701 of the automobile (the triangular marks in the figure indicate that the vehicle is running toward the top of the figure). When the automobile is operating at a moderate speed, a more or less elliptical or egg-shaped region 713 which includes the position 701 of the automobile in the rear end portion of said region, and which extends further in the direction of advance of the automobile, is taken as the object region. As the speed of the automobile increases, an elongated elliptical or egg-shaped region 715 which includes the position 701 of the automobile in the rear end portion of said region, and which extends even further in the direction of advance of the automobile, is taken as the object region.

Figure 47:
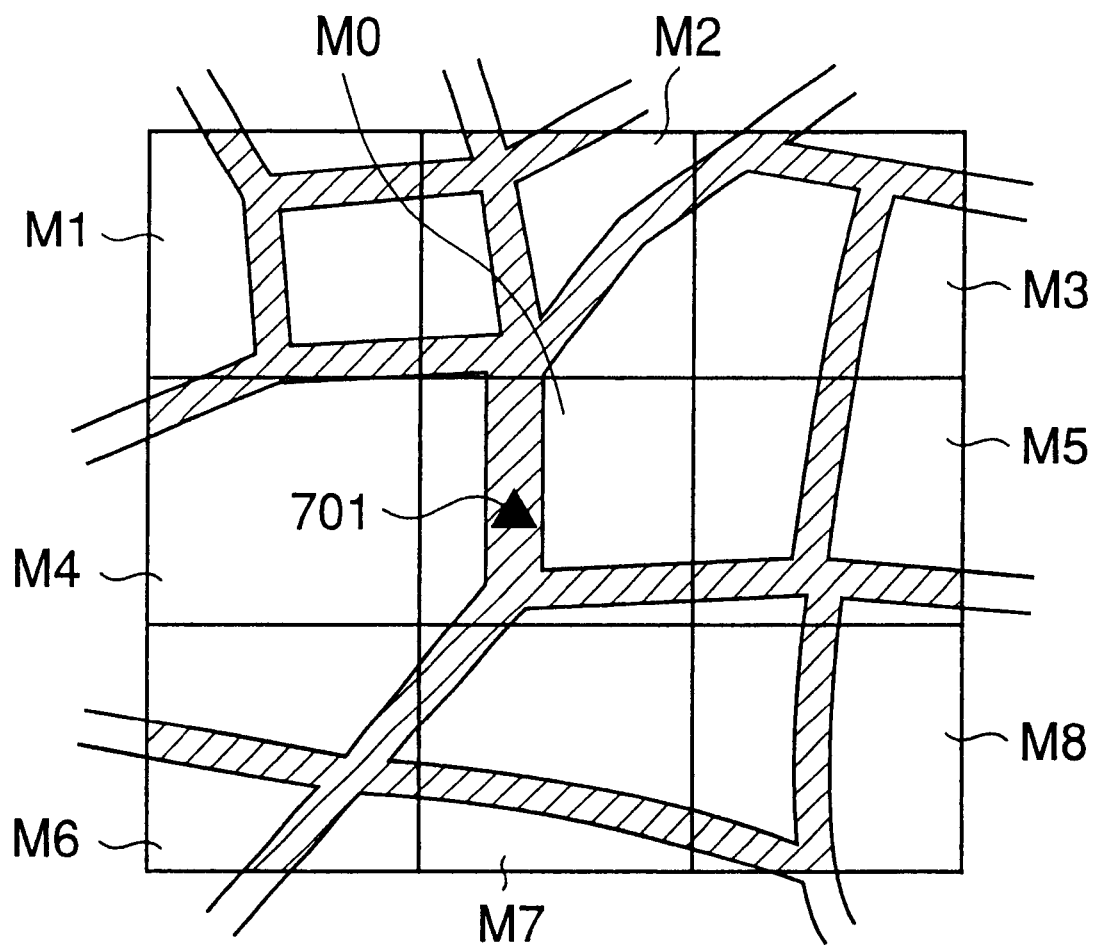
FIG. 47 is a diagram which illustrates the method used to select the object region of polygon preparation in the case of a stopped vehicle or very-low-speed driving.
Figure 48:
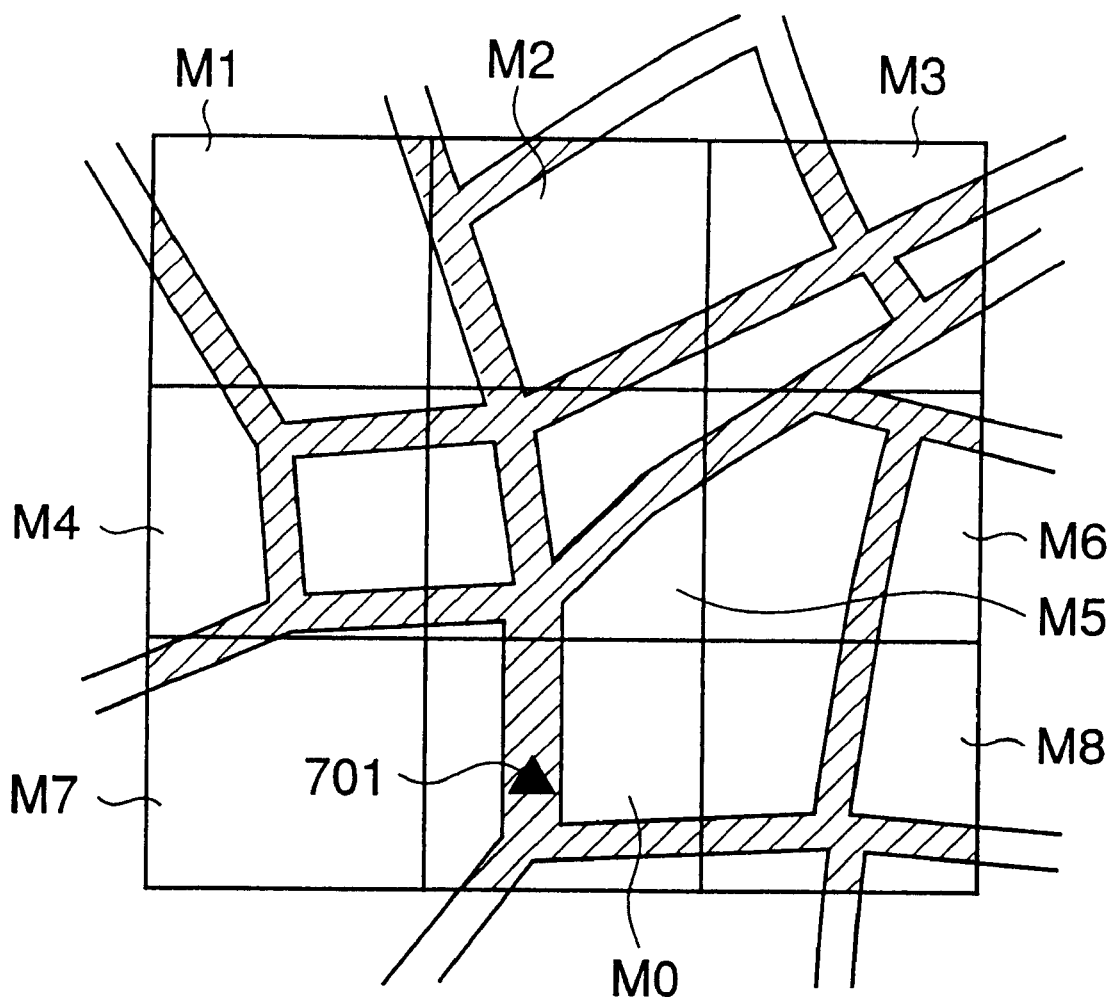
FIG. 48 is a diagram which illustrates the method used to select the object region of polygon preparation in the case of moderate-speed driving.
Figure 49:
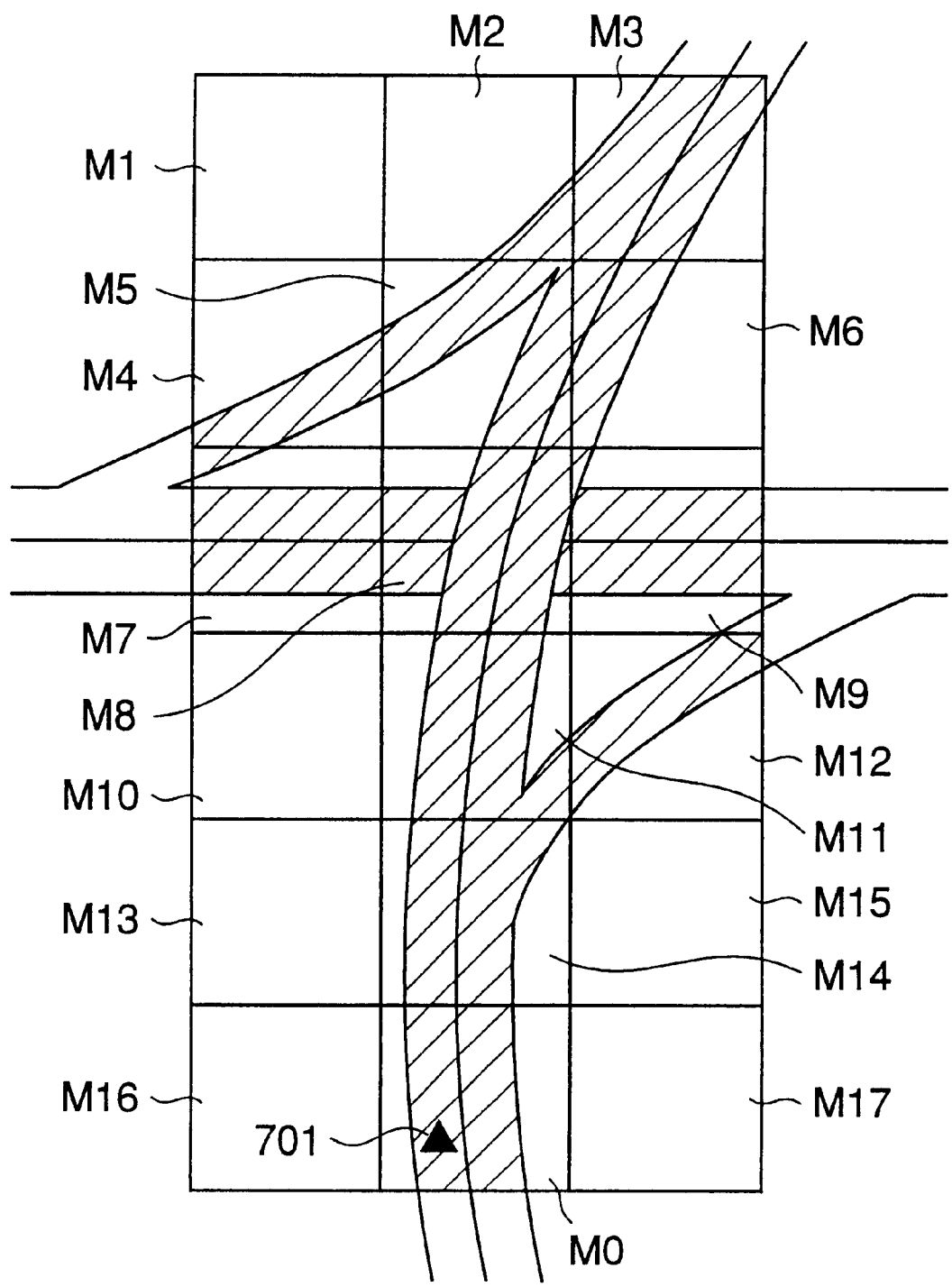
FIG. 49 is a diagram which illustrates the method used to select the object region of polygon preparation in the case of high-speed driving.

FIGS. 47 through 49 show the method used to select the concrete object region of polygon preparation according to the abovementioned principle.

Maps used for car navigation are generally controlled by being divided into numerous small area rectangular regions (mesh regions). Accordingly, the object region in which road or intersection polygons are dynamically produced is an aggregate of a plurality of mesh regions.

As is shown in FIG. 47, in the case of a stopped automobile or an automobile traveling at a very low speed, the mesh region M0 that includes the current position 701 of the automobile (the triangular mark indicates that the automobile is moving upward in the figure) and (for example) the eight adjacent mesh regions M1 through M8 that surround the mesh region M0 are taken as the object of polygon preparation. Then, these mesh regions M0 through M8 are processed with priority given to mesh regions in which there is a higher probability that the automobile will be present at a subsequent point in time (i.e., a higher probability that the driver will require data for these mesh regions), in accordance with the direction of advance of the automobile (or the direction in which the automobile is pointing when stopped). Initially, road and intersection polygons are prepared by processing the mesh region M0 that includes the current position 701. Next, the mesh region M2 which is located in front of the mesh region M0 of the current position is processed. Next to be processed are the mesh regions M1 and M3 (in either order), which are located obliquely in front on the left and right with respect to the direction of advance. Next to be processed are the mesh regions M4 and M5 (in either order) which are located to the left and right of the mesh M0 of the current position. Next to be processed are the mesh regions M6 and M7 (in either order), which are located obliquely to the rear on the left and right of the mesh region M0 of the current position. The final mesh region to be processed is the mesh region M7, which is located to the rear of the mesh region M0 of the current position. As is shown in FIG. 48, when the automobile is operating at a moderate speed, the area to the rear of the current position 701 is ignored, and more mesh regions that are present in the direction of advance are taken as the object of polygon preparation. For example, the mesh region M0 of the current position, and the eight mesh regions M1 through M8 located in front and to the left and right of this mesh region M0 are taken as the object of polygon preparation. Then, similarly, these mesh regions M0 through M8 are processed in an order that gives priority to mesh regions in which there is a higher probability that the automobile will be present at a subsequent point in time (i.e., a higher probability that the driver will require data for these mesh regions), in accordance with the direction of advance of the automobile. Specifically, the first mesh region to be processed is the mesh region M0 of the current position of the automobile. The next mesh region to be processed is the mesh region M5 which is located in front of the mesh region M0 of the current position. Next to be processed are the mesh regions M2, M4 and M6 (in any order), which are respectively located further in front of the mesh region M0, and obliquely in front of the mesh region M0 on the left and right of the mesh region M0. The next regions to be processed are the mesh regions M1 and M3 which are located even further in front of the mesh region M0 on the left and right of the mesh region M0. The final regions to be processed are the mesh regions M7 and M8 (in either order), which are adjacent to the mesh region M0 on the left and right.

As is shown in FIG. 49, in the case of an automobile traveling at a high speed, it is necessary to take an even greater number of mesh regions located in the direction of advance from the current position 701 of the automobile as the object of processing (this number of mesh regions may increase or decrease according to the operating speed of the automobile; for example, 18 mesh regions M0 through M17 are selected). In this case, as in the case of an automobile operating at a moderate speed, the conversion of all of the roads and intersections in the object mesh regions into polygons is not advantageous from the standpoints of driver safety and the performance of the device. Accordingly, roads and intersection points that show a certain minimum degree of necessity from the standpoint of the driver are selected, and only these selected roads and intersections are converted into polygons. For example, the system is arranged so that only roads and intersections of the same type as the road on which the automobile is currently traveling are selected, or so that roads and intersections of a type with a predetermined high priority are selected in addition to roads and intersections of the same type as the road on which the automobile is currently traveling. Here, the term "types of roads" refers proper names of roads such as "National Route 10" and "Yasukuni-dori", and names of types of roads such as "national highways", "prefectural roads", "municipal roads", "roads exclusively for use by automobiles" and "high-speed thoroughfares", etc. These road types are obtained from attribute data contained in the road network data The numbers or types of roads and intersections that are converted into polygons can be increased or decreased in accordance with the operating speed v of the automobile. For example, an increase/decrease method based on the following principle can be used: specifically, where N is the number of mesh regions for which polygon conversion processing must be performed at the current operating speed v, X is the size of one mesh region (length of one side), and m is the average number of polygons that are to be created inside one mesh region, the number of polygons m that are prepared for each mesh region is determined so that the average time S (min) required for the processing of one mesh region satisfies the following equation:

$$S \text{ (min) } N=X/v$$

In other words, the average number of polygons m to be prepared for each mesh region is determined so that the polygon conversion processing for all of the N mesh regions that constitute the object of processing can be completed within the time X/v required for the automobile to travel a distance equal to one mesh region. Then, the road types that are the object of polygon conversion are selected so that the average number of polygons actually prepared for each mesh region does not exceed the abovementioned m.

By dynamically preparing road and intersection polygons using such a method, it is possible to provide appropriate driver guidance in accordance with the operating speed of the automobile.

Figure 50:
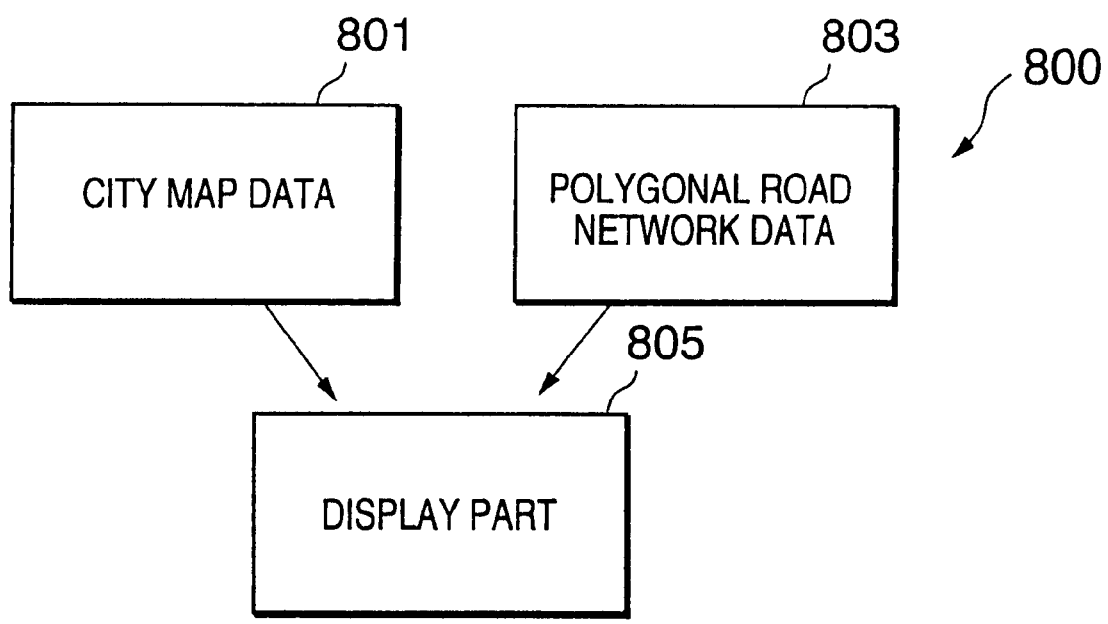
FIG. 50 is a block diagram which illustrates a road map display device constituting one embodiment of the present invention.

FIG. 50 illustrates a road map display device which constitutes one embodiment of the present invention.

This road map display device 800 has city map data 801, polygonal road network data 803, and a display part 805. The polygonal road network data 803 is data in which the node shape data in conventional road network data constructed from nodes and links is changed from point data to intersection polygon data prepared by the method of the present invention, and the link shape data is changed from line segment data to pure road polygon data prepared by the method of the present invention. Furthermore, this polygonal road network data 803 may also include lane polygon data formed by dividing the abovementioned pure road polygons, and lane polygon data within intersections, which is set inside intersection polygons. The display part 805 draws city map images from the city map data 801, and also draws images of road polygons and intersection polygons, which have shapes matching the shapes of roads and intersections on the city map, from the polygonal road network data 803 (if necessary, these polygons may be painted in with specified colors). Furthermore, this display part 805 displays images of road polygons and intersection polygons superimposed on the city map image. As a result, regions showing good conformity to the shapes of roads and intersections on the city map can be displayed as roads and intersections. Furthermore, in cases where this device 800 is used in (for example) car navigation, the display part 805 performs a route search function in which the polygonal road network data 803 is used to search for a road route from the starting location to the destination; moreover, the display part 805 also uses the polygonal road network data 803 to correct the current position of the automobile so that this position is located inside certain road polygons or certain intersection polygons.

Figure 51:
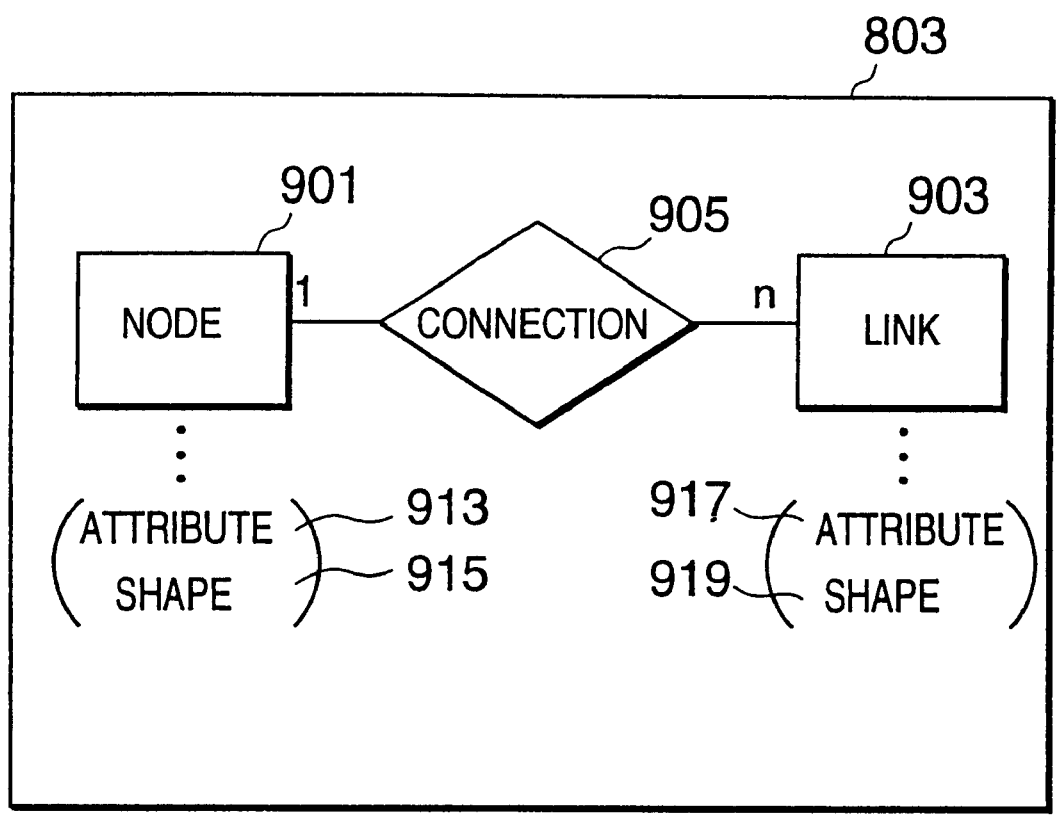
FIG. 51 is a diagram which illustrates the structure of polygonal road network data in which the shapes of intersections and roads are expressed by polygons.

FIG. 51 shows the structure of the polygonal road network data 803.

The polygonal road network data 803 includes node data 901 which expresses individual nodes (intersections), link data 903 which expresses individual links (roads), and connecting data 905 which expresses the connections between nodes and links. The connection data 905 indicates connection relationships between nodes and links, such as the fact that link data 903 for n specified links is connected to node data 901 for one specified node.

Each item of node data 901 includes attribute data 913 which indicates attributes of each node, and shape data 915 which indicates the shape of each node. Each item of link data 903 includes attribute data 917 which indicates attributes of each node, and shape data 919 which indicates the shape of each node. Here, the connection data and attribute data of conventional road network data used in the preparation of road polygon data and intersection polygon data can be used as the connection data 905 and attribute data 913 and 917. Meanwhile, the node shape data 915 is the intersection polygon data for the node in question, and the link shape data 919 is the pure road polygon data for the link in question.

In short, as was described above, the abovementioned polygonal road network data 803 is data in which the conventional point data used as shape data for the respective nodes in conventional road network data is replaced by intersection polygon data, and the conventional line segment data used as shape data for the respective links is replaced by pure road polygon data Accordingly, in cases where processing such as route search and map matching, etc., is performed using the abovementioned polygonal road network data 803 in a car navigation system, etc., conventional route search algorithms and the basic portions of conventional map matching using convention road network data can be applied. Furthermore, the road map images prepared using such polygonal road network data 803 show good matching with city map images in terms of the shapes and positions of roads and intersections; accordingly, such images are easily visible to the user.

The embodiments described above are merely examples used to illustrate the present invention; the present invention is not limited to these embodiments alone. The present invention can be worked in various configurations other than the embodiments described above.

What is claimed is:

1. A road map display device comprising:
  polygonal road map data which contains road polygon data in which respective roads are expressed by polygons each of which, as such, is representative of the two-dimensional outline of each of said roads; and
  a display part which displays said roads with the two-dimensional outlines thereof represented by said polygons, using said road polygon data.

2. A road map display device comprising:
  polygonal road map data which includes road polygon data in which the respective roads that are to be displayed are expressed by polygons; and
  a display part which displays said roads using said road polygon data, wherein said polygonal road map data further includes traffic lane polygon data in which the respective traffic lanes within said roads are expressed by polygons, and said display part further displays the respective traffic lanes with said roads using said traffic lane polygon data.

3. The road map display device according to claim 2, wherein said polygonal road map data further includes guide line data which expresses a guide line which is set within each of said traffic lanes, and said display part displays a guide mark positioned within a selected traffic lane using said guide line data.

4. A road map display device comprising:
  road network data in which intersections are modeled as nodes and roads are modeled as links that connect said nodes;
  city map data in which roads are represented with the two-dimensional outlines thereof;
  a road polygon data preparation part which dynamically prepares road polygon data in which respective roads are expressed by polygons each of which, as such, is representative of the two-dimensional outline of each of said roads, on the basis of said road network data and said city map data in cases where there is a need to display a road map; and
  a display part which displays said roads with the two-dimensional outlines thereof represented by said polygons, using said road polygon data.

5. A road map display method comprising the steps of:
  preparing road polygon data in which respective roads are expressed by polygons each of which, as such, is representative of the two-dimensional outline of each of said roads; and
  displaying said roads with the two-dimensional outlines thereof represented by said polygons, using said road polygon data.

6. A road map display method comprising the steps of:
  preparing road polygon data in which the respective roads that are to be displayed are expressed by polygons;
  preparing traffic lane polygon data in which the respective traffic lanes within said roads are expressed by polygons; and displaying said roads and the respective traffic lanes within said roads using said road polygon data and traffic lane polygon data.

7. The road map display method according to claim 6, further comprising the steps of:
preparing guide line data that expresses guide lines which are set within said respective traffic lanes; and
displaying a guide mark positioned within a selected single traffic lane using said guide line data.

8. A road map display method comprising the steps of:
preparing road network data in which intersections are modeled as nodes and roads are modeled as links that connect said nodes;
preparing city map data in which roads are represented with the two-dimensional outlines thereof;
dynamically preparing road polygon data, in which respective roads are expressed by polygons each of which, as such, is representative of the two-dimensional outline of each of said roads, on the basis of said road network data and said city map data in cases where there is a need to display a road map; and
displaying said roads with the two-dimensional outlines thereof represented by said polygons, using said road polygon data.

9. A medium readable by a machine carrying a program of instructions for execution by said machine to perform the steps of:
preparing road polygon data in which respective roads are expressed by polygons each of which, as such, is representative of the two-dimensional outline of each of said roads; and
displaying said roads with the two-dimensional outlines thereof represented by said polygons, using said road polygon data.

10. A road map display device comprising:
a road map data receiving part which receives road map data that has road polygon data and intersection polygon data, wherein said road polygon data expresses respective roads by road polygons each of which, as such, is representative of the two-dimensional outline of each of said roads, and wherein said intersection polygon data expresses respective intersections by intersection polygons each of which, as such, is representative of the two-dimensional outline of each of said intersections; and
a display part which selects a part of said road polygon data for a plurality of roads that are to be displayed and selects a part of said intersection polygon data for at least one intersection connecting said plurality of roads from said road map data, and displays said plurality of roads and said at least one intersection with the two-dimensional outlines thereof represented by said road and intersection polygons, using said selected parts of said road polygon data and guiding intersection polygon data.

11. A road map display device comprising:
a road map data receiving part which receives road map data that has road polygon data and guiding intersection polygon data;
traffic jam information receiving part which receives traffic jam information that indicates end positions of tailbacks of cars;
a polygon dividing part which selects said road polygon data or said intersection polygon data for a road or intersection in which the end positions of the tailbacks of cars are present from said road map data, and divides said selected road polygon data or intersection polygon data into a region inside said tailbacks of cars and a region outside said tailbacks of cars at said end positions; and
a display part which displays regions of roads and intersections in which said tailbacks of cars are present, using the region of said road polygon data or intersection polygon data inside said tailbacks of cars in which said end positions are present and which have been divided by said polygon dividing part, and said road polygon data and intersection polygon data for roads and intersections that are continuously present along said tailbacks of cars from the region inside said tailbacks of cars.

12. A road map display method comprising the steps of:
receiving road map data which has road polygon data and intersection polygon data, wherein said road polygon data expresses respective roads by road polygons each of which, as such, is representative of the two-dimensional outline of each of said roads, and wherein said intersection polygon data expresses respective intersections by intersection polygons each of which, as such, is representative of the two-dimensional outline of each of said intersections;
selecting a part of said road polygon data for a plurality of roads that are to be displayed, and selecting a part of said intersection polygon data for at least one intersection connecting said plurality of roads, from said road map data; and
displaying said plurality of roads and said at least one intersection with the two-dimensional outlines thereof represented by said road and intersection polygons, using said selected parts of said road polygon data and guiding intersection polygon data.

13. A road map display method comprising the steps of:
receiving road map data which has road polygon data and intersection polygon data;
receiving traffic jam information which indicates final end positions of tailbacks of cars;
selecting said road polygon data and intersection polygon data for a road or intersection in which said final end positions of the tailbacks of cars are present from said road map data, and dividing said selected road polygon data or intersection polygon data into an upstream side region and a downstream side regions at said final end positions; and
displaying the regions of roads and intersections in which said tailbacks of cars are present using the downstream side region of said road polygon data or intersection polygon data in which said final end positions are present and which have been produced by division in said polygon dividing step, and said road polygon data and intersection polygon data for roads and intersections that are present further downstream from said downstream region along said tailbacks of cars.

14. A medium readable by a machine carrying a program of instructions for execution by said machine to perform the steps of:
receiving road map data which has road polygon data and intersection polygon data, wherein said road polygon data expresses respective roads by road polygons each of which, as such, is representative of the two-dimensional outline of each of said roads, and wherein said intersection polygon data expresses respective intersections by intersection polygons each of which, as such, is representative of the two-dimensional outline of each of said intersections;

selecting a part of said road polygon data for a plurality of roads that are to be displayed, and selecting a part of said intersection polygon data for at least one intersection connecting said plurality of roads, from said road map data; and displaying said plurality of roads and said at least one intersection with the two-dimensional outlines thereof represented by said road and intersection polygons, using said selected parts of said road polygon data and guiding intersection polygon data.

15. A computer-readable recording medium which carries polygonal road network data that has node data and link data that are mutually connected so that a road network is constructed, wherein the respective items of node data include intersection polygon data that expresses the shapes of the intersections of the respective nodes as polygons, and the respective items of link data include road polygon data that expresses the shapes of the respective roads between the polygons of the intersections at the both ends of the respective links as polygons.

16. A road map display device comprising:

polygonal road network data that has node data and link data that are mutually connected so that a road network is constructed, wherein the respective items of node data include intersection polygon data that expresses the shapes of the intersections of the respective nodes as polygons, and the respective items of link data include road polygon data that expresses the shapes of the respective roads between the polygons of the intersections at the both ends of the respective links as polygons; and a display part which receives said polygonal road network data, and prepares and displays polygonal road images consisting of polygons that express intersections and polygons that express roads.

17. The road map display device according to claim 16, wherein said display part can further perform route search or map matching operations using said polygonal road network data.

18. A road map display device comprising:

polygonal road network data that has node data and link data that are mutually connected so that a road network is constructed, wherein the respective items of node data include intersection polygon data that expresses the shapes of the intersections of the respective nodes as polygons, and the respective items of link data include road polygon data that expresses the shapes of the roads of the respective links as polygons;

city map data which has line segment data in which the shapes of map elements are expressed as sets of shape element points; and a display part which receives said polygonal road network data, and prepares and displays polygonal road images consisting of polygons that express intersections and polygons that express roads, and which prepares city map images using said city map data, and displays said polygonal road images superimposed on said city map images.

19. A road map display method comprising the steps of:

receiving polygonal road network data that has node data and link data that are mutually connected so that a road network is constructed, wherein the respective items of node data include intersection polygon data that expresses the shapes of the intersections of the respective nodes as polygons, and the respective items of link data include road polygon data that expresses the shapes of the respective roads between the polygons of the intersections at the both ends of the respective links as polygons; and preparing and displaying polygonal road images consisting of polygons that express intersections and polygons that express roads, using said received polygonal road network data.

20. A medium readable by a machine carrying a program of instructions for execution by said machine to perform the steps of:

receiving polygonal road network data that has node data and link data that are mutually connected so that a road network is constructed, wherein the respective items of node data include intersection polygon data that expresses the shapes of the intersections of the respective nodes as polygons, and the respective items of link data include road polygon data that expresses the shapes of the respective roads between the polygons of the intersections at the both ends of the respective links as polygons; and preparing and displaying polygonal road images consisting of polygons that express intersections and polygons that express roads, using said received polygonal road network data.

21. A computer-readable recording medium which carries polygonal road network data that has node data and link data that are mutually connected so that a road network is constructed, wherein the respective items of node data include intersection polygon data that expresses the shapes of the intersections of the respective nodes as polygons with coordinates based on the outline coordinates of respective intersections contained in city map data, and the respective items of link data include road polygon data that expresses the shapes of the roads of the respective links as polygons with coordinates based on the outline coordinates of respective roads contained in city map data.

22. A road map display device comprising:

polygonal road network data that has node data and link data that are mutually connected so that a road network is constructed, wherein the respective items of node data include intersection polygon data that expresses the shapes of the intersections of the respective nodes as polygons with coordinates based on the outline coordinates of respective intersections contained in city map data, and the respective items of link data include road polygon data that expresses the shapes of the roads of the respective links as polygons with coordinates based on the outline coordinates of respective roads contained in city map data; and a display part which receives said polygonal road network data, and prepares and displays polygonal road images consisting of polygons that express intersections and polygons that express roads.

23. A road map display method comprising the steps of:

receiving polygonal road network data which has node data and link data that are mutually connected so that a road network is constructed, wherein the respective items of node data include intersection polygon data that expresses the shapes of the intersections of the respective nodes as polygons with coordinates based on the outline coordinates of respective intersections contained in city map data, and the respective items of link data include road polygon data that expresses the shapes of the roads of the respective links as polygons with coordinates based on the outline coordinates of respective roads contained in city map data; and preparing and displaying polygonal road images consisting of polygons that express intersections and polygons that express roads, using said received polygonal road network data.

24. A medium readable by a machine carrying a program of instructions for execution by said machine to perform the steps of:

receiving polygonal road network data which has node data and link data that are mutually connected so that a road network is constructed, wherein the respective items of node data include intersection polygon data that expresses the shapes of the intersections of the respective nodes as polygons with coordinates based on the outline coordinates of respective intersections contained in city map data, and the respective items of link data include road polygon data that expresses the shapes of the roads of the respective links as polygons with coordinates based on the outline coordinates of respective roads contained in city map data; and preparing and displaying polygonal road images consisting of polygons that express intersections and polygons that express roads, using said received polygonal road network data.

25. A computer-readable recording medium which carries polygonal road network data, said polygonal road network data comprising:

intersection polygon data expressing respective intersections as intersection polygons;

road polygon data expressing respective roads as road polygons;

node data expressing said respective intersections as nodes; and link data expressing said respective roads as vectors linking between said nodes, wherein said respective intersection and road polygons in said intersection and road polygon data are associated in a one-to-one correspondence with said respective nodes and vectors in said node and link data.

26. The computer-readable recording medium according to claim 25, wherein said polygonal road network data further comprises traffic lane polygon data expressing respective traffic lanes within said roads as traffic lane polygons.

27. A device for preparing polygonal road network data comprising:

a data receiving part for receiving road network data and city map data, said road network data including node data and link data, said node data expressing respective intersections as nodes, said link data expressing respective roads as vectors linking between said nodes, said city map data including line segment data expressing the shapes of said respective intersections and roads as sets of line segments; and data generating part for generating polygonal road network data using said road network data and said city map data received by said data receiving part, said polygonal road network data comprising intersection polygon data expressing said respective intersections as intersection polygons; road polygon data expressing said respective roads as road polygons; said node data; and said link data, said respective intersection and road polygons in said intersection and road polygon data being associated in a one-to-one correspondence with said respective nodes and vectors in said node and link data.

28. The device according to claim 27, wherein said polygonal road network data further comprises traffic lane polygon data expressing respective traffic lanes within said roads as traffic lane polygons.

29. A method for preparing polygonal road network data comprising the steps of:

receiving road network data and city map data, said road network data including node data and link data, said node data expressing respective intersections as nodes, said link data expressing respective roads as vectors linking between said nodes, said city map data including line segment data expressing the shapes of said respective intersections and roads as sets of line segments; and generating polygonal road network data using said road network data and said city map data, said polygonal road network data comprising intersection polygon data expressing said respective intersections as intersection polygons; road polygon data expressing said respective roads as road polygons; said node data; and said link data, said respective intersection and road polygons in said intersection and road polygon data being associated in a one-to-one correspondence with said respective nodes and vectors in said node and link data.

30. A medium readable by a machine carrying a program of instructions for execution by said machine to perform a method for preparing polygonal road network data comprising the steps of:

receiving road network data and city map data, said road network data including node data and link data, said node data expressing respective intersections as nodes, said link data expressing respective roads as vectors linking between said nodes, said city map data including line segment data expressing the shapes of said respective intersections and roads as sets of line segments; and generating polygonal road network data using said road network data and said city map data, said polygonal road network data comprising intersection polygon data expressing said respective intersections as intersection polygons; road polygon data expressing said respective roads as road polygons; said node data; and said link data, said respective intersection and road polygons in said intersection and road polygon data being associated in a one-to-one correspondence with said respective nodes and vectors in said node and link data.

31. A device for displaying a road map comprising:

a data receiving part for receiving polygonal road network data, said polygonal road network data comprising intersection polygon data expressing respective intersections as intersection polygons; road polygon data expressing respective roads as road polygons; node data expressing said respective intersections as nodes; and link data expressing said respective roads as vectors linking between said nodes, said respective intersection and road polygons in said intersection and road polygon data being associated in a one-to-one correspondence with said respective nodes and vectors in said node and link data; and displaying part for generating and displaying polygonal road images including images of said intersection and road polygons using said polygonal road network data received by said data receiving part.

32. The device according to claim 31, wherein said polygonal road network data further comprises traffic lane polygon data expressing respective traffic lanes within said roads as traffic lane polygons, and said polygonal road images further includes images of said traffic lane polygons.

33. The device according to claim 31, further comprising:

a route searching part for performing a route search using said node and link data included in said polygonal road network data received by said data receiving part.

34. A method for displaying a road map comprising the steps of:

receiving polygonal road network data, said polygonal road network data comprising intersection polygon data expressing respective intersections as intersection polygons; road polygon data expressing respective roads as road polygons; node data expressing said respective intersections as nodes; and link data expressing said respective roads as vectors linking between said nodes, said respective intersection and road polygons in said intersection and road polygon data being associated in a one-to-one correspondence with said respective nodes and vectors in said node and link data; and generating and displaying polygonal road images including images of said intersection and road polygons using said polygonal road network data.

35. A medium readable by a machine carrying a program of instructions for execution by said machine to perform a method for displaying a road map comprising the steps of:

receiving polygonal road network data, said polygonal road network data comprising intersection polygon data expressing respective intersections as intersection polygons; road polygon data expressing respective roads as road polygons; node data expressing said respective intersections as nodes; and link data expressing said respective roads as vectors linking between said nodes, said respective intersection and road polygons in said intersection and road polygon data being associated in a one-to-one correspondence with said respective nodes and vectors in said node and link data; and generating and displaying polygonal road images including images of said intersection and road polygons using said polygonal road network data.

36. A computer-readable recording medium which carries polygonal road map data, said polygonal road map data comprising:

road polygon data expressing respective roads as road polygons; and traffic lane polygon data expressing respective traffic lanes within said roads as traffic lane polygons.

37. A device for preparing polygonal road map data comprising:

a data receiving part for receiving road network data and city map data, said road network data including node data and link data, said node data expressing respective intersections as nodes, said link data expressing respective roads as vectors linking between said nodes, said city map data including line segment data expressing the shapes of said respective intersections and roads as sets of line segments; and data generating part for generating polygonal road map data using said road network data and said city map data received by said data receiving part, said polygonal road map data comprising road polygon data expressing respective roads as road polygons; and traffic lane polygon data expressing respective traffic lanes within said roads as traffic lane polygons.

38. A method for preparing polygonal road map data comprising the steps of:

receiving road network data and city map data, said road network data including node data and link data, said node data expressing respective intersections as nodes, said link data expressing respective roads as vectors linking between said nodes, said city map data including line segment data expressing the shapes of said respective intersections and roads as sets of line segments; and generating polygonal road map data using said road network data, said polygonal road map data comprising road polygon data expressing respective roads as road polygons; and traffic lane polygon data expressing respective traffic lanes within said roads as traffic lane polygons.

39. A medium readable by a machine carrying a program of instructions for execution by said machine to perform a method for preparing polygonal road map data comprising the steps of:

receiving road network data and city map data, said road network data including node data and link data, said node data expressing respective intersections as nodes, said link data expressing respective roads as vectors linking between said nodes, said city map data including line segment data expressing the shapes of said respective intersections and roads as sets of line segments; and generating polygonal road map data using said road network data, said polygonal road map data comprising road polygon data expressing respective roads as road polygons; and traffic lane polygon data expressing respective traffic lanes within said roads as traffic lane polygons.

40. A device for displaying a road map comprising:

a data receiving part for receiving polygonal road map data, said polygonal road map data comprising road polygon data expressing respective roads as road polygons; and traffic lane polygon data expressing respective traffic lanes within said roads as traffic lane polygons; and displaying part for generating and displaying polygonal road images including images of said road and traffic lane polygons using said polygonal road map data received by said data receiving part.

41. A method for displaying a road map comprising the steps of:

receiving polygonal road map data, said polygonal road map data comprising road polygon data expressing respective roads as road polygons; and traffic lane polygon data expressing respective traffic lanes within said roads as traffic lane polygons; and generating and displaying polygonal road images including images of said road and traffic lane polygons using said polygonal road map data.

42. A medium readable by a machine carrying a program of instructions for execution by said machine to perform a method for displaying a road map comprising the steps of:

receiving polygonal road map data, said polygonal road map data comprising road polygon data expressing respective roads as road polygons; and traffic lane polygon data expressing respective traffic lanes within said roads as traffic lane polygons; and generating and displaying polygonal road images including images of said road and traffic lane polygons using said polygonal road map data.

* * * * *